US011650354B2

(12) United States Patent
Karafin

(10) Patent No.: US 11,650,354 B2
(45) Date of Patent: May 16, 2023

(54) SYSTEMS AND METHODS FOR RENDERING DATA FROM A 3D ENVIRONMENT

(71) Applicant: LIGHT FIELD LAB, INC., San Jose, CA (US)

(72) Inventor: Jonathan Sean Karafin, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/635,136

(22) PCT Filed: Jan. 14, 2019

(86) PCT No.: PCT/US2019/013554
§ 371 (c)(1),
(2) Date: Jan. 29, 2020

(87) PCT Pub. No.: WO2019/140414
PCT Pub. Date: Jul. 18, 2019

(65) Prior Publication Data
US 2020/0380762 A1    Dec. 3, 2020

Related U.S. Application Data

(60) Provisional application No. 62/617,286, filed on Jan. 14, 2018.

(51) Int. Cl.
*G02B 3/00*    (2006.01)
*G06T 15/00*   (2011.01)
(Continued)

(52) U.S. Cl.
CPC ........ *G02B 3/0006* (2013.01); *G02B 30/00* (2020.01); *G06T 15/005* (2013.01); *G06T 15/06* (2013.01); *G06T 15/205* (2013.01); *G06T 17/20* (2013.01)

(58) Field of Classification Search
None
See application file for complete search history.

(56) References Cited

U.S. PATENT DOCUMENTS

| 5,004,335 A | 4/1991 | Montes |
| 5,187,360 A | 2/1993 | Pasco |

(Continued)

FOREIGN PATENT DOCUMENTS

| CN | 104837003 A | 8/2015 |
| CN | 105144245 A | 12/2015 |

(Continued)

OTHER PUBLICATIONS

Wu, Gaochang, et al. "Light field image processing: An overview." IEEE Journal of Selected Topics in Signal Processing 11.7 (2017): 926-954.*

(Continued)

*Primary Examiner* — Yingchun He
(74) *Attorney, Agent, or Firm* — Charles C. Yang

(57) ABSTRACT

Disclosed are systems and methods to render data from a 3D environment. The methods and systems of this disclosure utilize inverse ray tracing from a viewing volume to capture energy data from a 3D environment in a single rendering pass providing thereby collecting data more efficiently and accurately.

20 Claims, 24 Drawing Sheets

(51) Int. Cl.
  *G06T 15/06* (2011.01)
  *G06T 15/20* (2011.01)
  *G06T 17/20* (2006.01)
  *G02B 30/00* (2020.01)

(56) References Cited

U.S. PATENT DOCUMENTS

| | | |
|---|---|---|
| 5,396,350 A | 3/1995 | Beeson et al. |
| 5,481,385 A | 1/1996 | Zimmerman et al. |
| 6,169,594 B1 | 1/2001 | Aye et al. |
| 6,326,939 B1 | 12/2001 | Smith |
| 6,556,280 B1 | 4/2003 | Kelsey et al. |
| 7,050,020 B2 | 5/2006 | Uehara et al. |
| RE39,864 E | 10/2007 | Athale et al. |
| 7,986,374 B2 | 7/2011 | Ijzerman et al. |
| 8,149,265 B2 | 4/2012 | Smalley et al. |
| 8,345,144 B1 | 1/2013 | Georgiev et al. |
| 8,493,383 B1 | 7/2013 | Cook et al. |
| 8,736,675 B1 | 5/2014 | Holzbach et al. |
| 9,143,678 B2 | 9/2015 | Park et al. |
| 9,817,626 B2 | 11/2017 | Ur et al. |
| 9,874,761 B2 | 1/2018 | Van Putten et al. |
| 9,904,065 B2 | 2/2018 | Jin et al. |
| 9,945,988 B2 | 4/2018 | Powell |
| 10,009,597 B2 | 6/2018 | Karafin et al. |
| 2001/0028485 A1 | 10/2001 | Kremen |
| 2002/0028045 A1 | 3/2002 | Yoshimura et al. |
| 2002/0122113 A1 | 9/2002 | Foote |
| 2004/0080938 A1 | 4/2004 | Holman et al. |
| 2004/0135100 A1 | 7/2004 | Menon et al. |
| 2004/0240777 A1 | 12/2004 | Woodgate et al. |
| 2005/0093713 A1 | 5/2005 | Orme |
| 2005/0243275 A1 | 11/2005 | Curatu |
| 2005/0260677 A1 | 11/2005 | Saaski |
| 2006/0028400 A1 | 2/2006 | Lapstun et al. |
| 2006/0077319 A1 | 4/2006 | Kitamura |
| 2006/0171007 A1 | 8/2006 | Chen et al. |
| 2006/0256415 A1 | 11/2006 | Holmes et al. |
| 2007/0097321 A1 | 5/2007 | Whitehead et al. |
| 2008/0144174 A1 | 6/2008 | Lucente et al. |
| 2008/0174670 A1 | 7/2008 | Olsen et al. |
| 2008/0192313 A1 | 8/2008 | Matsumura et al. |
| 2010/0125356 A1 | 5/2010 | Shkolnik et al. |
| 2010/0245824 A1 | 9/2010 | Schwarz et al. |
| 2010/0277779 A1 | 11/2010 | Futterer et al. |
| 2010/0278480 A1 | 11/2010 | Vasylyev |
| 2010/0289870 A1 | 11/2010 | Leister |
| 2011/0032329 A1 | 2/2011 | Bauza et al. |
| 2011/0069189 A1 | 3/2011 | Venkataraman et al. |
| 2011/0109629 A1 | 5/2011 | Ericson et al. |
| 2011/0114831 A1 | 5/2011 | Grier |
| 2011/0134040 A1 | 6/2011 | Duparre et al. |
| 2011/0157180 A1 | 6/2011 | Burger et al. |
| 2011/0242461 A1 | 10/2011 | Escuti et al. |
| 2012/0050833 A1 | 3/2012 | Bove et al. |
| 2012/0057040 A1 | 3/2012 | Park et al. |
| 2012/0147205 A1 | 6/2012 | Lelescu et al. |
| 2012/0206726 A1 | 8/2012 | Pervez et al. |
| 2012/0300044 A1 | 11/2012 | Thomas et al. |
| 2013/0027512 A1 | 1/2013 | Aronsson et al. |
| 2013/0088785 A1 | 4/2013 | Yamamoto |
| 2013/0163089 A1 | 6/2013 | Bohn |
| 2013/0170004 A1 | 7/2013 | Futterer |
| 2013/0188068 A1 | 7/2013 | Said |
| 2013/0250150 A1 | 9/2013 | Malone et al. |
| 2013/0265485 A1 | 10/2013 | Kang |
| 2014/0078333 A1 | 3/2014 | Miao et al. |
| 2014/0104665 A1 | 4/2014 | Popovich et al. |
| 2014/0300694 A1 | 10/2014 | Smalley et al. |
| 2014/0300695 A1 | 10/2014 | Smalley et al. |
| 2014/0320530 A1 | 10/2014 | Gruber et al. |
| 2015/0002840 A1 | 1/2015 | Pettersson et al. |
| 2015/0015773 A1 | 1/2015 | Tulyakov et al. |
| 2015/0016777 A1 | 1/2015 | Abovitz et al. |
| 2015/0146029 A1 | 5/2015 | Venkataraman et al. |
| 2015/0146030 A1 | 5/2015 | Venkataraman et al. |
| 2015/0178939 A1 | 6/2015 | Bradski et al. |
| 2015/0197062 A1 | 7/2015 | Shinar et al. |
| 2015/0227112 A1 | 8/2015 | Liu et al. |
| 2015/0241608 A1 | 8/2015 | Shian et al. |
| 2015/0262424 A1* | 9/2015 | Tabaka .............. G02B 27/0075 345/633 |
| 2015/0285682 A1 | 10/2015 | Popovich et al. |
| 2015/0288063 A1 | 10/2015 | Johnson et al. |
| 2015/0294472 A1 | 10/2015 | Putraya et al. |
| 2015/0331241 A1 | 11/2015 | Haddick |
| 2016/0014395 A1 | 1/2016 | Murray et al. |
| 2016/0037146 A1 | 2/2016 | McGrew |
| 2016/0041386 A1 | 2/2016 | Moreno |
| 2016/0042501 A1 | 2/2016 | Huang et al. |
| 2016/0091786 A1 | 3/2016 | Kazmierski et al. |
| 2016/0103419 A1 | 4/2016 | Callagy et al. |
| 2016/0105660 A1 | 4/2016 | Ito et al. |
| 2016/0180511 A1 | 6/2016 | Zhou et al. |
| 2016/0205394 A1 | 7/2016 | Meng et al. |
| 2016/0209657 A1 | 7/2016 | Popovich et al. |
| 2016/0301430 A1 | 10/2016 | Mohamadi |
| 2017/0139213 A1 | 5/2017 | Schmidtlin |
| 2017/0214907 A1* | 7/2017 | Lapstun ................. G02B 30/27 |
| 2017/0347874 A1 | 12/2017 | Novik |
| 2018/0131926 A1 | 5/2018 | Shanks et al. |
| 2018/0252935 A1* | 9/2018 | Vertegaal ........... G02B 27/0075 |
| 2018/0361680 A1 | 12/2018 | Bharti et al. |
| 2019/0019840 A1* | 1/2019 | Thothadri ............. H01L 27/156 |
| 2019/0364263 A1 | 11/2019 | Jannard et al. |

FOREIGN PATENT DOCUMENTS

| | | | |
|---|---|---|---|
| CN | 205185315 U | | 4/2016 |
| GB | 2444301 A | | 6/2008 |
| JP | 200526772 A | | 1/2005 |
| JP | 2008191661 A | | 8/2008 |
| JP | 2009175866 A | | 8/2009 |
| JP | 2010536069 A | | 11/2010 |
| JP | 2013196532 A | | 9/2013 |
| JP | 2014127789 A | | 7/2014 |
| JP | 201645644 A | | 4/2016 |
| KR | 20140085779 A | | 7/2014 |
| NZ | 743813 A | | 9/2019 |
| WO | 2014188149 A1 | | 11/2014 |
| WO | 2015071903 A1 | | 5/2015 |
| WO | 2015074718 A1 | | 5/2015 |
| WO | 2015148334 A1 | | 10/2015 |
| WO | 2016007920 A1 | | 1/2016 |
| WO | 2016046514 | | 3/2016 |
| WO | 2017127897 A1 | | 8/2017 |
| WO | 2018014036 | | 1/2018 |
| WO | 2018014040 | | 1/2018 |
| WO | 2018014044 A1 | | 1/2018 |
| WO | 2018014048 | | 1/2018 |

OTHER PUBLICATIONS

Takaki "High-Density Directional Display for Generating Natural Three-Dimensional Images", Proc. Of the IEEE, vil. 94, No. 3 Mar. 2006 (Year: 2006).*
Huang et al. The Light Field Stereoscope Immersive Computer Graphics via Factored Near-Eye Light Field Displays with Focus Cues, ACM Transactions on Graphics, vol. 34 No. 4, 2015 (Year: 2015).*
International Search Report and Written Opinion of PCT/US2017/042276 dated Nov. 24, 2017.
Hoshi, et al., "Noncontact tactile display based on radiation pressure of airborne ultrasound." IEEE Transactions on Haptics, vol. 3, No. 3 (2010): pp. 155-165.
AU-2017297627 Examination Report No. 1 dated Aug. 21, 2018.
Fifty years of Anderson localization, Ad Lagendijk, Bart van Tiggelen, and Diederik S. Wiersma, Phsyics Today 62(8), 24 (2009). (Year: 2009).
"Energy." In illustrated Dictionary of Science, Andromeda, edited by Michael Allaby. Windmill Books (Andromeda International),

(56) References Cited

OTHER PUBLICATIONS 1988. https://search.credorederence.com/content/entry/andidsci/energy/0?institutionId=743 (Year: 1988).
CA-3006528 Office action dated Aug. 30, 2018.
International Search Report and Written Opinion of PCT/US2017/042468 dated Nov. 27, 2017.
International Search Report and Written Opinion dated May 2, 2019 in International Patent Application No. PCT/US2019/013552.
International Search Report and Written Opinion dated Jun. 18, 2019 in International Patent Application No. PCT/US2019/013523.
AU-2017296234 Examination Report No. 1 dated Jul. 19, 2018.
Wetzstein et al., "On Plenoptic Multiplexing and Reconstruction." International Journal on Computer Vision (IJVC), Springer, 2013, 101(2), pp. 384-400 [online][retrieved on Sep. 26, 2017] <URL: https://hal.inria.fr/hal-00876493>.
International Preliminary Report on Patentability dated Sep. 24, 2018 in International Patent Application No. PCT/US17/42470.
AU-2017296234 Examination Report No. 2 dated Sep. 24, 2018.
Gerald, "Size of Letters Required for Visibility as a Function of Viewing Distance and Observer Visual Acuity", U.S. Department of Commerce/National Bureau of Statistics, Jul. 1983.
CA-3006518 Office action dated Sep. 28, 2018.
NZ-743822 Further Examination Report dated Jan. 29, 2019.
NZ-743822 First Examination Report dated Aug. 28, 2018.
AU-2017297629 Examination Report No. 1 dated Jul. 5, 2018.
NZ-743813 Further Examination Report dated Dec. 11, 2018.
CA-3006553 Office action dated Oct. 22, 2018.
CA-3035303 Office action dated Apr. 25, 2019.
Watanabe, et al., "A Method for controlling tactile sensation of surfaces roughness using ultrasonic vibration." Robotics and Automation, 1995 Proceedings, 1995 IEEE International Conference on vol. 1. IEEE, 1995.
International Search Report and Written Opinion dated Nov. 17, 2017 in International Patent Application No. PCT/US17/42452.
NZ-743822 Further Examination Report dated Jun. 11, 2019.
AU-2018256628 Examination Report No. 1 dated Jul. 1, 2019.
NZ-743820 Further Examination Report dated Jul. 9, 2019.
International Search Report and Written Opinion dated Oct. 12, 2017 in International Patent Application No. PCT/US17/42469.
Smith, T.E., "Notebook for Spatial Data Analysis, Part I, Spatial Point Pattern Analysis", (2016) ESE 502, (http://www.seas.upenn.edu/~ese502/#notebook).
International Search Report and Written Opinion dated Nov. 9, 2017 in International Patent Application No. PCT/US17/42679.
NZ-743813 Further Examination Report dated Sep. 14, 2018.
International Search Report and Written Opinion dated Dec. 28, 2017 in International Patent Application No. PCT/US2017/42470.
"Plastics-Vocabulary", International Organization for Standardization, Switzerland 1999, ISO 472 2013.
AU-2017297630 Examination Report No. 1 dated Aug. 21, 2018.
AU-2019200180 Examination Report No. 1 dated Nov. 26, 2019.
CA-3006553 Office action dated Sep. 27, 2019.
CA-3053303 Office action dated Aug. 1, 2019.
NZ-743820 First Examination Report dated Aug. 30, 2018.
NZ-743820 Further Examination Report dated Feb. 25, 2019.
International Search Report and Written Opinion dated Dec. 27, 2017 in International Patent Application No. PCT/US17/42467.
International Search Report and Written Opinion of PCT/US2019/013409 dated Apr. 24, 2019.
International Search Report and Written Opinion of PCT/US2019/013408 dated Apr. 23, 2019.
International Search Report and Written Opinion of PCT/US2019/013410 dated Apr. 1, 2019.
International Search Report and Written Opinion of PCT/US2019/013539 dated Mar. 22, 2019.
International Search Report and Written Opinion of PCT/US2019/013554 dated Mar. 28, 2019.
Gerald, "Size of Letters Required for Visibility as a Function of Viewing Distance and Observer Visual Acuity", U.S. Department of Commerce/National Bureau of Statistics, Jul. 1983.
CN201780044022.X First Office Action of the Chinese Patent Office dated Sep. 9, 2020.
EP-17828631.6 Partial Search Report of European Patent Office dated Feb. 14, 2020.
International Search Report and Written Opinion of PCT/US2017/042469 dated Oct. 12, 2017.
EP-19739021.4 European Extended Search Report of European Patent Office dated Aug. 27, 2021.
Hahne et al., "Baseline and Triangulation Geometry in a Standard Plenoptic Camera", Internatinal Journal of Computer Vision, Kluwer Academic Publishers, Norwell, US, vol. 126, No. 1 1, Aug. 20, 2017 (Aug. 20, 2017), pp. 21-35.
JP2019-501664 Non-Final Notice of Reasons for Rejection of the Japan Patent Office dated Sep. 21, 2021.
Levoy et al., Light field rendering:, Computer Graphics Proceedings, SIGGRAPH '96, ACM, New York, US, Aug. 1, 1996, (Aug. 1, 1996), pp. 31-42.
Sun et al., "Synthesis of light-field raw data from RGB-D images", 2015 IEEE International Conference on Image Processing (ICIP), IEEE, Sep. 27, 2015, (Sep. 27, 2015), pp. 1448-1452.
KR-10-2019-7004036 Notice of Preliminary Rejection dated Apr. 27, 2022.
JP2020-538963 Non-Final Notice of Reasons for Rejection from the Japan Patent Office dated Dec. 6, 2022.

\* cited by examiner

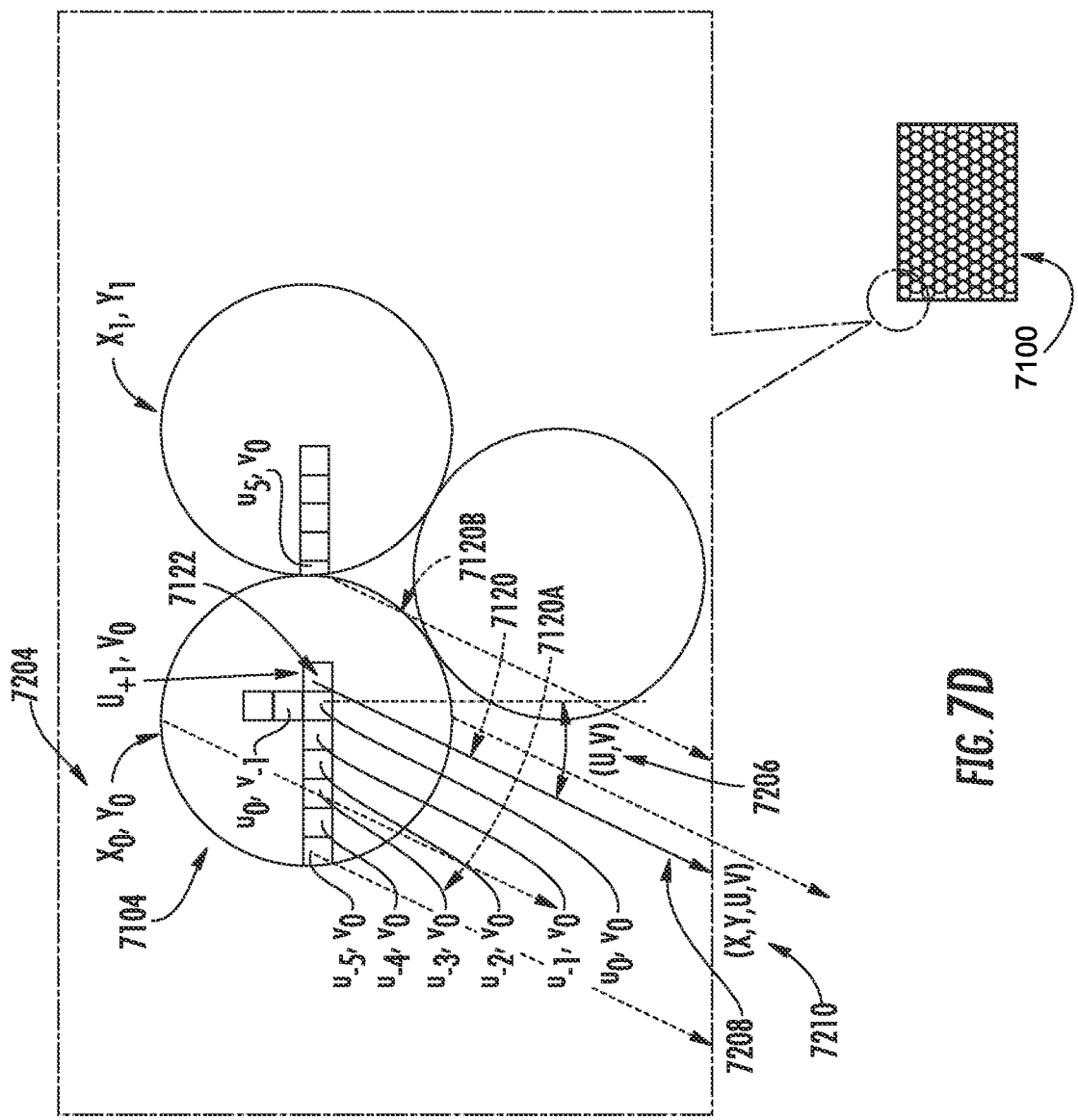

SYSTEMS AND METHODS FOR RENDERING DATA FROM A 3D ENVIRONMENT

TECHNICAL FIELD

This disclosure is generally related to rendering a three-dimensional environment into a data set to instruct an energy-field projection device to output a four-dimensional energy field.

BACKGROUND

The dream of an interactive virtual world within a "holodeck" chamber as popularized by Gene Roddenberry's Star Trek and originally envisioned by author Alexander Moszkowski in the early 1900s has been the inspiration for science fiction and technological innovation for nearly a century. However, no compelling implementation of this experience exists outside of literature, media, and the collective imagination of children and adults alike. The present application teaches systems and methods to render information from a 3D environment into a format to allow a 4D energy-field projection system to output a 4D energy field modeled on the a scene from the 3D environment.

SUMMARY

In an embodiment, a method for rendering a four-dimensional (4D) energy field from a three-dimensional (3D) environment includes the steps of providing a scene in a 3D environment described by a plurality of energy-data points located throughout the scene, and locating a plurality of virtual pixels on a virtual pixel plane in the scene where each virtual pixel has a known unique 4D coordinate that includes a 2D angular coordinate and a 2D spatial coordinate. In this embodiment, the 2D angular coordinate of each virtual pixel describes an angular correlation between the virtual pixel and a virtual viewing location of a plurality of virtual viewing locations located on a virtual viewing plane in the scene, and the 2D spatial coordinate of each virtual pixel identifies the location of a virtual aperture of a plurality of virtual apertures located on a virtual display plane in the scene. Next, sampling energy data points of the plurality of energy-data points in the scene along a plurality of rays from the virtual viewing plane where each ray intersects one virtual viewing location and one virtual pixel at an angle determined by the 2D angular coordinate of the one virtual pixel intersected by the ray and where each ray intersects one virtual aperture determined by the 2D spatial coordinate of the one virtual pixel intersected by the ray. In this embodiment, the method includes correlating the energy data points sampled along each ray to an energy value for the one virtual pixel intersected by the ray, and rendering the energy value of the one virtual pixel of each ray and the known unique 4D coordinates of the one virtual pixel of each ray into a data set having a format operable for instructing an energy device to output a 4D energy field.

In an embodiment, the at least one ray of the plurality of rays intersects one virtual viewing location of the plurality of virtual viewing locations. In one embodiment, one ray of the plurality of rays intersects one virtual pixel of the plurality of virtual pixels. In some embodiments, the 4D energy field includes a light field, a haptic field or a tactile field.

In an embodiment, the energy-data points include a value describing at least one of the following: an energy frequency, an energy intensity, an energy transparency, an energy refractivity, or an energy reflectivity. In one embodiment, the 3D environment can be determined by applying a depth map to points in a two-dimensional space. In another embodiment, the virtual display plane corresponds to a waveguide system of an energy directing device, and energy is operable to be directed through the waveguide system according to the data set to form a detectable 4D energy representation of at least a portion of the scene.

In an embodiment, the plurality of virtual pixels corresponds to a plurality of energy locations on a first side of the waveguide system. In another embodiment, the data set further includes vectorized material property data. In operation, at least a portion of the method can be carried out in real time. In another technique, the method can be entirely carried out in real time. In another embodiment, at least two portions of the method are carried out in different time periods.

In some embodiments, the data set describes a signal perceptible by a visual, audio, textural, sensational, or smell sensor. In an embodiment, the energy data points sampled along each ray of the plurality of rays are simultaneously correlated to energy values. In some instances, the data set is stored in a binary file format.

In an embodiment, each ray of the plurality of rays extends through the one virtual aperture of the plurality of virtual apertures to and beyond the one virtual pixel of the plurality of virtual pixels and where energy data points of the plurality of energy data points are sampled from the virtual viewing plane.

In one embodiment, the steps above may be repeated indefinitely. In another embodiment, the steps above may be repeated indefinitely to render a dynamic 4D energy field from a 3D environment.

In an embodiment, rendering the energy data further includes calibrating the energy data for the energy device. In one embodiment, a ray file stores a 3D spatial coordinate identifying the location of each virtual viewing location and the 2D angular coordinate of the one virtual pixel intersected by every ray. In another embodiment, the ray file associates the 3D spatial coordinate of each virtual viewing location with the 2D angular coordinate of every virtual pixel intersected by every ray that intersects the virtual viewing location. In yet another embodiment, the ray file provides an instruction for each ray for sampling energy data points of the plurality of energy data points along the ray from the one virtual viewing location intersected by the ray where the instruction is determined at least by the 3D spatial coordinate of the one virtual viewing location intersected by the ray and the 2D angular coordinate of the one virtual pixel intersected by the ray.

In an embodiment, a system for rendering a four-dimensional (4D) energy field from a dynamic three-dimensional (3D) environment includes a processing subsystem having a sensory data engine and a rendering engine, where the sensory data engine provides a scene in a 3D environment described by a plurality of energy-data points located throughout the scene. In this embodiment, the sensory data engine locates a plurality of virtual pixels on a virtual pixel plane in the scene where each virtual pixel has a known unique 4D coordinate that includes a 2D angular coordinate and a 2D spatial coordinate. The 2D angular of each virtual pixel coordinate describes an angular correlation between the virtual pixel and a virtual viewing location of a plurality of virtual viewing locations located on a virtual viewing plane in the scene by the sensory data engine, while the 2D spatial coordinate of each virtual pixel identifies the location of a virtual aperture of a plurality of virtual apertures located on a virtual display plane in the scene by the sensory data engine.

In this embodiment, the rendering engine samples energy data points of the plurality of energy-data points in the scene along a plurality of rays from the virtual viewing plane where each ray intersects one virtual viewing location and one virtual pixel at an angle determined by the 2D angular coordinate of the one virtual pixel intersected by the ray and where each ray rays intersects one virtual aperture determined by the 2D spatial coordinate of the one virtual pixel intersected by the ray.

Still in this embodiment, the rendering engine correlates the energy data points sampled along each ray to an energy value for the one virtual pixel of the plurality of virtual pixels, and the rendering engine renders the energy values of the one virtual pixels of the plurality of virtual pixels and the known unique 4D coordinates of the one virtual pixels of the plurality of virtual pixels into a data set having a format operable for instructing an energy device to output a 4D energy field.

In an embodiment, at least one ray of the plurality of rays intersects one virtual viewing location of the plurality of virtual viewing locations. In another embodiment, one ray of the plurality of rays intersects one virtual pixel of the plurality of virtual pixels. In some embodiments, the 4D energy field can be a light field, a haptic field or a tactile field.

In an embodiment, the energy-data points include a value describing at least one of the following: an energy frequency, an energy intensity, an energy transparency, an energy refractivity, or an energy reflectivity. In operation, the 3D environment is determined by applying a depth map to points in a two-dimensional space.

In one embodiment, the virtual display plane corresponds to a waveguide system of an energy directing device, and energy can be directed through the waveguide system according to the data set to form a detectable 4D energy-field representation of at least a portion of the scene. In another embodiment, the plurality of virtual pixels corresponds to a plurality of energy locations on a first side of the waveguide system. In another embodiment, the data set further includes vectorized material property data.

In operation, at least a portion of the system is carried out in real time. In another operation, the system is entirely carried out in real time. In another embodiment, at least two portions of the system are carried out in different time periods.

In an embodiment, the data set describes a signal perceptible by a visual, audio, textural, sensational, or smell sensor. In another embodiment, the energy data points sampled along each ray of the plurality of rays are simultaneously correlated to energy values. In yet another embodiment, the data set is stored in a binary file format.

In an embodiment, energy data points of the plurality of energy-data points are sampled by the rendering engine along each ray of the plurality of rays that extend from the virtual viewing plane through the one virtual aperture of the plurality of virtual apertures to and beyond the one virtual pixel of the plurality of virtual pixels. In another embodiment, the system may be operated indefinitely to render a dynamic 4D energy field from a dynamic 3D environment. In yet another embodiment, the system further includes a memory to store the dataset. In one embodiment, the rendering system calibrates the energy data for the energy device. In another embodiment, the system further comprises a memory to store the plurality of energy-data points.

In one embodiment, a ray file stores a 3D spatial coordinate identifying the location of each virtual viewing location and the 2D angular coordinate of the one virtual pixel intersected by every ray. In another embodiment, the ray file associates the 3D spatial coordinate of each virtual viewing location with the 2D angular coordinate of every virtual pixel intersected by every ray that intersects the virtual viewing location. In yet another embodiment, the ray file provides an instruction for each ray for sampling energy data points of the plurality of energy data points along the ray from the one virtual viewing location intersected by the ray where the instruction is determined at least by the 3D spatial coordinate of the one virtual viewing location intersected by the ray and the 2D angular coordinate of the one virtual pixel intersected by the ray.

In an embodiment, a method for rendering energy data from a three-dimensional (3D) environment includes the steps of providing a scene in a 3D environment described by a plurality of energy-data points located throughout the scene, and locating a plurality of virtual pixels on a virtual pixel plane in the scene where each virtual pixel has a known unique 4D coordinate that includes a 2D angular coordinate and a 2D spatial coordinate. The 2D angular coordinate of each virtual pixel describes an angular correlation between the virtual pixel and a virtual viewing location of a plurality of virtual viewing locations located on a virtual viewing plane in the scene, while the 2D spatial coordinate of each virtual pixel identifies the location of a virtual aperture of a plurality of virtual apertures located on a virtual display plane in the scene. The next step of the method includes sampling energy data points of the plurality of energy-data points in the scene along a plurality of rays from the virtual viewing plane where each ray intersects one virtual viewing location and one virtual pixel at an angle determined by the 2D angular coordinate of the one virtual pixel intersected by the ray and where each ray intersects one virtual aperture determined by the 2D spatial coordinate of the one virtual pixel intersected by the ray. In one method, the next step includes correlating the energy data points sampled along each ray to an energy value for the one virtual pixel intersected by the ray, and rendering the energy value of the one virtual pixel of each ray and the known unique 4D coordinates of the one virtual pixel of each ray into a data set having a format operable for instructing an energy device to output energy data.

In one embodiment, each virtual aperture is intersected by two rays. In another embodiment, the plurality of virtual viewing locations includes two virtual viewing locations. In some embodiments, the data set has a format operable for instructing an energy device to output a stereoscopic image, the data set has a format operable for instructing an energy device to output a virtual reality image, or the data set has a format operable for instructing an energy device to output an augmented reality image.

In one embodiment, each virtual aperture is intersected by a number of rays. In another embodiment, the data set has a format operable for instructing an energy device to output an image from a multiple number of views, where the multiple numbers of views correspond to the number of rays that intersect each virtual aperture.

BRIEF DESCRIPTION OF THE DRAWINGS

FIG. 7D illustrates a front perspective view of the embodiment shown in FIG. 7C;

DETAILED DESCRIPTION

Figure 1:
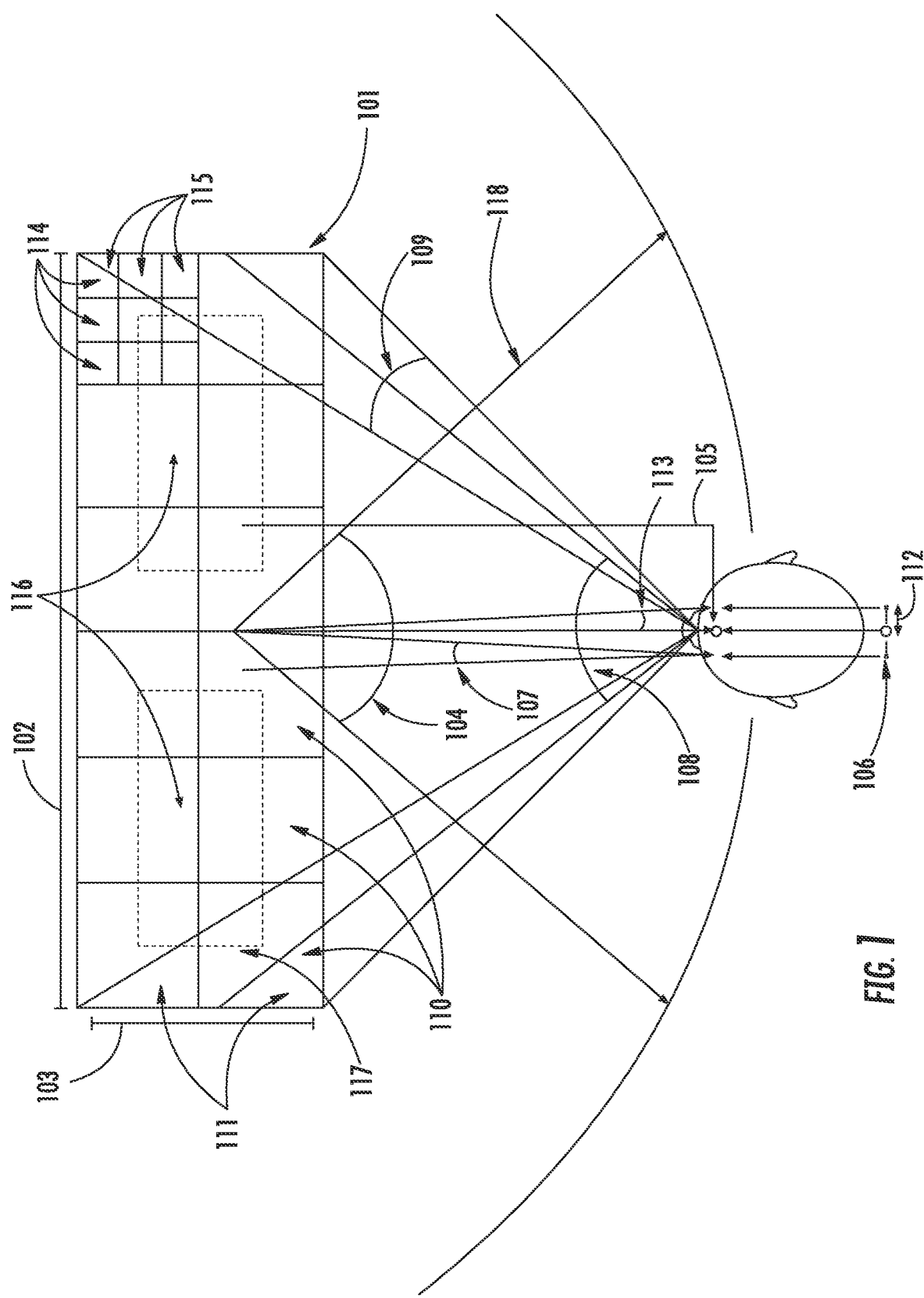
FIG. 1 is a schematic diagram illustrating design parameters for an energy directing system.

An embodiment of a Holodeck (collectively called "Holodeck Design Parameters") provide sufficient energy stimulus to fool the human sensory receptors into believing that received energy impulses within a virtual, social and interactive environment are real, providing: 1) binocular disparity without external accessories, head-mounted eyewear, or other peripherals; 2) accurate motion parallax, occlusion and opacity throughout a viewing volume simultaneously for any number of viewers; 3) visual focus through synchronous convergence, accommodation and miosis of the eye for all perceived rays of light; and 4) converging energy wave propagation of sufficient density and resolution to exceed the human sensory "resolution" for vision, hearing, touch, taste, smell, and/or balance.

Based upon conventional technology to date, we are decades, if not centuries away from a technology capable of providing for all receptive fields in a compelling way as suggested by the Holodeck Design Parameters including the visual, auditory, somatosensory, gustatory, olfactory, and vestibular systems.

In this disclosure, the terms light field and holographic may be used interchangeably to define the energy propagation for stimulation of any sensory receptor response. While initial disclosures may refer to examples of energy and mechanical energy propagation through energy surfaces for holographic imagery and volumetric haptics, all forms of sensory receptors are envisioned in this disclosure. Furthermore, the principles disclosed herein for energy propagation along propagation paths may be applicable to both energy emission and energy capture.

Many technologies exist today that are often unfortunately confused with holograms including lenticular printing, Pepper's Ghost, glasses-free stereoscopic displays, horizontal parallax displays, head-mounted VR and AR displays (HMD), and other such illusions generalized as "fauxlography." These technologies may exhibit some of the desired properties of a true holographic display, however, lack the ability to stimulate the human visual sensory response in any way sufficient to address at least two of the four identified Holodeck Design Parameters.

These challenges have not been successfully implemented by conventional technology to produce a seamless energy surface sufficient for holographic energy propagation. There are various approaches to implementing volumetric and direction multiplexed light field displays including parallax barriers, hogels, voxels, diffractive optics, multi-view projection, holographic diffusers, rotational mirrors, multilayered displays, time sequential displays, head mounted display, etc., however, conventional approaches may involve a compromise on image quality, resolution, angular sampling density, size, cost, safety, frame rate, etc., ultimately resulting in an unviable technology.

To achieve the Holodeck Design Parameters for the visual, auditory, somatosensory systems, the human acuity of each of the respective systems is studied and understood to propagate energy waves to sufficiently fool the human sensory receptors. The visual system is capable of resolving to approximately 1 arc min, the auditory system may distinguish the difference in placement as little as three degrees, and the somatosensory system at the hands are capable of discerning points separated by 2-12 mm. While there are various and conflicting ways to measure these acuities, these values are sufficient to understand the systems and methods to stimulate perception of energy propagation.

Of the noted sensory receptors, the human visual system is by far the most sensitive given that even a single photon can induce sensation. For this reason, much of this introduction will focus on visual energy wave propagation, and vastly lower resolution energy systems coupled within a disclosed energy waveguide surface may converge appropriate signals to induce holographic sensory perception. Unless otherwise noted, all disclosures apply to all energy and sensory domains.

When calculating for effective design parameters of the energy propagation for the visual system given a viewing volume and viewing distance, a desired energy surface may be designed to include many gigapixels of effective energy location density. For wide viewing volumes, or near field viewing, the design parameters of a desired energy surface may include hundreds of gigapixels or more of effective energy location density. By comparison, a desired energy source may be designed to have I to 250 effective megapixels of energy location density for ultrasonic propagation of volumetric haptics or an array of 36 to 3,600 effective energy locations for acoustic propagation of holographic sound depending on input environmental variables. What is important to note is that with a disclosed bi-directional energy surface architecture, all components may be configured to form the appropriate structures for any energy domain to enable holographic propagation.

However, the main challenge to enable the Holodeck today involves available visual technologies and energy device limitations. Acoustic and ultrasonic devices are less challenging given the orders of magnitude difference in desired density based upon sensory acuity in the respective receptive field, although the complexity should not be underestimated. While holographic emulsion exists with resolutions exceeding the desired density to encode interference patterns in static imagery, state-of-the-art display devices are limited by resolution, data throughput and manufacturing feasibility. To date, no singular display device has been able to meaningfully produce a light field having near holographic resolution for visual acuity.

Production of a single silicon-based device capable of meeting the desired resolution for a compelling light field display may not practical and may involve extremely complex fabrication processes beyond the current manufacturing capabilities. The limitation to tiling multiple existing display devices together involves the seams and gap formed by the physical size of packaging, electronics, enclosure, optics and a number of other challenges that inevitably result in an unviable technology from an imaging, cost and/or a size standpoint.

The embodiments disclosed herein may provide a real-world path to building the Holodeck.

Example embodiments will now be described hereinafter with reference to the accompanying drawings, which form a part hereof, and which illustrate example embodiments which may be practiced. As used in the disclosures and the appended claims, the terms "embodiment", example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a, an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

Holographic System Considerations

Overview of Light Field Energy Propagation Resolution

Light field and holographic display is the result of a plurality of projections where energy surface locations provide angular, color and intensity information propagated within a viewing volume. The disclosed energy surface provides opportunities for additional information to coexist and propagate through the same surface to induce other sensory system responses. Unlike a stereoscopic display, the viewed position of the converged energy propagation paths in space do not vary as the viewer moves around the viewing volume and any number of viewers may simultaneously see propagated objects in real-world space as if it was truly there. In some embodiments, the propagation of energy may be located in the same energy propagation path but in opposite directions. For example, energy emission and energy capture along an energy propagation path are both possible in some embodiments of the present disclosed.

FIG. 1 is a schematic diagram illustrating variables relevant for stimulation of sensory receptor response. These variables may include surface diagonal 101, surface width 102, surface height 103, a determined target seating distance 118, the target seating field of view field of view from the center of the display 104, the number of intermediate samples demonstrated here as samples between the eyes 105, the average adult interocular separation 106, the average resolution of the human eye in arcmin 107, the horizontal field of view formed between the target viewer location and the surface width 108, the vertical field of view formed between the target viewer location and the surface height 109, the resultant horizontal waveguide element resolution, or total number of elements, across the surface 110, the resultant vertical waveguide element resolution, or total number of elements, across the surface 111, the sample distance based upon the inter-ocular spacing between the eyes and the number of intermediate samples for angular projection between the eyes 112, the angular sampling may be based upon the sample distance and the target seating distance 113, the total resolution Horizontal per waveguide element derived from the angular sampling desired 114, the total resolution Vertical per waveguide element derived from the angular sampling desired 115, device Horizontal is the count of the determined number of discreet energy sources desired 116, and device Vertical is the count of the determined number of discreet energy sources desired 117.

A method to understand the desired minimum resolution may be based upon the following criteria to ensure sufficient stimulation of visual (or other) sensory receptor response: surface size (e.g., 84" diagonal), surface aspect ratio (e.g., 16:9), seating distance (e.g., 128" from the display), seating field of view (e.g., 120 degrees or +/−60 degrees about the center of the display), desired intermediate samples at a distance (e.g., one additional propagation path between the eyes), the average inter-ocular separation of an adult (approximately 65 mm), and the average resolution of the human eye (approximately I arcmin). These example values should be considered placeholders depending on the specific application design parameters.

Further, each of the values attributed to the visual sensory receptors may be replaced with other systems to determine desired propagation path parameters. For other energy propagation embodiments, one may consider the auditory system's angular sensitivity as low as three degrees, and the somatosensory system's spatial resolution of the hands as small as 2-12 mm.

While there are various and conflicting ways to measure these sensory acuities, these values are sufficient to understand the systems and methods to stimulate perception of virtual energy propagation. There are many ways to consider the design resolution, and the below proposed methodology combines pragmatic product considerations with the biological resolving limits of the sensory systems. As will be appreciated by one of ordinary skill in the art, the following overview is a simplification of any such system design, and should be considered for exemplary purposes only.

With the resolution limit of the sensory system understood, the total energy waveguide element density may be calculated such that the receiving sensory system cannot discern a single energy waveguide element from an adjacent element, given:

$$\text{Surface Aspect Ratio} = \frac{\text{Width }(W)}{\text{Height }(H)}$$

$$\text{Surface Horizontal Size} = \text{Surface Diagonal} * \left( \frac{1}{\sqrt{1 + \left(\frac{H}{W}\right)^2}} \right)$$

$$\text{Surface Vertical Size} = \text{Surface Diagonal} * \left( \frac{1}{\sqrt{1 + \left(\frac{W}{H}\right)^2}} \right)$$

$$\text{Horizontal Field of View} = 2 * \text{atan}\left( \frac{\text{Surface Horizontal Size}}{2 * \text{Seating Distance}} \right)$$

$$\text{Vertical Field of View} = 2 * \text{atan}\left( \frac{\text{Surface Vertical Size}}{2 * \text{Seating Distance}} \right)$$

$$\text{Horizontal Element Resolution} = \text{Horizontal } FoV * \frac{60}{\text{Eye Resolution}}$$

$$\text{Vertical Element Resolution} = \text{Vertical } FoV * \frac{60}{\text{Eye Resolution}}$$

The above calculations result in approximately a 32×180 field of view resulting in approximately 1920×1080 (rounded to nearest format) energy waveguide elements being desired. One may also constrain the variables such that the field of view is consistent for both (u, v) to provide a more regular spatial sampling of energy locations (e.g. pixel aspect ratio). The angular sampling of the system assumes a defined target viewing volume location and additional propagated energy paths between two points at the optimized distance, given:

$$\text{Sample Distance} = \frac{\text{Inter-Ocular Distance}}{(\text{Number of Desired Intermediate Samples} + 1)}$$

$$\text{Angular Sampling} = \text{atan}\left( \frac{\text{Sample Distance}}{\text{Seating Distance}} \right)$$

In this case, the inter-ocular distance is leveraged to calculate the sample distance although any metric may be leveraged to account for appropriate number of samples as a given distance. With the above variables considered, approximately one ray per 0.57° may be desired and the total system resolution per independent sensory system may be determined, given:

$$\text{Locations Per Element}(N) = \frac{\text{Seating } FoV}{\text{Angular Sampling}}$$

$$\text{Total Resolution } H = N * \text{Horizontal Element Resolution}$$

$$\text{Total Resolution } V = N * \text{Vertical Element Resolution}$$

With the above scenario given the size of energy surface and the angular resolution addressed for the visual acuity system, the resultant energy surface may desirably include approximately 400 k×225 k pixels of energy resolution locations, or 90 gigapixels holographic propagation density. These variables provided are for exemplary purposes only and many other sensory and energy metrology considerations should be considered for the optimization of holographic propagation of energy. In an additional embodiment, 1 gigapixel of energy resolution locations may be desired based upon the input variables. In an additional embodiment, 1,000 gigapixels of energy resolution locations may be desired based upon the input variables.

Current Technology Limitations

Active Area, Device Electronics, Packaging, and the Mechanical Envelope

Figure 2:
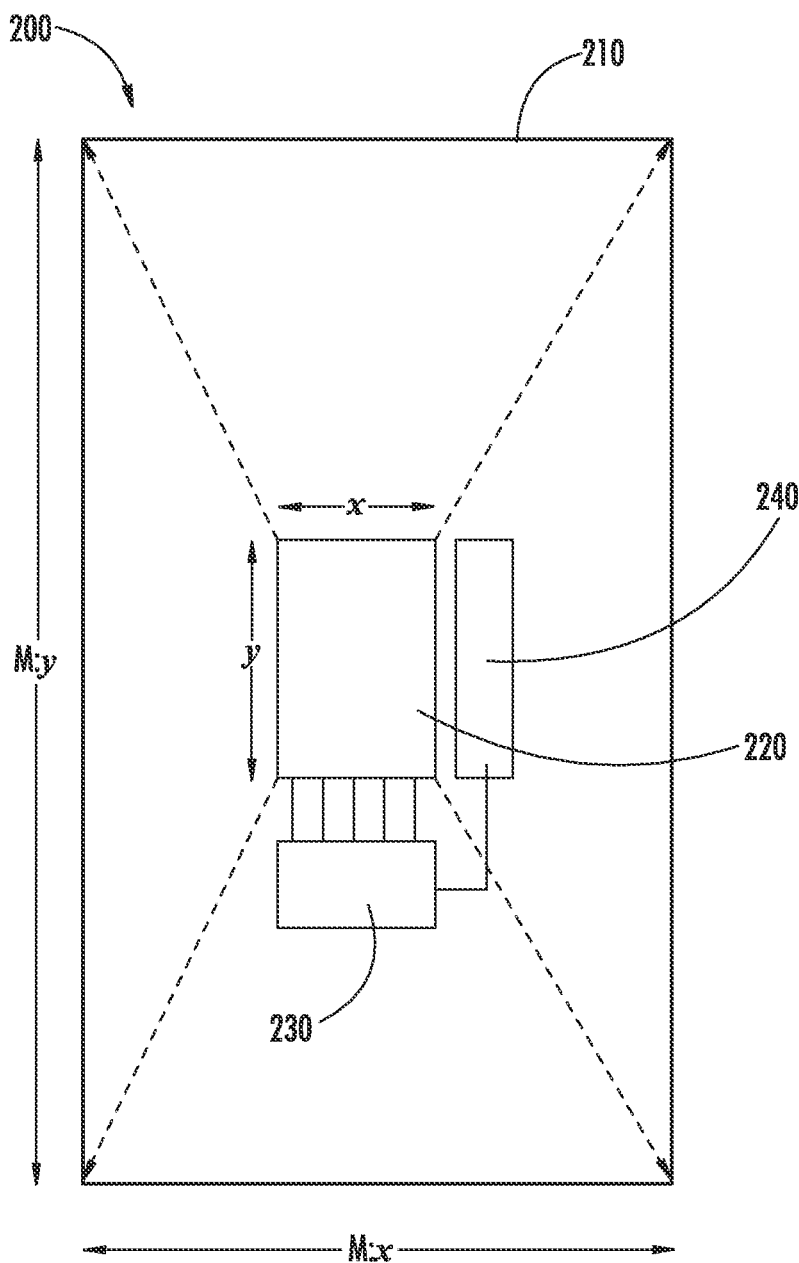
FIG. 2 is a schematic diagram illustrating an energy system having an active device area with a mechanical envelope.

FIG. 2 illustrates a device 200 having an active area 220 with a certain mechanical form factor. The device 200 may include drivers 230 and electronics 240 for powering and interface to the active area 220, the active area having a dimension as shown by the x and y arrows. This device 200 does not take into account the cabling and mechanical structures to drive, power and cool components, and the mechanical footprint may be further minimized by introducing a flex cable into the device 200. The minimum footprint for such a device 200 may also be referred to as a mechanical envelope 210 having a dimension as shown by the M:x and M:y arrows. This device 200 is for illustration purposes only and custom electronics designs may further decrease the mechanical envelope overhead, but in almost all cases may not be the exact size of the active area of the device. In an embodiment, this device 200 illustrates the dependency of electronics as it relates to active image area 220 for a micro OLED, DLP chip or LCD panel, or any other technology with the purpose of image illumination.

In some embodiments, it may also be possible to consider other projection technologies to aggregate multiple images onto a larger overall display. However, this may come at the cost of greater complexity for throw distance, minimum focus, optical quality, uniform field resolution, chromatic aberration, thermal properties, calibration, alignment, additional size or form factor. For most practical applications, hosting tens or hundreds of these projection sources 200 may result in a design that is much larger with less reliability.

For exemplary purposes only, assuming energy devices with an energy location density of 3840×2160 sites, one may determine the number of individual energy devices (e.g., device 100) desired for an energy surface given:

$$\text{Devices } H = \frac{\text{Total Resolution } H}{\text{Device Resolution } H}$$

$$\text{Devices } V = \frac{\text{Total Resolution } V}{\text{Device Resolution } V}$$

Given the above resolution considerations, approximately 105×105 devices similar to those shown in FIG. 2 may be desired. It should be noted that many devices consist of various pixel structures that may or may not map to a regular grid. In the event that there are additional sub-pixels or locations within each full pixel, these may be exploited to generate additional resolution or angular density. Additional signal processing may be used to determine how to convert the light field into the correct (u,v) coordinates depending on the specified location of the pixel structure(s) and can be an explicit characteristic of each device that is known and calibrated. Further, other energy domains may involve a different handling of these ratios and device structures, and those skilled in the art will understand the direct intrinsic relationship between each of the desired frequency domains. This will be shown and discussed in more detail in subsequent disclosure.

The resulting calculation may be used to understand how many of these individual devices may be desired to produce a full resolution energy surface. In this case, approximately 105×105 or approximately 11,080 devices may be desired to achieve the visual acuity threshold. The challenge and novelty exists within the fabrication of a seamless energy surface from these available energy locations for sufficient sensory holographic propagation.

Summary of Seamless Energy Surfaces

Configurations and Designs for Arrays of Energy Relays

In some embodiments, approaches are disclosed to address the challenge of generating high energy location density from an array of individual devices without seams due to the limitation of mechanical structure for the devices. In an embodiment, an energy propagating relay system may allow for an increase the effective size of the active device area to meet or exceed the mechanical dimensions to configure an array of relays and form a singular seamless energy surface.

Figure 3:
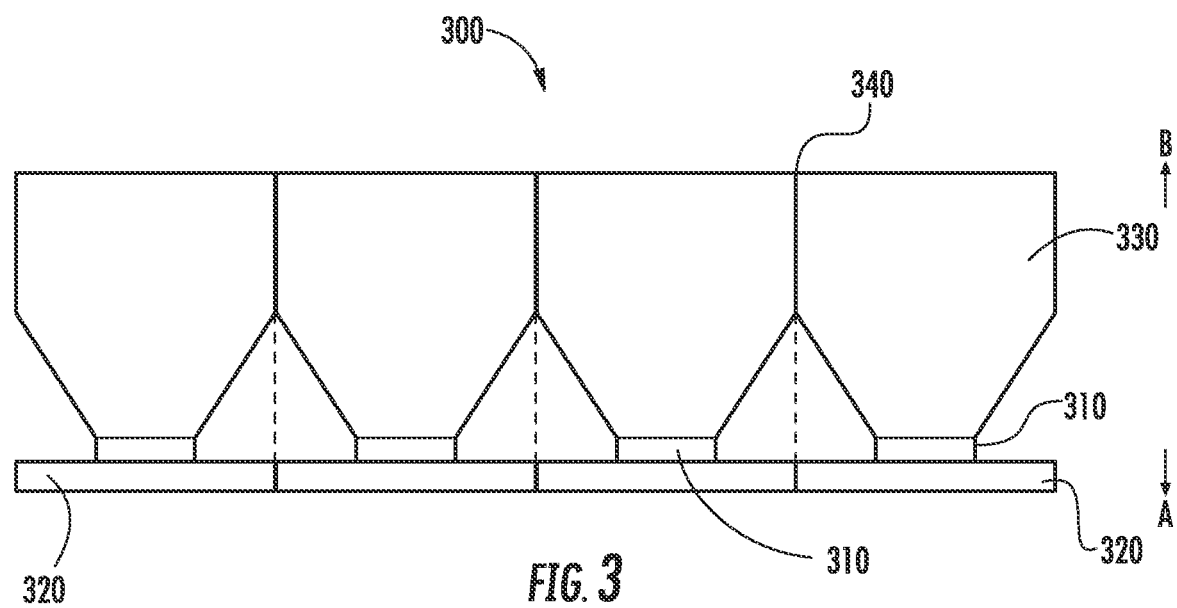
FIG. 3 is a schematic diagram illustrating an energy relay system.

FIG. 3 illustrates an embodiment of such an energy relay system 300. As shown, the relay system 300 may include a device 310 mounted to a mechanical envelope 320, with an energy relay element 330 propagating energy from the device 310. The relay element 330 may be configured to provide the ability to mitigate any gaps 340 that may be produced when multiple mechanical envelopes 320 of the device are placed into an array of multiple devices 310.

For example, if a device's active area 310 is 20 mm×10 mm and the mechanical envelope 320 is 40 mm×20 mm, an energy relay element 330 may be designed with a magnification of 2:1 to produce a tapered form that is approximately 20 mm×10 mm on a minified end (arrow A) and 40 mm×20 mm on a magnified end (arrow B), providing the ability to align an array of these elements 330 together seamlessly without altering or colliding with the mechanical envelope 320 of each device 310. Mechanically, the relay elements 330 may be bonded or fused together to align and polish ensuring minimal seam gap 340 between devices 310. In one such embodiment, it is possible to achieve a seam gap 340 smaller than the visual acuity limit of the eye.

Figure 4:
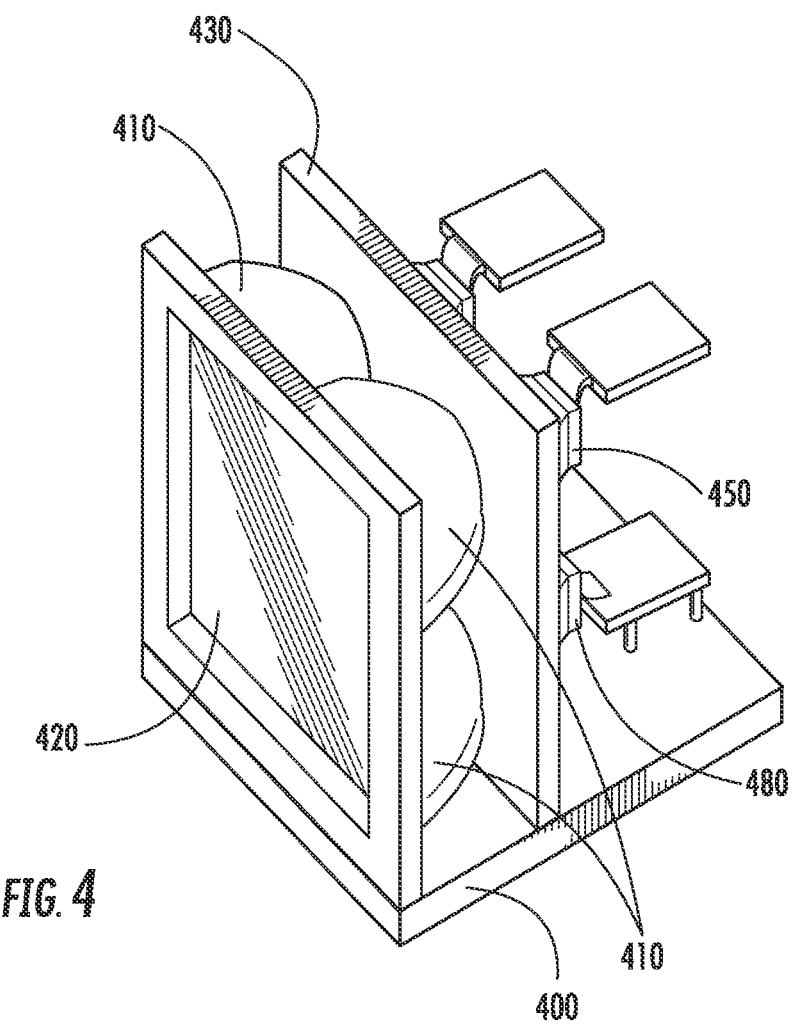
FIG. 4 is a schematic diagram illustrating an embodiment of energy relay elements adhered together and fastened to a base structure.

FIG. 4 illustrates an example of a base structure 400 having energy relay elements 410 formed together and securely fastened to an additional mechanical structure 430. The mechanical structure of the seamless energy surface 420 provides the ability to couple multiple energy relay elements 410, 450 in series to the same base structure through bonding or other mechanical processes to mount relay elements 410, 450. In some embodiments, each relay element 410 may be fused, bonded, adhered, pressure fit, aligned or otherwise attached together to form the resultant seamless energy surface 420. In some embodiments, a device 480 may be mounted to the rear of the relay element 410 and aligned passively or actively to ensure appropriate energy location alignment within the determined tolerance is maintained.

In an embodiment, the seamless energy surface comprises one or more energy locations and one or more energy relay element stacks comprise a first and second side and each energy relay element stack is arranged to form a singular seamless energy surface directing energy along propagation paths extending between one or more energy locations and the seamless energy surface, and where the separation between the edges of any two adjacent second sides of the terminal energy relay elements is less than the minimum perceptible contour as defined by the visual acuity of a human eye having better than 20/40 vision at a distance greater than the width of the singular seamless energy surface.

In an embodiment, each of the seamless energy surfaces comprise one or more energy relay elements each with one or more structures forming a first and second surface with a transverse and longitudinal orientation. The first relay surface has an area different than the second resulting in positive or negative magnification and configured with explicit surface contours for both the first and second surfaces passing energy through the second relay surface to substantially fill a +/−10 degree angle with respect to the normal of the surface contour across the entire second relay surface.

In an embodiment, multiple energy domains may be configured within a single, or between multiple energy relays to direct one or more sensory holographic energy propagation paths including visual, acoustic, tactile or other energy domains.

In an embodiment, the seamless energy surface is configured with energy relays that comprise two or more first sides for each second side to both receive and emit one or more energy domains simultaneously to provide bi-directional energy propagation throughout the system.

In an embodiment, the energy relays are provided as loose coherent elements.

Introduction to Component Engineered Structures

Disclosed Advances in Transverse Anderson Localization Energy Relays

The properties of energy relays may be significantly optimized according to the principles disclosed herein for energy relay elements that induce Transverse Anderson Localization. Transverse Anderson Localization is the propagation of a ray transported through a transversely disordered but longitudinally consistent material.

This implies that the effect of the materials that produce the Anderson Localization phenomena may be less impacted by total internal reflection than by the randomization between multiple-scattering paths where wave interference can completely limit the propagation in the transverse orientation while continuing in the longitudinal orientation.

Of significant additional benefit is the elimination of the cladding of traditional multi-core optical fiber materials. The cladding is to functionally eliminate the scatter of energy between fibers, but simultaneously act as a barrier to rays of energy thereby reducing transmission by at least the core to clad ratio (e.g., a core to clad ratio of 70:30 will transmit at best 70% of received energy transmission) and additionally forms a strong pixelated patterning in the propagated energy.

Figure 5A:
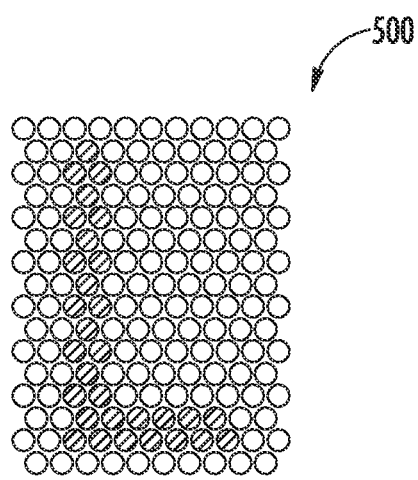
FIG. 5A is a schematic diagram illustrating an example of a relayed image through multi-core optical fibers.

FIG. 5A illustrates an end view of an example of one such non-Anderson Localization energy relay 500, wherein an image is relayed through multi-core optical fibers where pixilation and fiber noise may be exhibited due to the intrinsic properties of the optical fibers. With traditional multi-mode and multi-core optical fibers, relayed images may be intrinsically pixelated due to the properties of total internal reflection of the discrete array of cores where any cross-talk between cores will reduce the modulation transfer function and increase blurring. The resulting imagery produced with traditional multi-core optical fiber tends to have a residual fixed noise fiber pattern similar to those shown in FIG. 3.

Figure 5B:
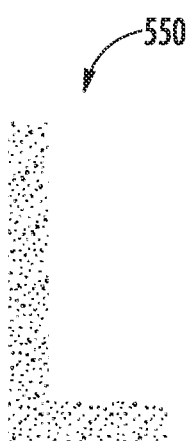
FIG. 5B is a schematic diagram illustrating an example of a relayed image through an energy relay that exhibits the properties of the Transverse Anderson Localization principle.

FIG. 5B, illustrates an example of the same relayed image 550 through an energy relay comprising materials that exhibit the properties of Transverse Anderson Localization, where the relayed pattern has a greater density grain structures as compared to the fixed fiber pattern from FIG. 5A. In an embodiment, relays comprising randomized microscopic component engineered structures induce Transverse Anderson Localization and transport light more efficiently with higher propagation of resolvable resolution than commercially available multi-mode glass optical fibers.

There is significant advantage to the Transverse Anderson Localization material properties in terms of both cost and weight, where a similar optical grade glass material, may cost and weigh upwards of 10 to 100-fold more than the cost for the same material generated within an embodiment, wherein disclosed systems and methods comprise randomized microscopic component engineered structures demonstrating significant opportunities to improve both cost and quality over other technologies known in the art.

In an embodiment, a relay element exhibiting Transverse Anderson Localization may comprise a plurality of at least two different component engineered structures in each of three orthogonal planes arranged in a dimensional lattice and the plurality of structures form randomized distributions of material wave propagation properties in a transverse plane within the dimensional lattice and channels of similar values of material wave propagation properties in a longitudinal plane within the dimensional lattice, wherein localized energy waves propagating through the energy relay have higher transport efficiency in the longitudinal orientation versus the transverse orientation.

In an embodiment, multiple energy domains may be configured within a single, or between multiple Transverse Anderson Localization energy relays to direct one or more sensory holographic energy propagation paths including visual, acoustic, tactile or other energy domains.

In an embodiment, the seamless energy surface is configured with Transverse Anderson Localization energy relays that comprise two or more first sides for each second side to both receive and emit one or more energy domains simultaneously to provide bi-directional energy propagation throughout the system.

In an embodiment, the Transverse Anderson Localization energy relays are configured as loose coherent or flexible energy relay elements.

Considerations for 4D Plenoptic Functions

Selective Propagation of Energy Through Holographic Waveguide Arrays

As discussed above and herein throughout, a light field display system generally includes an energy source (e.g., illumination source) and a seamless energy surface configured with sufficient energy location density as articulated in the above discussion. A plurality of relay elements may be used to relay energy from the energy devices to the seamless energy surface. Once energy has been delivered to the seamless energy surface with the requisite energy location density, the energy can be propagated in accordance with a 4D plenoptic function through a disclosed energy waveguide system. As will be appreciated by one of ordinary skill in the art, a 4D plenoptic function is well known in the art and will not be elaborated further herein.

The energy waveguide system selectively propagates energy through a plurality of energy locations along the seamless energy surface representing the spatial coordinate of the 4D plenoptic function with a structure configured to alter an angular direction of the energy waves passing through representing the angular component of the 4D plenoptic function, wherein the energy waves propagated may converge in space in accordance with a plurality of propagation paths directed by the 4D plenoptic function.

Figure 6:
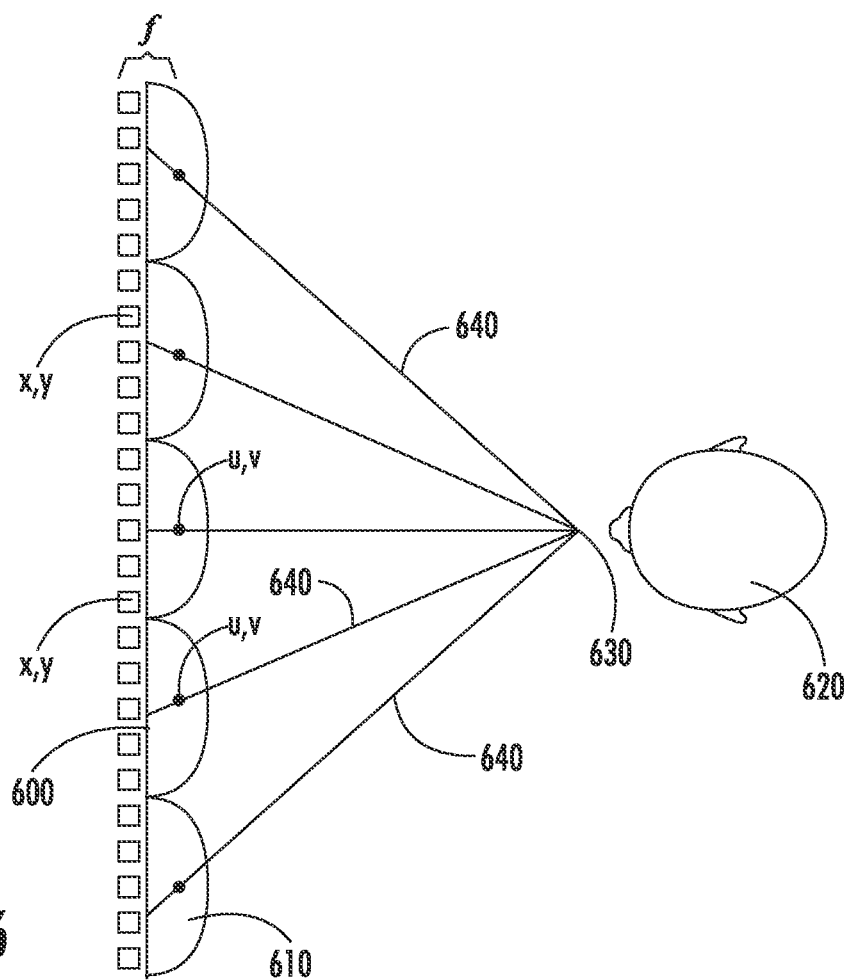
FIG. 6 is a schematic diagram showing rays propagated from an energy surface to a viewer.

Reference is now made to FIG. 6 illustrating an example of light field energy surface in 4D image space in accordance with a 4D plenoptic function. The figure shows ray traces of an energy surface 600 to a viewer 620 in describing how the rays of energy converge in space 630 from various positions within the viewing volume. As shown, each waveguide element 610 defines four dimensions of information describing energy propagation 640 through the energy surface 600. Two spatial dimensions (herein referred to as x and y) are the physical plurality of energy locations that can be viewed in image space, and the angular components theta and phi (herein referred to as u and v), which is viewed in virtual space when projected through the energy waveguide array. In general, and in accordance with a 4D plenoptic function, the plurality of waveguides (e.g., lenslets) are able to direct an energy location from the x, y dimension to a unique location in virtual space, along a direction defined by the u, v angular component, in forming the holographic or light field system described herein.

However, one skilled in the art will understand that a significant challenge to light field and holographic display technologies arises from uncontrolled propagation of energy due designs that have not accurately accounted for any of diffraction, scatter, diffusion, angular direction, calibration, focus, collimation, curvature, uniformity, element crosstalk, as well as a multitude of other parameters that contribute to decreased effective resolution as well as an inability to accurately converge energy with sufficient fidelity.

In an embodiment, an approach to selective energy propagation for addressing challenges associated with holographic display may include energy inhibiting elements and substantially filling waveguide apertures with near-collimated energy into an environment defined by a 4D plenoptic function.

In an embodiment, an array of energy waveguides may define a plurality of energy propagation paths for each waveguide element configured to extend through and substantially fill the waveguide element's effective aperture in unique directions defined by a prescribed 4D function to a plurality of energy locations along a seamless energy surface inhibited by one or more elements positioned to limit propagation of each energy location to only pass through a single waveguide element.

In an embodiment, multiple energy domains may be configured within a single, or between multiple energy waveguides to direct one or more sensory holographic energy propagations including visual, acoustic, tactile or other energy domains.

In an embodiment, the energy waveguides and seamless energy surface are configured to both receive and emit one or more energy domains to provide bi-directional energy propagation throughout the system.

In an embodiment, the energy waveguides are configured to propagate non-linear or non-regular distributions of energy, including non-transmitting void regions, leveraging digitally encoded, diffractive, refractive, reflective, grin, holographic, Fresnel, or the like waveguide configurations for any seamless energy surface orientation including wall, table, floor, ceiling, room, or other geometry based environments. In an additional embodiment, an energy waveguide element may be configured to produce various geometries that provide any surface profile and/or tabletop viewing allowing users to view holographic imagery from all around the energy surface in a 360-degree configuration.

In an embodiment, the energy waveguide array elements may be reflective surfaces and the arrangement of the elements may be hexagonal, square, irregular, semi-regular, curved, non-planar, spherical, cylindrical, tilted regular, tilted irregular, spatially varying and/or multi-layered.

For any component within the seamless energy surface, waveguide, or relay components may include, but not limited to, optical fiber, silicon, glass, polymer, optical relays, diffractive, holographic, refractive, or reflective elements, optical face plates, energy combiners, beam splitters, prisms, polarization elements, spatial light modulators, active pixels, liquid crystal cells, transparent displays, or any similar materials exhibiting Anderson localization or total internal reflection.

Realizing the Holodeck

Aggregation of Bi-Directional Seamless Energy Surface Systems to Stimulate Human Sensory Receptors within Holographic Environments It is possible to construct large-scale environments of seamless energy surface systems by tiling, fusing, bonding, attaching, and/or stitching multiple seamless energy surfaces together forming arbitrary sizes, shapes, contours or form-factors including entire rooms. Each energy surface system may comprise an assembly having a base structure, energy surface, relays, waveguide, devices, and electronics, collectively configured for bi-directional holographic energy propagation, emission, reflection, or sensing.

In an embodiment, an environment of tiled seamless energy systems is aggregated to form large seamless planar or curved walls including installations comprising up to all surfaces in a given environment, and configured as any combination of seamless, discontinuous planar, faceted, curved, cylindrical, spherical, geometric, or non-regular geometries.

In an embodiment, aggregated tiles of planar surfaces form wall-sized systems for theatrical or venue-based holographic entertainment. In an embodiment, aggregated tiles of planar surfaces cover a room with four to six walls including both ceiling and floor for cave-based holographic installations. In an embodiment, aggregated tiles of curved surfaces produce a cylindrical seamless environment for immersive holographic installations. In an embodiment, aggregated tiles of seamless spherical surfaces form a holographic dome for immersive Holodeck-based experiences.

In an embodiment, aggregates tiles of seamless curved energy waveguides provide mechanical edges following the precise pattern along the boundary of energy inhibiting elements within the energy waveguide structure to bond, align, or fuse the adjacent tiled mechanical edges of the adjacent waveguide surfaces, resulting in a modular and seamless energy waveguide system.

In a further embodiment of an aggregated tiled environment, energy is propagated bi-directionally for multiple simultaneous energy domains. In an additional embodiment, the energy surface provides the ability to both display and capture simultaneously from the same energy surface with waveguides designed such that light field data may be projected by an illumination source through the waveguide and simultaneously received through the same energy surface. In an additional embodiment, additional depth sensing and active scanning technologies may be leveraged to allow for the interaction between the energy propagation and the viewer in correct world coordinates. In an additional embodiment, the energy surface and waveguide are operable to emit, reflect or converge frequencies to induce tactile sensation or volumetric haptic feedback. In some embodiments, any combination of bi-directional energy propagation and aggregated surfaces are possible.

In an embodiment, the system comprises an energy waveguide capable of bidirectional emission and sensing of energy through the energy surface with one or more energy devices independently paired with two-or-more-path energy combiners to pair at least two energy devices to the same portion of the seamless energy surface, or one or more energy devices are secured behind the energy surface, proximate to an additional component secured to the base structure, or to a location in front and outside of the FOV of the waveguide for off-axis direct or reflective projection or sensing, and the resulting energy surface provides for bi-directional transmission of energy allowing the waveguide to converge energy, a first device to emit energy and a second device to sense energy, and where the information is processed to perform computer vision related tasks including, but not limited to, 4D plenoptic eye and retinal tracking or sensing of interference within propagated energy patterns, depth estimation, proximity, motion tracking, image, color, or sound formation, or other energy frequency analysis. In an additional embodiment, the tracked positions actively calculate and modify positions of energy based upon the interference between the bi-directional captured data and projection information.

In some embodiments, a plurality of combinations of three energy devices comprising an ultrasonic sensor, a visible energy display, and an ultrasonic emitting device are configured together for each of three first relay surfaces propagating energy combined into a single second energy relay surface with each of the three first surfaces comprising engineered properties specific to each device's energy domain, and two engineered waveguide elements configured for ultrasonic and energy respectively to provide the ability to direct and converge each device's energy independently and substantially unaffected by the other waveguide elements that are configured for a separate energy domain.

In some embodiments, disclosed is a calibration procedure to enable efficient manufacturing to remove system artifacts and produce a geometric mapping of the resultant energy surface for use with encoding/decoding technologies as well as dedicated integrated systems for the conversion of data into calibrated information appropriate for energy propagation based upon the calibrated configuration files.

In some embodiments, additional energy waveguides in series and one or more energy devices may be integrated into a system to produce opaque holographic pixels.

In some embodiments, additional waveguide elements may be integrated comprising energy inhibiting elements, beam-splitters, prisms, active parallax barriers or polarization technologies in order to provide spatial and/or angular resolutions greater than the diameter of the waveguide or for other super-resolution purposes.

In some embodiments, the disclosed energy system may also be configured as a wearable bi-directional device, such as virtual reality (VR) or augmented reality (AR). In other embodiments, the energy system may include adjustment optical element(s) that cause the displayed or received energy to be focused proximate to a determined plane in space for a viewer. In some embodiments, the waveguide array may be incorporated to holographic head-mounted-display. In other embodiments, the system may include multiple optical paths to allow for the viewer to see both the energy system and a real-world environment (e.g., transparent holographic display). In these instances, the system may be presented as near field in addition to other methods.

In some embodiments, the transmission of data comprises encoding processes with selectable or variable compression ratios that receive an arbitrary dataset of information and metadata; analyze said dataset and receive or assign material properties, vectors, surface IDs, new pixel data forming a more sparse dataset, and wherein the received data may comprise: 2D, stereoscopic, multi-view, metadata, light field, holographic, geometry, vectors or vectorized metadata, and an encoder/decoder may provide the ability to convert the data in real-time or off-line comprising image processing for: 2D; 2D plus depth, metadata or other vectorized information; stereoscopic, stereoscopic plus depth, metadata or other vectorized information; multi-view; multi-view plus depth, metadata or other vectorized information; holographic; or light field content; through depth estimation algorithms, with or without depth metadata; and an inverse ray tracing methodology appropriately maps the resulting converted data produced by inverse ray tracing from the various 2D, stereoscopic, multi-view, volumetric, light field or holographic data into real world coordinates through a characterized 4D plenoptic function. In these embodiments, the total data transmission desired may be multiple orders of magnitudes less transmitted information than the raw light field dataset.

Energy Directing Devices Suitable for Presenting Holographic Sensory Data

In an embodiment, the optomechanical display device may be capable of emitting and guiding light to form 2D, stereoscopic, multiview, plenoptic, 4D, volumetric, light field, holographic, or any other visual representation of light.

Figure 7A:
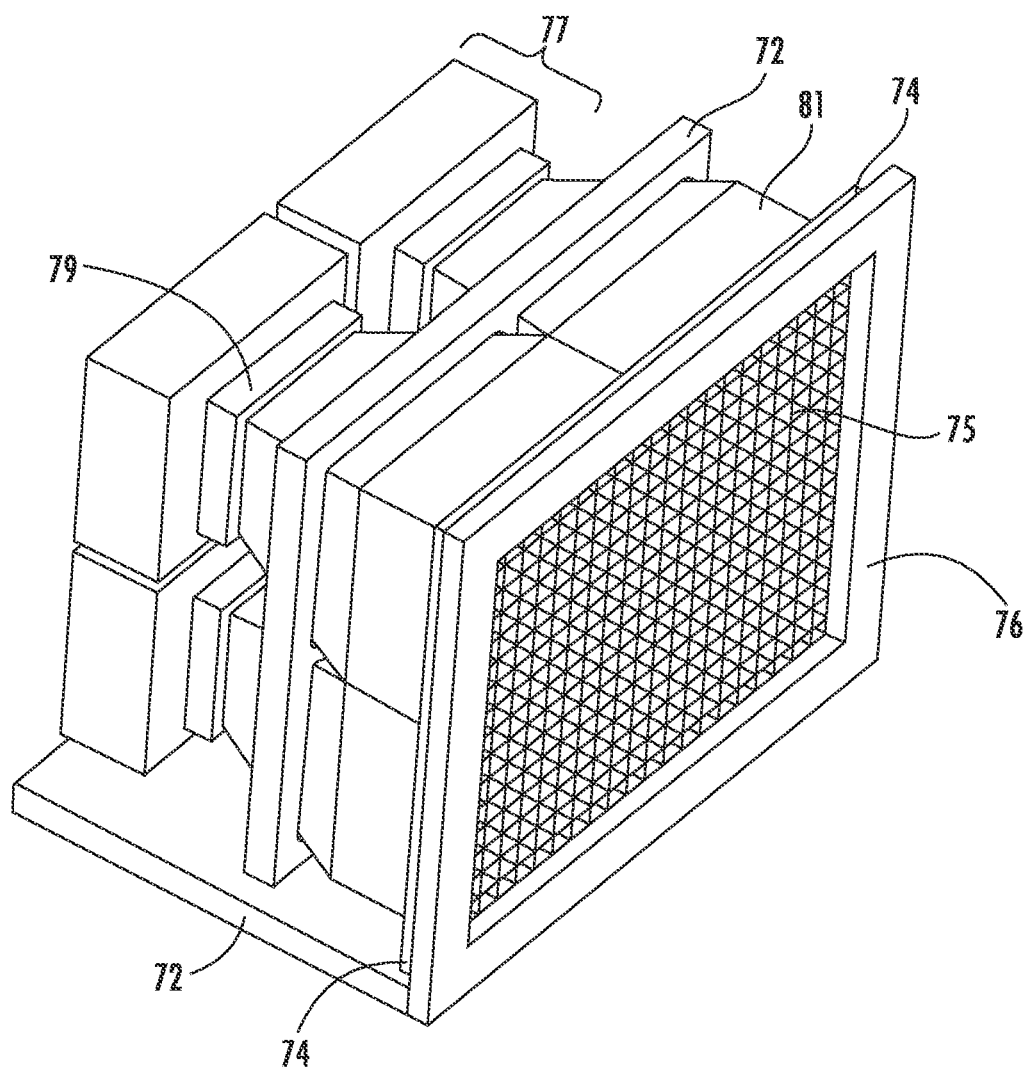
FIG. 7A illustrates a perspective view of an energy waveguide system having a base structure, four energy devices, and four energy relay elements forming a seamless energy surface, in accordance with one embodiment of the present disclosure.

FIG. 7A is an example of a light field optomechanical system if configured with emissive display devices, optical relays, and a waveguide that is realized as an array of refractive elements such as a micro lens array, where a visible image from one or more displays may be optically relayed before being transmitted to the energy surface, where the array of refractive elements provides a mapping between each location on the energy surface and the direction of projection of the light from that location, such that a 4D volumetric light field image may be projected.

In an embodiment, the waveguide may be operable to converge rays of light to induce both vergence and accommodation from an observer point of view.

In an embodiment, the waveguides and energy relays may be formed or polished with various surface geometries. In an embodiment, the energy relays include elements that induce transverse Anderson localization. In an embodiment, the energy relays are bidirectional and may both emit and/or project energy.

In one embodiment, an energy system configured to direct energy according to a four-dimensional (4D) plenoptic function includes a plurality of energy devices. In some embodiments, the plurality of energy devices include illumination sources emitting image information, where the image information includes emissive, projection, or reflective display technologies, leveraging visible, IR, UV, coherent, laser, infrared, polarized or any other electromagnetic illumination source. In other embodiments, the plurality of energy devices include mechanical energy emitting devices configured to provide immersive audio or volumetric tactile sensation from an acoustic field.

In some embodiments, the energy system as configured above may further include a base structure (e.g., 72) such that the plurality of energy devices, the energy relay system, and the energy waveguide system may all be coupled to the base structure. In other embodiments, the plurality of energy devices, the energy relay system and the energy waveguide system may be coupled to the base structure with one or more mounting brackets.

In some embodiments, the plurality of energy devices include energy devices for capturing or sensing energy, including mechanical, chemical, transfer, thermal, electric, potential, kinetic, magnetic, gravitational, radiant, energy, structured, unstructured, or other forms of energy. In other embodiments, the plurality of energy devices include energy devices for propagating or emitting energy, including mechanical, chemical, transfer, thermal, electric, potential, kinetic, magnetic, gravitational, radiant, energy, structured, unstructured, or other forms of energy. In yet other embodiments, the plurality of energy devices include acoustic receiving devices configured to provide sensory feedback or audible controls.

Figure 7B:
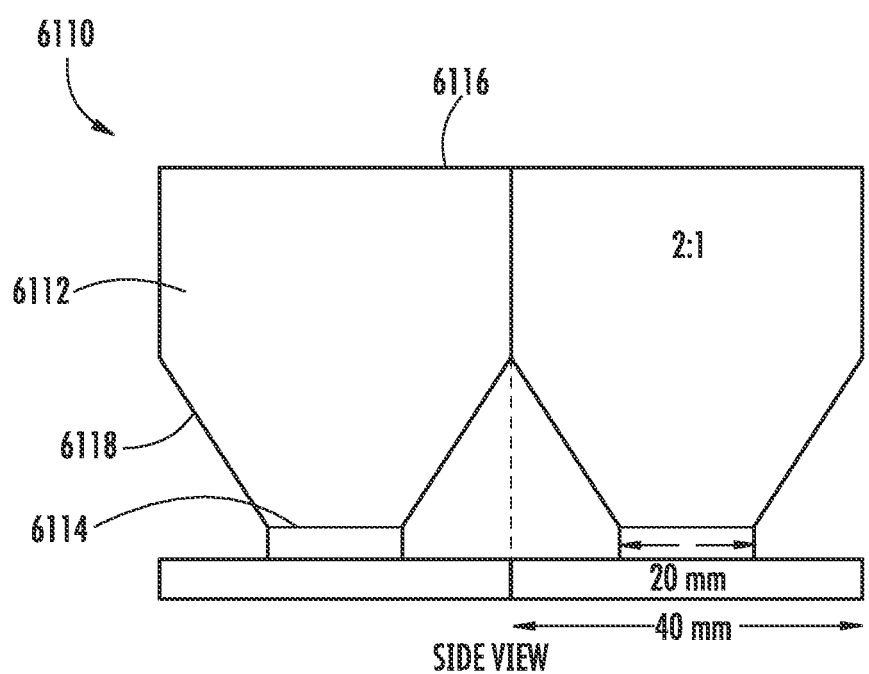
FIG. 7B illustrates an energy relay system according to one embodiment of the present disclosure.

In one embodiment, the energy system further includes an energy relay system (e.g., 6110 as best shown in FIG. 7B) having one or more energy relay elements, where each of the one or more energy relay elements includes a first surface and a second surface, the second surface of the one or more energy relay elements being arranged to form a singular seamless energy surface of the energy relay system, and where a first plurality of energy propagation paths extend from the energy locations in the plurality of energy devices through the singular seamless energy surface of the energy relay system. This will be discussed in more detail below.

Reference is now made to FIG. 7B illustrating an energy relay system 6110, in an orthogonal view in accordance with one embodiment of the present disclosure. In one embodiment, the energy relay system 6110 may include two or more relay elements 6112, each relay element 6112 formed of one or more structures, each relay element 6112 having a first surface 6114, a second surface 6116, a transverse orientation (generally parallel to the surfaces 6114, 6116) and a longitudinal orientation (generally perpendicular to the surfaces 6114, 6116). In one embodiment, the surface area of the first surface 6114 may be different than the surface area of the second surface 6116. For example, the surface area of the first surface 6114 may be greater or lesser than the surface area of the second surface 6116. In another embodiment, the surface area of the first surface 114 may be the same as the surface area of the second surface 6116. Energy waves can pass from the first surface 6114 to the second surface 6116, or vice versa.

In one embodiment, the relay element 6112 of the energy relay system 6110 includes a sloped profile portion 6118 between the first surface 6114 and the second surface 6116. In operation, energy waves propagating between the first surface 6114 and the second surface 6116 may have a higher transport efficiency in the longitudinal orientation than in the transverse orientation, and energy waves passing through the relay element 6112 may result in spatial magnification or spatial de-magnification. In other words, energy waves passing through the relay element 6112 of the relay element device 6110 may experience increased magnification or decreased magnification. In some embodiments, the one or more structures for forming the energy relay element 6110 may include glass, carbon, optical fiber, optical film, plastic, polymer, or mixtures thereof.

In one embodiment, the energy waves passing through the first surface 6114 has a first resolution, while the energy waves passing through the second surface 6116 has a second resolution, and the second resolution is no less than about 50% of the first resolution. In another embodiment, the energy waves, while having a uniform profile when presented to the first surface, may pass through the second surface radiating in every direction with an energy density in the forward direction that substantially fills a cone with an opening angle of +/−10 degrees relative to the normal to the second surface, irrespective of location on the second relay surface.

In some embodiments, the first surface 6114 may be configured to receive energy from an energy wave source, the energy wave source including a mechanical envelope having a width different than the width of at least one of the first surface 6114 and the second surface 6116.

In each relay 6112, energy is transported between first and second surfaces which defines the longitudinal orientation, the first and second surfaces of each of the relays extends generally along a transverse orientation defined by the first and second directions, where the longitudinal orientation is substantially normal to the transverse orientation. In one embodiment, energy waves propagating through the plurality of relays have higher transport efficiency in the longitudinal orientation than in the transverse orientation due to randomized refractive index variability in the transverse orientation coupled with minimal refractive index variation in the longitudinal orientation. In some embodiments where each relay is constructed of multicore fiber, the energy waves propagating within each relay element may travel in the longitudinal orientation determined by the alignment of fibers in this orientation.

In an embodiment, a separation between the edges of any two adjacent second sides of the terminal energy relay elements may be less than a minimum perceptible contour as defined by the visual acuity of a human eye having better than 20/40 vision at a distance from the seamless energy surface that is greater than the lesser of a height of the singular seamless energy surface or a width of the singular seamless energy surface.

In one embodiment, the plurality of energy relay elements in the stacked configuration may include a plurality of faceplates. In some embodiments, the plurality of faceplates may have different lengths or are loose coherent optical relays. In other embodiments, the plurality of elements may have sloped profile portions similar to that of FIG. 7B, where the sloped profile portions may be angled, linear, curved, tapered, faceted or aligned at a non-perpendicular angle relative to a normal axis of the relay element. In yet another embodiment, energy waves propagating through the plurality of relay elements have higher transport efficiency in the longitudinal orientation than in the transverse orientation due to randomized refractive index variability in the transverse orientation coupled with minimal refractive index variation in the longitudinal orientation. In embodiments where each energy relay is constructed of multicore fiber, the energy waves propagating within each relay element may travel in the longitudinal orientation determined by the alignment of fibers in this orientation.

In some embodiments, the one or more relay elements (e.g., 6112) includes fused or tiled mosaics, where any seams between adjacent fused or tiled mosaics are separated by or are less than the minimum perceptible contour as defined by the visual acuity of a human eye having better than 20/40 vision at a distance at or greater than the width or height of the singular seamless energy surface.

In other embodiments, the one or more relay elements (e.g., 6112) includes: optical fiber, silicon, glass, polymer, optical relays, diffractive elements, holographic optical elements, refractive elements, reflective elements, optical face plates, optical combiners, beam splitters, prisms, polarization components, spatial light modulators, active pixels, liquid crystal cells, transparent displays, or any similar materials having Anderson localization or total internal reflection properties for forming the singular seamless energy surface.

In yet other embodiments, the one or more relay elements (e.g., 6112) are configured to accommodate a shape of the singular seamless energy surface including planar, spherical, cylindrical, conical, faceted, tiled, regular, non-regular, or any other geometric shape for a specified application.

In another embodiment, the system further includes an energy waveguide system (e.g., 7100 as best shown in FIGS. 7C-7L) having an array of energy waveguides, where a second plurality of energy propagation paths extend from the singular seamless energy surface through the array of energy waveguides in directions determined by a 4D plenoptic function.

Figure 7C:
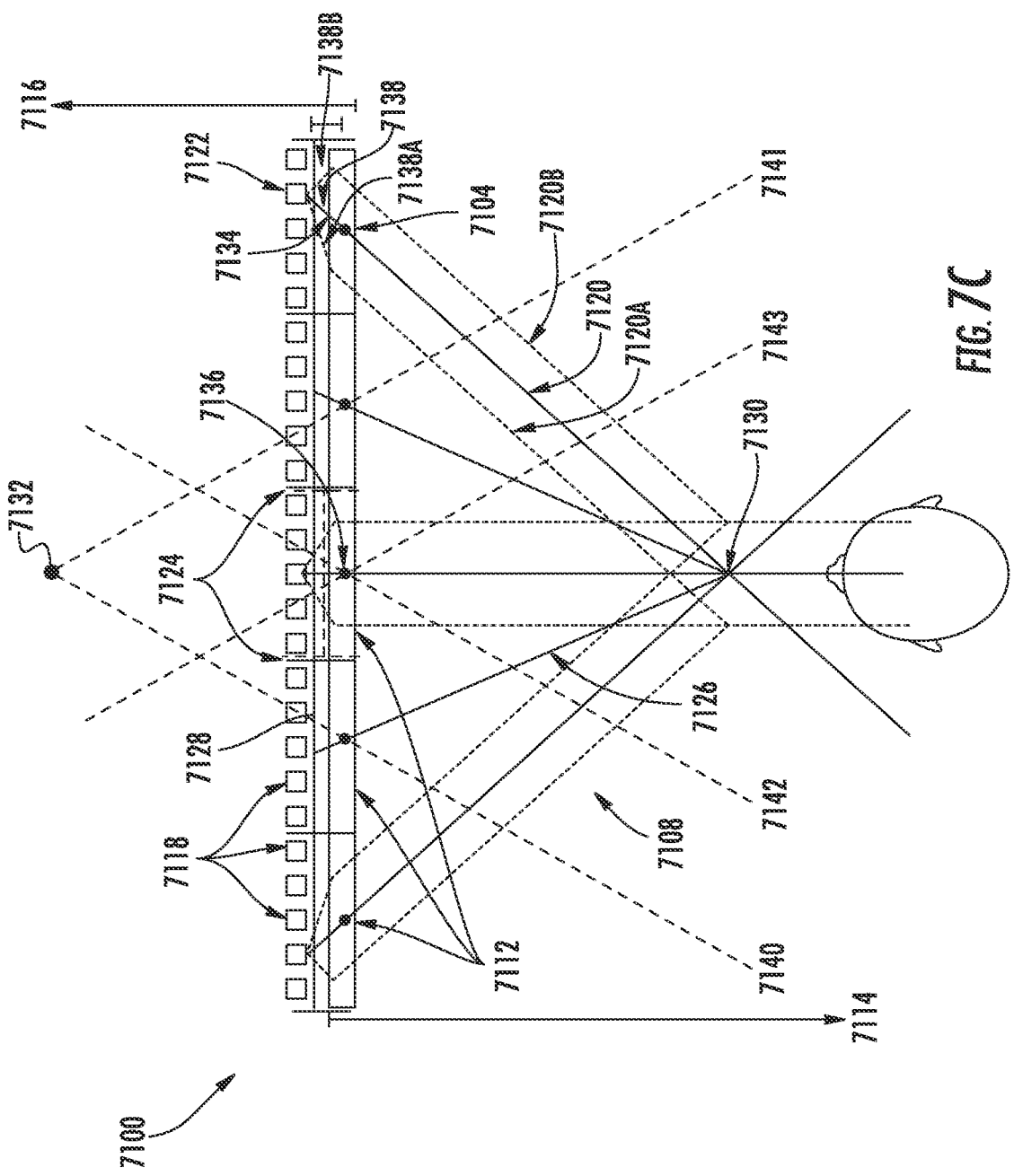
FIG. 7C illustrates a top-down perspective view of an embodiment of an energy waveguide system according to one embodiment of the present disclosure.

FIG. 7C illustrates a top-down perspective view of an embodiment of an energy waveguide system 7100 operable to define a plurality of energy propagation paths 7108. Energy waveguide system 7100 comprises an array of energy waveguides 7112 configured to direct energy therethrough along the plurality of energy propagation paths 7108. In an embodiment, the plurality of energy propagation paths 7108 extend through a plurality of energy locations 7118 on a first side of the array 7116 to a second side of the array 7114.

Figure 7E:
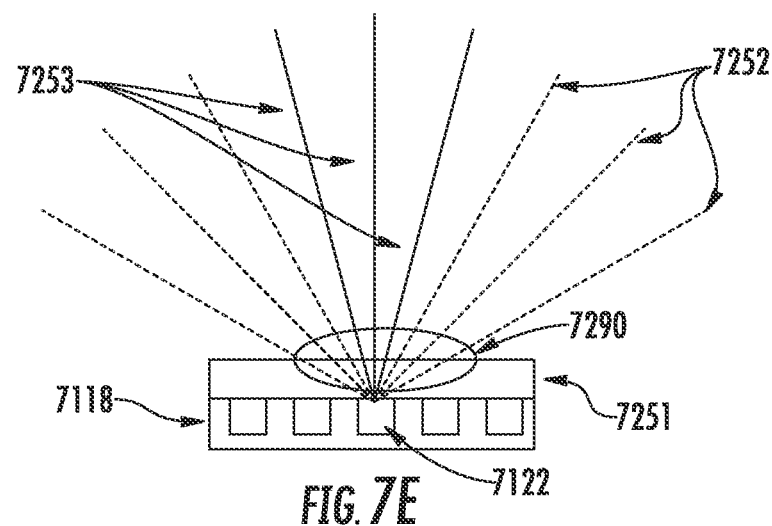
FIGS. 7E-7L illustrate various embodiments of an energy inhibiting element.
Figure 7F:
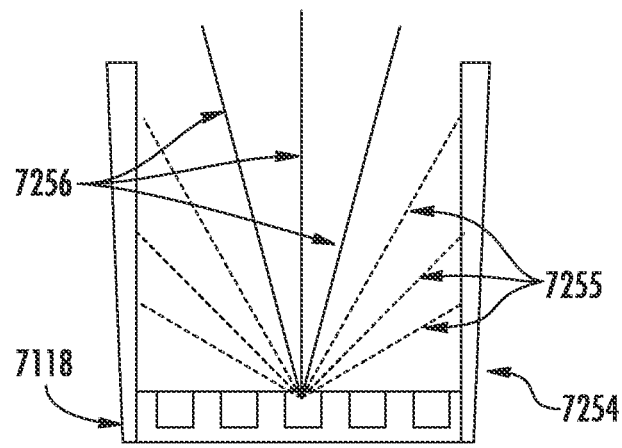
Figure 7G:
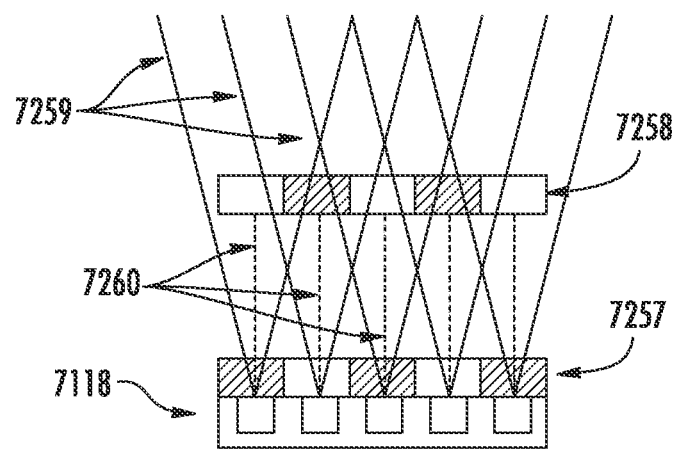
Figure 7H:
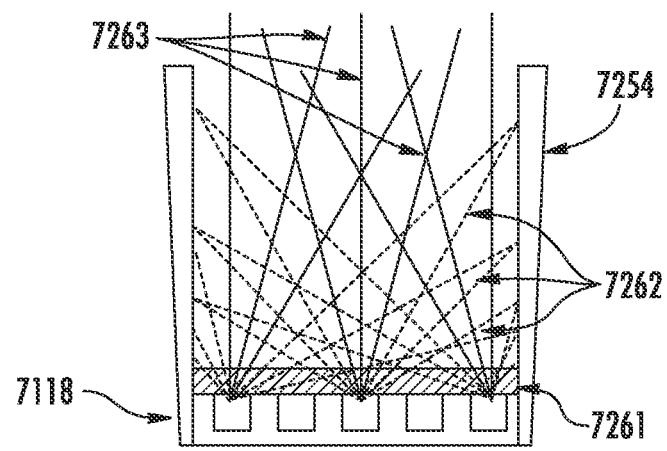
Figure 7I:
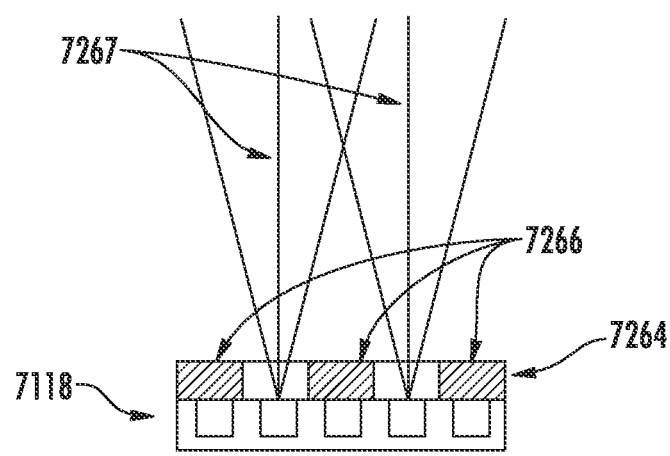
Figure 7J:
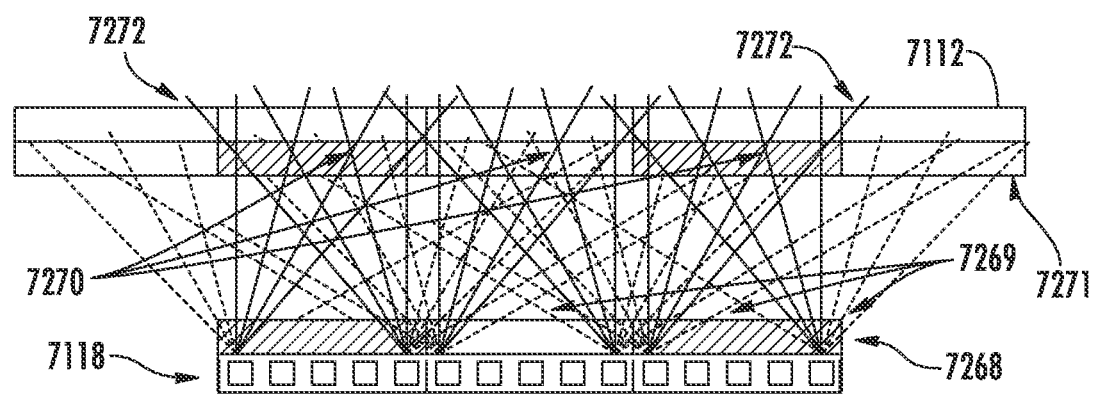
Figure 7K:
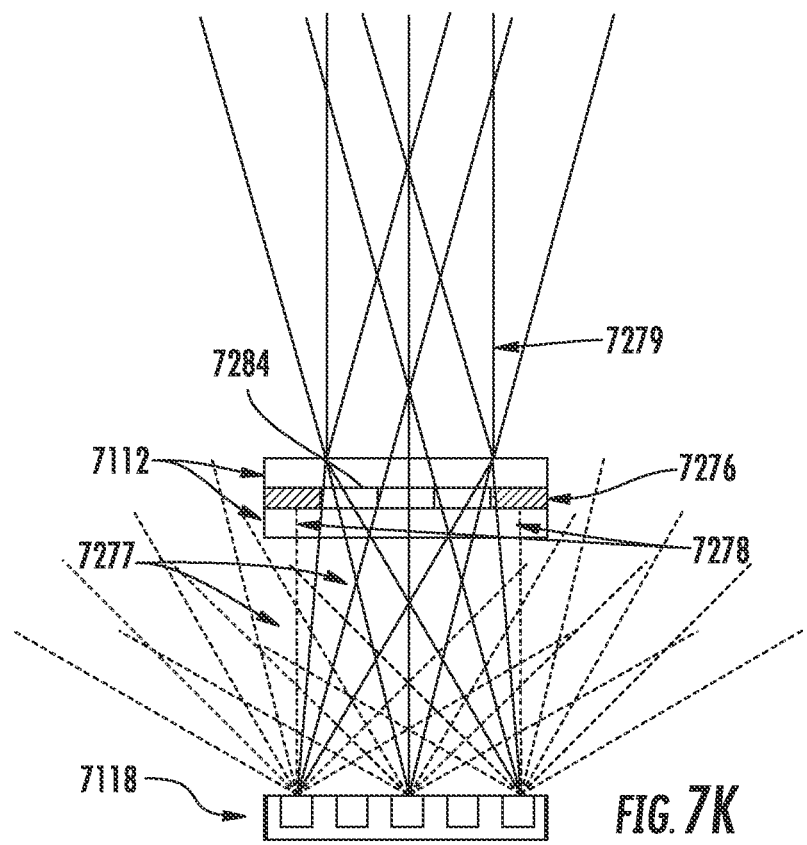
Figure 7L:
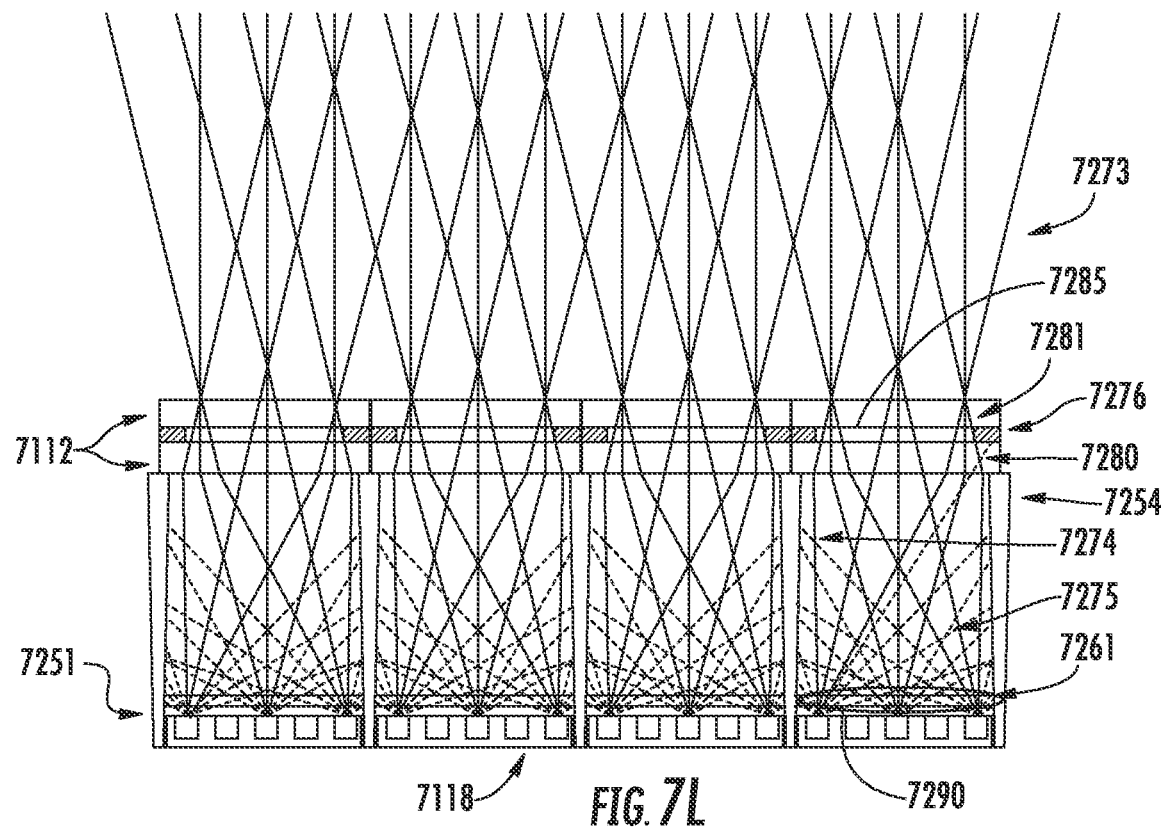

Referring to FIGS. 7C and 7L, in an embodiment, a first subset 7290 of the plurality of energy propagation paths 7108 extend through a first energy location 7122. The first energy waveguide 7104 is configured to direct energy along a first energy propagation path 7120 of the first subset 7290 of the plurality of energy propagation paths 7108. The first energy propagation path 7120 may be defined by a first chief ray 7138 formed between the first energy location 7122 and the first energy waveguide 7104. The first energy propagation path 7120 may comprise rays 7138A and 7138B, formed between the first energy location 7122 and the first energy waveguide 7104, which are directed by first energy waveguide 7104 along energy propagation paths 7120A and 7120B, respectively. The first energy propagation path 7120 may extend from the first energy waveguide 7104 towards the second side of the array 7114. In an embodiment, energy directed along the first energy propagation path 7120 comprises one or more energy propagation paths between or including energy propagation paths 7120A and 7120B, which are directed through the first energy waveguide 7104 in a direction that is substantially parallel to the angle propagated through the second side 7114 by the first chief ray 7138.

Embodiments may be configured such that energy directed along the first energy propagation path 7120 may exit the first energy waveguide 7104 in a direction that is substantially parallel to energy propagation paths 7120A and 7120B and to the first chief ray 7138. It may be assumed that an energy propagation path extending through an energy waveguide element 7112 on the second side 7114 comprises a plurality of energy propagation paths of a substantially similar propagation direction.

FIG. 7D is a front view illustration of an embodiment of energy waveguide system 7100. The first energy propagation path 7120 may extend towards the second side of the array 7114 in a unique direction 7208 extending from the first energy waveguide 7104, which is determined at least by the first energy location 7122. The first energy waveguide 7104 may be defined by a spatial coordinate 7204, and the unique direction 7208 which is determined at least by first energy location 7122 may be defined by an angular coordinate 7206 defining the directions of the first energy propagation path 7120. The spatial coordinate 7204 and the angular coordinate 7206 may form a four-dimensional plenoptic coordinate set 7210 which defines the unique direction 7208 of the first energy propagation path 7120.

In an embodiment, energy directed along the first energy propagation path 7120 through the first energy waveguide 7104 substantially fills a first aperture 7134 of the first energy waveguide 7104, and propagates along one or more energy propagation paths which lie between energy propagation paths 7120A and 7120B and are parallel to the direction of the first energy propagation path 7120. In an embodiment, the one or more energy propagation paths that substantially fill the first aperture 7134 may comprise greater than 50% of the first aperture 7134 diameter.

In a preferred embodiment, energy directed along the first energy propagation path 7120 through the first energy waveguide 7104 which substantially fills the first aperture 7134 may comprise between 50% to 80% of the first aperture 7134 diameter.

Turning back to FIGS. 7C and 7E-7L, in an embodiment, the energy waveguide system 7100 may further comprise an energy inhibiting element 7124 positioned to limit propagation of energy between the first side 7116 and the second side 7114 and to inhibit energy propagation between adjacent waveguides 7112. In an embodiment, the energy inhibiting element is configured to inhibit energy propagation along a portion of the first subset 7290 of the plurality of energy propagation paths 7108 that do not extend through the first aperture 7134. In an embodiment, the energy inhibiting element 7124 may be located on the first side 7116 between the array of energy waveguides 7112 and the plurality of energy locations 7118. In an embodiment, the energy inhibiting element 7124 may be located on the second side 7114 between the plurality of energy locations 7118 and the energy propagation paths 7108. In an embodiment, the energy inhibiting element 7124 may be located on the first side 7116 or the second side 7114 orthogonal to the array of energy waveguides 7112 or the plurality of energy locations 7118.

In an embodiment, energy directed along the first energy propagation path 7120 may converge with energy directed along a second energy propagation path 7126 through a second energy waveguide 7128. The first and second energy propagation paths may converge at a location 7130 on the second side 7114 of the array 7112. In an embodiment, a third and fourth energy propagation paths 7140, 7141 may also converge at a location 7132 on the first side 7116 of the array 7112. In an embodiment, a fifth and sixth energy propagation paths 7142, 7143 may also converge at a location 7136 between the first and second sides 7116, 7114 of the array 7112.

FIGS. 7E-7L are illustrations of various embodiments of energy inhibiting element 7124. For the avoidance of doubt, these embodiments are provided for exemplary purposes and in no way limiting to the scope of the combinations or implementations provided within the scope of this disclosure.

FIG. 7E illustrates an embodiment of the plurality of energy locations 7118 wherein an energy inhibiting element 7251 is placed adjacent to the surface of the energy locations 7118 and comprises a specified refractive, diffractive, reflective, or other energy altering property. The energy inhibiting element 7251 may be configured to limit the first subset of energy propagation paths 7290 to a smaller range of propagation paths 7253 by inhibiting propagation of energy along energy propagation paths 7252. In an embodiment, the energy inhibiting element is an energy relay with a numerical aperture less than 1.

FIG. 7F illustrates an embodiment of the plurality of energy locations 7118 wherein an energy inhibiting structure 7254 is placed orthogonal between regions of energy locations 7118, and wherein the energy inhibiting structure 7254 exhibits an absorptive property, and wherein the inhibiting energy structure 7254 has a defined height along an energy propagation path 7256 such that certain energy propagation paths 7255 are inhibited. In an embodiment, the energy inhibiting structure 7254 is hexagonal in shape. In an embodiment, the energy inhibiting structure 7254 is round in shape. In an embodiment, the energy inhibiting structure 7254 is non-uniform in shape or size along any orientation of the propagation path. In an embodiment, the energy inhibiting structure 7254 is embedded within another structure with additional properties.

FIG. 7G illustrates the plurality of energy locations 7118, wherein a first energy inhibiting structure 7257 is configured to substantially orient energy 7259 propagating therethrough into a first state. A second energy inhibiting structure 7258 is configured to allow energy 7259, which is substantially oriented in the first state, to propagate therethrough, and to limit propagation of energy 7260 oriented substantially dissimilarly to the first state. In an embodiment, the energy inhibiting element 7257, 7258 is an energy polarizing element pair. In an embodiment, the energy inhibiting element 7257, 7258 is an energy wave band pass element pair. In an embodiment, the energy inhibiting element 7257, 7258 is a diffractive waveguide pair.

FIG. 7H illustrates an embodiment of the plurality of energy locations 7118, wherein an energy inhibiting element 7261 is structured to alter energy propagation paths 7263 to a certain extent depending upon which of the plurality of energy locations 7118 the energy propagation paths 7263 extends through. Energy inhibiting element 7261 may alter energy propagation paths 7263 in a uniform or non-uniform way along energy propagation paths 7263 such that certain energy propagation paths 7262 are inhibited. An energy inhibiting structure 7254 is placed orthogonal between regions of energy locations 7118, and wherein the energy inhibiting structure 7254 exhibits an absorptive property, and wherein the inhibiting energy structure 7254 has a defined height along an energy propagation path 7263 such that certain energy propagation paths 7262 are inhibited. In an embodiment, an inhibiting element 7261 is a field lens. In an embodiment, an inhibiting element 7261 is a diffractive waveguide. In an embodiment, an inhibiting element 7261 is a curved waveguide surface.

FIG. 7I illustrates an embodiment of the plurality of energy locations 7118, wherein an energy inhibiting element 7264 provides an absorptive property to limit the propagation of energy 7266 while allowing other propagation paths 7267 to pass.

FIG. 7J illustrates an embodiment of the plurality of energy locations 7118, and the plurality of energy waveguides 7112, wherein a first energy inhibiting structure 7268 is configured to substantially orient energy 7270 propagating therethrough into a first state. A second energy inhibiting structure 7271 is configured to allow energy 7270, which is substantially oriented in the first state, to propagate therethrough, and to limit propagation of energy 7269 oriented substantially dissimilarly to the first state. In order to further control energy propagation through a system, exemplified by the stray energy propagation 7272, energy inhibiting structures 7268, 7271 may require a compound energy inhibiting element to ensure energy propagation maintains accurate propagation paths.

FIG. 7K illustrates an embodiment of the plurality of energy locations 7118, and wherein an energy inhibiting element 7276 provides an absorptive property to limit the propagation of energy along energy propagation path 7278 while allowing other energy along energy propagation path 7277 to pass through a pair of energy waveguides 7112 for an effective aperture 7284 within the array of waveguides 7112. In an embodiment, energy inhibiting element 7276 comprises black chrome. In an embodiment, energy inhibiting element 7276 comprises an absorptive material. In an embodiment, energy inhibiting element 7276 comprises a transparent pixel array. In an embodiment, energy inhibiting element 7276 comprises an anodized material.

FIG. 7L illustrates an embodiment comprising a plurality of energy locations 7118, and a plurality of energy waveguides 7112, wherein a first energy inhibiting structure 7251 is placed adjacent to the surface of the energy locations 7118 and comprises a specified refractive, diffractive, reflective, or other energy altering property. The energy inhibiting structure 7251 may be configured to limit the first subset of energy propagation paths 7290 to a smaller range of propagation paths 7275 by inhibiting propagation of energy along energy propagation paths 7274. A second energy inhibiting structure 7261 is structured to alter energy propagation paths 7275 to a certain extent depending upon which of the plurality of energy locations 7118 the energy propagation paths 7275 extends through. Energy inhibiting structure 7261 may alter energy propagation paths 7275 in a uniform or non-uniform way such that certain energy propagation paths 7274 are inhibited A third energy inhibiting structure 7254 is placed orthogonal between regions of energy locations 7118. The energy inhibiting structure 7254 exhibits an absorptive property, and has a defined height along an energy propagation path 7275 such that certain energy propagation paths 7274 are inhibited. An energy inhibiting element 7276 provides an absorptive property to limit the propagation of energy 280 while allowing energy 7281 to pass through. A compound system of similar or dissimilar waveguide elements 7112 are positioned to substantially fill an effective waveguide element aperture 7285 with energy from the plurality of energy locations 7118 and to alter the propagation path 7273 of energy as defined by a particular system.

In an embodiment, the energy inhibiting structure 7124 may be located proximate the first energy location 7122 and generally extend towards the first energy waveguide 7104. In an embodiment, the energy inhibiting structure 7124 may be located proximate the first energy waveguide 7104 and generally extend towards the first energy location 7122.

In one embodiment, the energy system is configured to direct energy along the second plurality of energy propagation paths through the energy waveguide system to the singular seamless energy surface, and to direct energy along the first plurality of energy propagation paths from the singular seamless energy surface through the energy relay system to the plurality of energy devices.

In another embodiment, the energy system is configured to direct energy along the first plurality of energy propagation paths from the plurality of energy devices through the energy relay system to the singular seamless energy surface, and to direct energy along the second plurality of energy propagation paths from the singular seamless energy surface through the energy waveguide system.

In yet another embodiment, the singular seamless energy surface is operable to guide localized light transmission to within three or less wavelengths of visible light.

Sensory Data Suitable For Holographic Displays

The plenopic 4D function through the surface from an energy directing surface provides for two spatial coordinates $x_I, y_I$ from a first plane comprising energy locations and directed through a second coordinate along a second plane comprising waveguiding parameters $u_I, v_I$ defining a vector of an energy propagation path $f_I(x_I, y_I, u_I, v_I)$. In consideration of a plurality of energy directing surfaces, the plenoptic 5D function provides for three spatial coordinates $x_I, y_I, z_I$ from a first coordinate comprising one or more energy locations and directed through a second coordinate along a plane comprising waveguiding parameters $u_I, v_I$ defining a vector of an energy propagation path $f_I(x_I, y_I, z_I, u_I, v_I)$. For each of 4D or 5D, additional variables for time and color $f_I(\lambda_I, t_I)$ may be considered and assumed to be inclusive of any of the plenoptic functions as necessary for an application even when not explicitly noted for simplicity of the function and discussion. For the avoidance of doubt, the reference to an energy directing surface is for exemplary purposes only and may comprise any additional point, location, direction, or plane in space for the localization of a 5D coordinate, and collectively referred to as an energy "directing surface".

Figure 8:
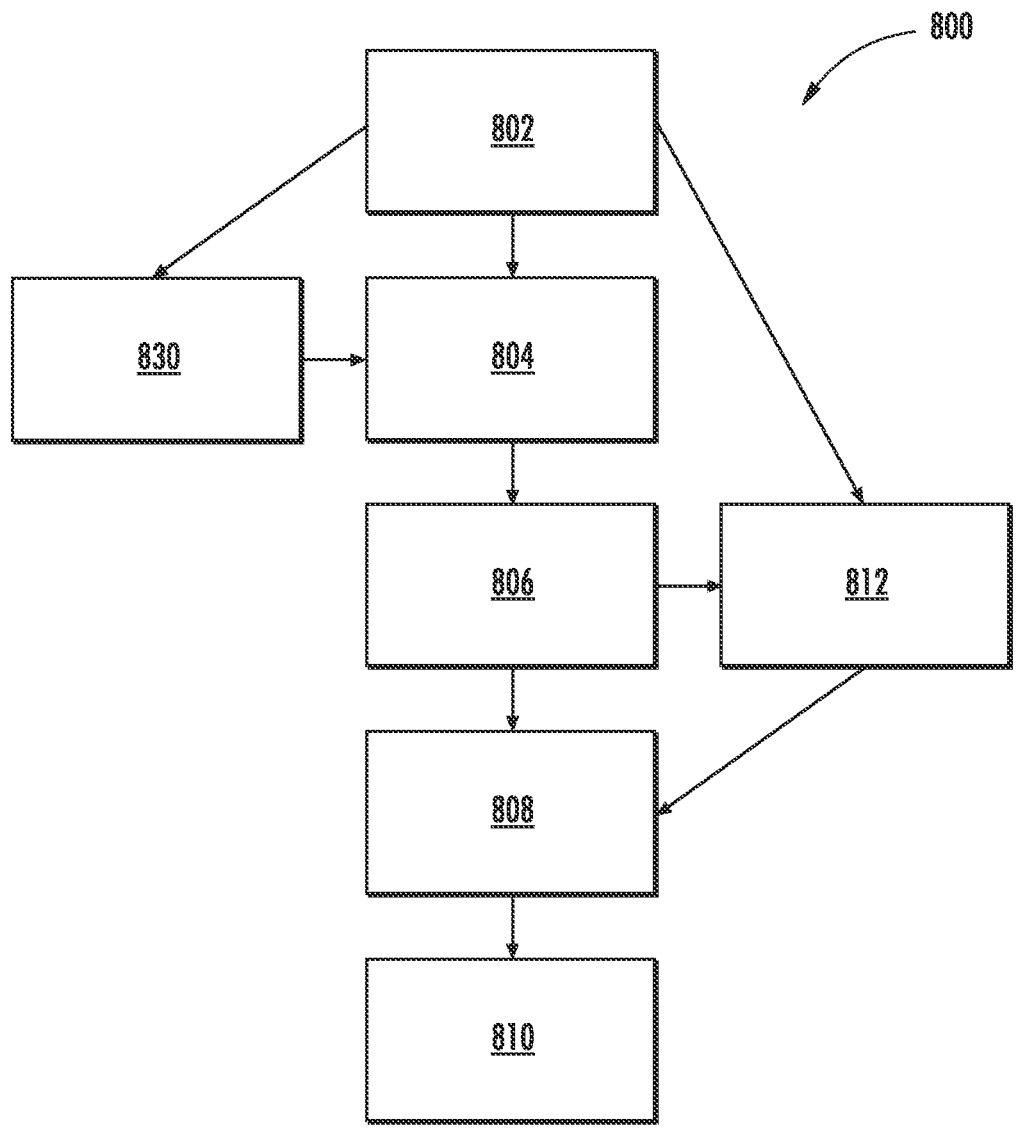
FIG. 8 is a flow chart illustrating an embodiment of a process for processing holographic sensory data.
Figure 9:
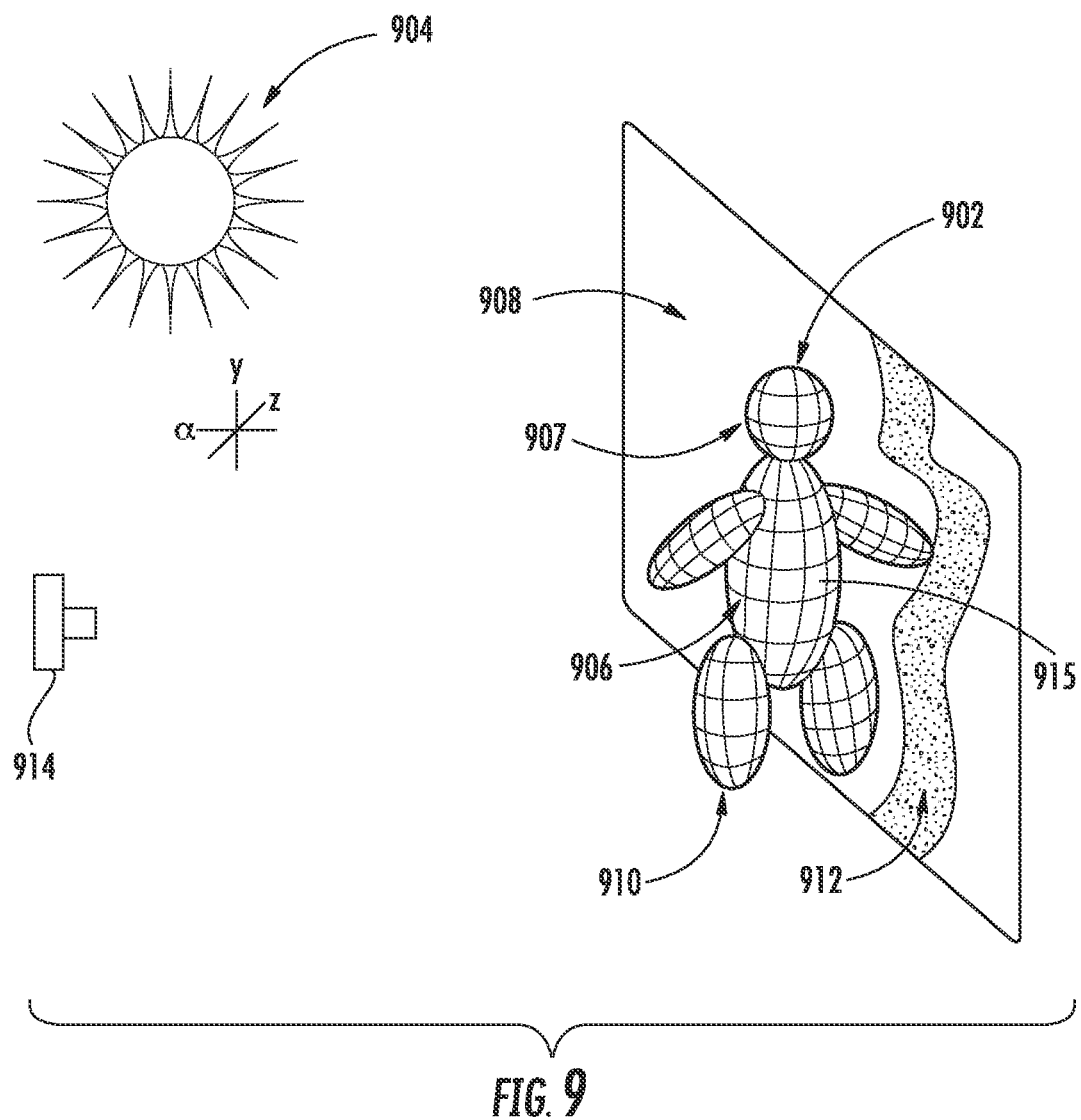
FIG. 9 is a schematic diagram of a virtual environment constructed from sensory data.

FIG. 8 is a flow chart diagram illustrating an embodiment of a process 800 for determining four dimensional (4D) plenoptic coordinates for content data. The process 800 may include a step 802 in which content data is received, which may include any signal perceptible by a visual, audio, textural, sensational, or olfactory sensor. FIG. 9 is a schematic diagram illustrating an embodiment of the content data, which may include at least one of the following: an object location, a material property (such as material properties 906, 907, and 908), a virtual light source 904, geometry 902 at non-object location, content out of the reference surface, a virtual camera position 914, a segmentation 910 of objects, background texture 912, and layered contents.

Referring to FIGS. 8 and 9, the process 800 may further include a step 804 in which locations of data points are determined with respect to a first surface 920 to creating a digital volumetric representation 922 of the content data.

The first surface 920 may be used as a reference surface for defining the locations of data points in space. In an embodiment, the process 800 may further include a step 806 in which 4D plenoptic coordinates of the data points are determined at a second surface by tracing the locations of the data points in the volumetric representation to the second surface where a 4D function is applied. In an embodiment, the process 800 may further include a step 808 in which energy source location values are determined for 4D plenoptic coordinates that have a first point of convergence.

The content data received in step 802 may include N views, where N is one or more. A single view may be presented with or without a depth channel. Stereoscopic views may be presented with or without a depth channel. Multi-view imagery may be presented with or without a depth channel. Further, a 4D light field may be presented with or without a depth channel.

The tracing of step 806 may use prior knowledge of a calibrated geometry of an energy system, which may be stored in memory as a global model or an individually characterized system or some combination of the two methodologies.

In an embodiment, the mapping between the input data and the output energy source provides a methodology to accurately map between various bitrate sources. The tracing of step 806 provides the ability to infer the full volumetric 4D data set from the above listed partial samples. Depth information either needs to be provided or calculated from the available data. With the depth information known or calculated, the N view(s) may be inverse traced by triangulation of the samples from the known volumetric presentation based upon depth coordinate into the 4D space.

The triangulation may assume that each available energy source location in the N source content are representative of a energy source location for each energy waveguide in the event that a mapping between energy waveguide and energy source location format resolution are provided. In the event that the N source content resolution are lower, super-resolution or scaling algorithms may be implemented. In the event that the resolution of the N source image(s) are higher than the number of energy waveguides in the energy directing device, interpolation between super-sampled energy source locations may be performed to produce higher amount of energy source locations per energy waveguide in the resultant 4D inverse ray trace.

The above assumes distance information may be determined from the depth maps which may or may not be accurate depending on the form of depth information provided or calculated, and with the distance information known or assumed, the distance information in combination with the x-y energy source location coordinate and the (u,v) angular information as determined by the energy directing device properties may then be considered a 4D or 5D light field with limited imaging data samples. The imaging samples, based upon the distance information, are triangulated back to the appropriate energy source locations that may exist behind each energy waveguide respectively, and missing data may be generated in step 808 through the disclosures contained herein.

Referring to FIGS. 7C, 8, 9, 10 in an embodiment, the energy locations may be located in the first surface 920, and the second surface where a 4D function is applied may correspond to a waveguide system 7100 of an energy directing device, and energy is operable to be directed through the waveguide system according to the 4D plenoptic coordinates of the data points to form a detectable volumetric representation of the content data.

Figure 10:
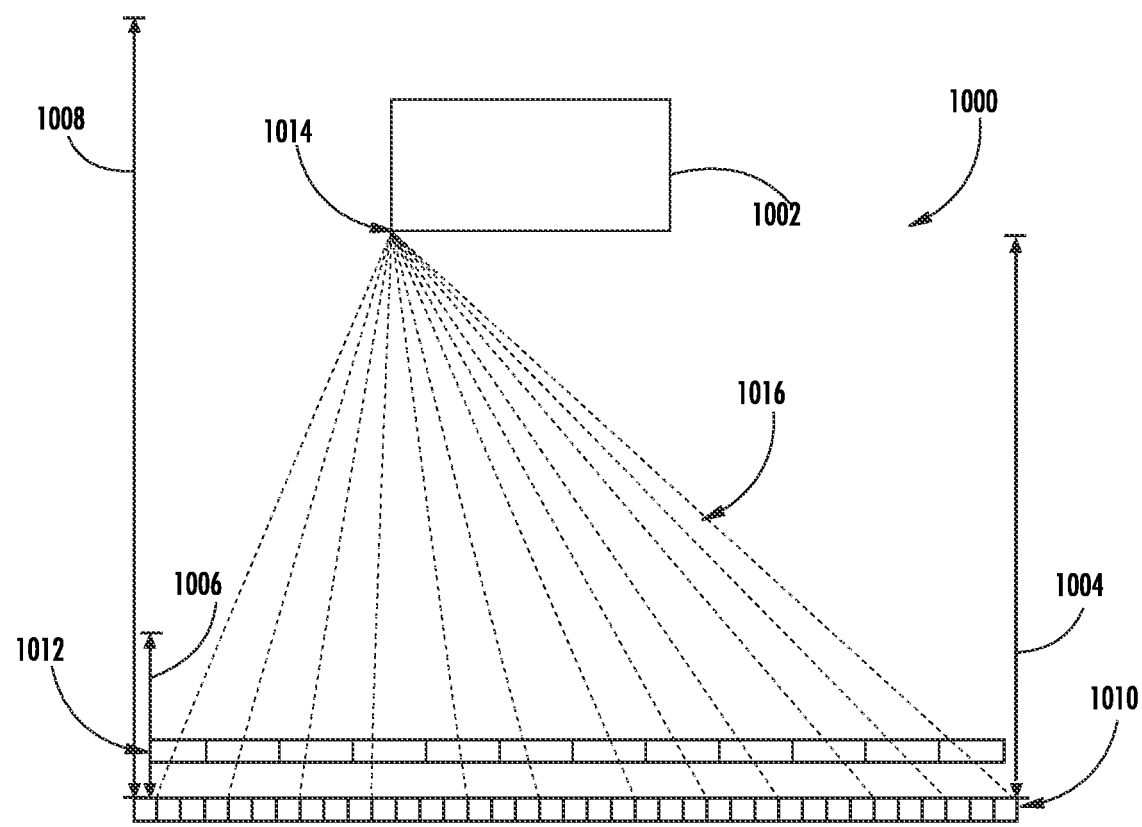
FIG. 10 is a schematic diagram illustrating an embodiment of energy tracing.

In an embodiment, the process 800 may further comprise a step 810, in which energy source location values are determined for 4D coordinates that have a first point of convergence. To provide an example implementation of the present disclosure, FIG. 10 illustrates an embodiment of an energy directing device 1000 going through a tracing process where content data in the form of an image 1002 is provided with a distance position 1004, which may be provided or calculated, within a determined minimum position 1006 and maximum position 1008 in reference to the energy locations 1010. In an embodiment, the energy locations 1010 may comprise an energy directing device surface. The known geometry from the energy locations 1010 defined by the 4D plenoptic function allows for the triangulation of a point 1014 on the virtual surface of the image 1002 to be traced back along rays 1016 to specific energy locations 1018, each having a unique x-y coordinate. Missing samples may be computationally calculated based upon the available information contained within the dataset.

When additional N samples are provided, the same methodology is applied with the additional multi-perspective imaging data producing a richer set of inverse ray traced samples and provide superior holographic results. The depth information from a multiple N samples may be provided through a single depth map, or up to N, or greater than N depth maps with a known mapping between the source location (the N+X perspective) and the source depth map (the N+X depth map) to ensure appropriate inverse ray tracing is performed.

In the event that a singular depth map for the, for example, center N perspective is provided, the additional depth maps may be interpolated by calculating for the disparity between each of the adjacent views to accurately map the source and target location between the N and the N+X viewpoints. With this method, it is possible to inverse ray trace the appropriate view dependent mapping to the 4D light field such that the correct perspective(s) are projected to the appropriate waveguide coordinates and results in the viewer's ability to maintain the correct view dependencies in the associated viewpoints.

The encoder and decoders are robust and may interpret multiple data types to include, but not limited to, 2D/flat files, 2D with depth, stereoscopic, stereoscopic with single depth channel, stereoscopic with dual depth channel, N+X multi-view with no depth, N+X multi-view with N+Y depth, geometric or vector based scene files that may include textures, geometry, lighting, material properties and the like to reconstruct an environment, deep imaging files wherein multiple RGBAZ values may be provided for each x-y coordinate, 4D or 5D (4D plus depth) light fields, or provided as a N+X view plus N+Y delta channel dataset wherein the depth channel provides a lower bandwidth methodology for only rendering a certain amount of energy source location data as required for a determined energy directing device field of view. The processors are able to inverse ray trace at up to, or exceeding, real-time speeds, in order to provision the appropriate 4D light field to present to the viewer with and without world coordinate locations, with and without compensated minimum and maximum projected world locations and in consideration of the energy directing device intrinsic as characterized and/or designed.

In an embodiment, the process 800 may further comprise a step 812, in which a mapping between energy locations 7122 on a first side of the waveguide system 7100 and the angular directions of the energy propagation paths 7120 from the waveguide element 7100 on a second side of the waveguide system 7100 is applied. Doing so may allow a plurality of energy locations on the first side of the waveguide system 7100 corresponding to the 4D plenoptic coordinates of the data points to be determined.

Figure 12:
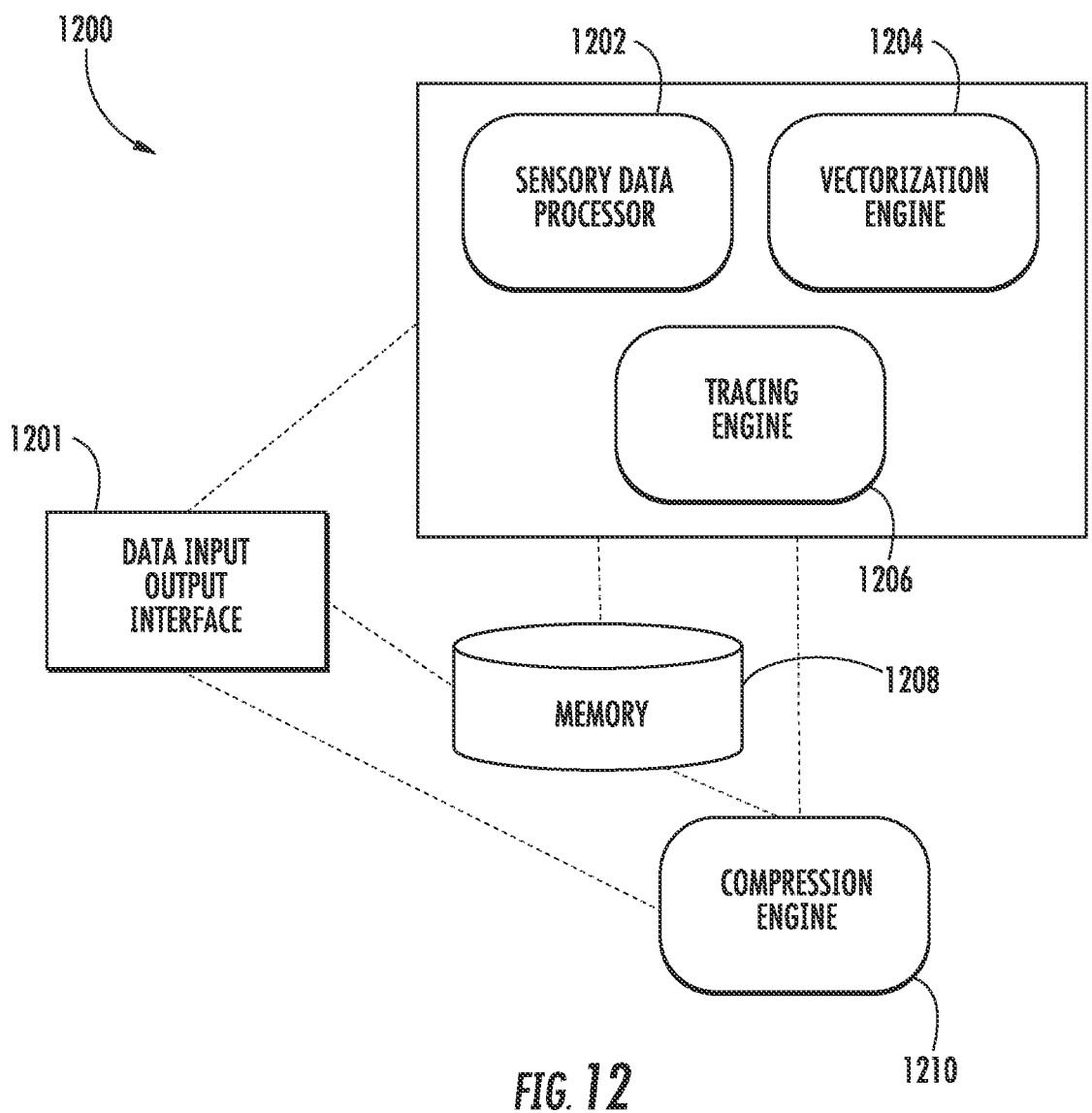
FIG. 12 is a schematic diagram of a processing system for process holographic sensory data.

FIG. 12 is a schematic diagram of a processing system 1200 comprising a data input/output interface 1201 in communication with a processing subsystem having a sensory data processor 1202, a vectorization engine 1204, and a tracing engine 1206. It is to be appreciated that the sensory data processor 1202, the vectorization engine 1204, and the tracing engine 1206 may be implement on one or more processors, whether individually or any combination thereof. Step 802 of the process 800 may input content data through the data input/output interface 1201 to the processing subsystem 1220 Step 804 may be performed by the sensory data processor 1202 to create a volumetric representation of the content data. Step 806.

In an embodiment, applying the mapping may comprise calibrating for a distortion in the waveguide system 7100, which may further comprise calibrating for at least one distortion selected from a group consisting of: a spatial distortion, angular distortion, intensity distortion, and color distortion.

In an embodiment, the energy directing device may further comprise a relay system 6110 on the first side of the waveguide system 7100, the relay system having a first surface 6116 adjacent to the waveguide system 7100, and the energy locations 7112 on the first side of the waveguide system may be positioned adjacent to a second surface 6114 of the relay system 6110.

In an embodiment, applying the mapping may include calibrating for a distortion in the waveguide system 7100. In an embodiment, applying the mapping may include calibrating both for a distortion in the relay system 6110 and distortion in the waveguide system 7100. In an embodiment. the distortion to be calibrated may include at least one distortion selected from a group consisting of: a spatial distortion, angular distortion, intensity distortion, and color distortion.

In an embodiment, a portion of the method may be carried out in real time, or the method may be entirely carried out in real time, or at least two portions of the method may be carried out in different time periods.

2D to Light Field Conversion

In an embodiment, content data may comprise data points in a two dimensional (2D) space, and determining locations of step 704 may comprise applying a depth map to the data points in a two dimensional space.

There are several methods to convert two-dimensional or flat imagery into light field data. These include the estimation of depth information through depth from motion analysis, a provided depth channel through manual or rendered means, or the manual creation of disparity, depth, occlusion, geometry and/or any other methodology known as standard for visual effects content creation to reproduce the full light field through regeneration of the entire environment through manual and automated processes.

In a first embodiment, a system that includes a real-time or offline processor to perform estimation of depth from available energy source location information is possible. This may be performed at the energy directing device, as a set top box or as an offline process. Additional computation for missing volumetric data may be performed leveraging temporal information and/or state of the art texture synthesis or other technologies known in the art.

In a second embodiment, depth information is provided as an image stream and may be embedded into the image format. Similarly, additional computation may be performed for missing volumetric data.

In a third embodiment, an artist or a process is leveraged to generate the missing environmental information which may include a process to isolate or segment each object in a scene, track said objects over time manually, semi-automatically or automatically, place objects into space leveraging disparity space, energy directing device space, optical space or world coordinates, synthesizing background and foreground missing information through visual effects processes known in the art for reconstruction of backgrounds, transparencies, edge details, etc. to regenerate the environment. For the avoidance of doubt, the implemented processes may be any, none or all of the listed embodiments for the reconstruction of these environments. The generated environmental information should include as much of the missing information as possible as determined by the energy directing device angles of view, and these angles of view may be known by the artist to ensure that appropriate occlusion and view dependent information is generated appropriately.

Additionally, the surface model for each object in the scene may be generated, either as a partial model or as a completely built model and textures from the image data are projected onto the surfaces of the geometry to provide appropriate shape for the following inverse ray tracing.

Additionally, material properties may be calculated or manually introduced to ensure that view dependent lighting may be introduced with virtual illumination sources to further increase the accuracy of the regeneration of the 4D light field.

Further, the addition of CG or synthetic content may be introduced to augment the existing converted materials. The addition of volumetric data may also be incorporated. The inter-mixing of N+X content may be introduced as well to provide a seamless blend between CG, 2D, stereoscopic, multiview and/or 4D media into a single composite.

The resultant 2D to light field converted content may be retained as a geometric scene file including geometry, textures, lighting, materials, etc. as indicated in the CG scene itself, rendered as N+X views with N+D depth channels, rendered as a 4D or 5D (4D+depth) light field, a deep image which is a format that allows for multiple RGBAZ samples per x-y energy source location coordinate with or without a limitation of stacking of Z samples per x-y coordinate, or provided as a N+X view plus N+Y delta channel dataset wherein the depth channel provides a lower bandwidth methodology for only rendering a certain amount of energy source location data as required for a determined energy directing device field of view. Tools may be provided to allow for the generation of all, some or one of these respective output formats.

Stereoscopic and Multi-View to Light Field Conversion

The process from above leveraging single view content may be applied to stereoscopic and multi-view materials. The estimation of depth information is obtained through depth from motion analysis, as well as from stereoscopic, multi-view and/or disparity analysis, a provided depth channel or provided depth channels through manual or rendered means, or the manual creation of disparity, depth, occlusion, geometry and/or any other methodology known as standard for visual effects content creation to reproduce the full light field through regeneration of the entire environment through manual and automated processes and leveraging the appropriate data to further retain the view dependent content as available in the provided imaging materials.

In an embodiment, the content data received in step 102 may comprise data points in a three dimensional (3D) space, and determining locations may comprise adjusting the data points in the 3D space.

In an embodiment, adjusting the data points in the 3D space may include applying a depth map to the data points in the 3D space, adding new data points, reconstructing occluded data points, or any combination thereof.

The significant advantage to this approach exists in that the accuracy of stereoscopic disparity estimation is far greater than from motion parallax or other similar 2D estimation processes alone. Further the image quality of the resultant converted 4D light field is more accurate due to the availability of some of the view dependent conditions, including but not limited to illumination, transparencies, materials, occlusion, etc.

The ability to retain the explicit angular dependencies of the multi-view image data relies on the ability to calculate the surface normals in relation to the center viewpoint camera, or some other defined center point. With these normals and disparity or depth information known, it is possible to interpolate between viewpoints based upon energy directing device angle of view, which is then either directly applied to the inverse ray tracing, or synthesized as a portion of the texture synthesis during the inverse ray tracing.

For brevity, all of the previously disclosed methodologies for the reconstruction of 2D to light field imagery may be applied to the reconstruction of stereoscopic or multi-view datasets.

Generation of N×N RGB Images from 4D or 5D Light Fields

By leveraging 4D or 5D light fields, it is possible to generate N×N or any value of up to N×N number of RGB multi-view images. This process is accommodated by considering each bottom left coordinate under each waveguide, assuming a square grid, the position, and the top right position as the N,N position. The grid is only exemplary and any other mapping methodology may be leveraged. For each 0,0 to N,N position, it is possible to form full resolution images from the light field with the widest possible depth of field based upon the capture system leveraged wherein each waveguide in the array is considered a single energy source location and each coordinate under each waveguide is a single energy source location of the larger energy source location array for each complete image from 0,0 to N,N respectively. This may be repeated for a 5D light field for the depth information as well. In this fashion, it is possible to easily translate between the 4D or 5D light field to any subset of the dataset that is desired for various distribution reasons to include 2D, stereoscopic, multi-view, point cloud, CG scene file, or any other desired combination of data that may be derived from the 4D or 5D light field. For non-regular or square packed 4D or 5D structures, further interpolation is required to align energy source locations to a regular grid, or a linear mapping between energy source locations and non-square packed structures may be implemented wherein the resultant images may not appear rectilinear and may also contain energy source location artifacts.

Figure 11:
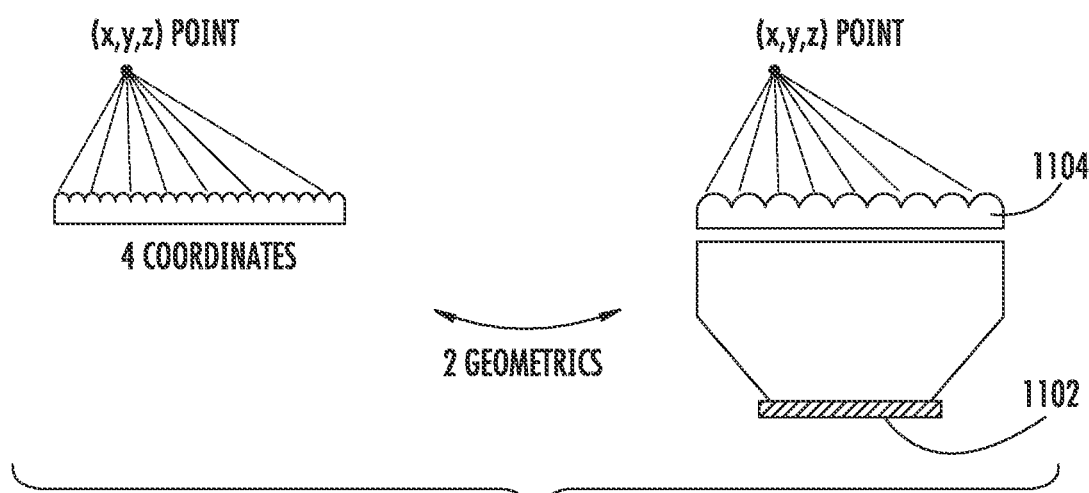
FIG. 11 is a schematic diagram illustrating an embodiment of an energy directing device 1000 going through a tracing process.

FIG. 11 exemplifies the methodology to convert from a 4D or 5D light field into multiple viewpoints by arranging the energy locations 1102 from underneath of each energy waveguide element 1104 according to energy waveguide element position and energy location coordinate respectively. This provides the ability to seamlessly transfer between light field and smaller datasets seamlessly.

N+X RGB and N+Y Depth Datasets

The ideal dataset format that provides the highest quality with the balance of data transmission size includes the use of N+X RGB and N+Y Depth+vectorized channels wherein N+X RGB information contains N RGB images that may represent a certain resolution and format, and X that may represent a different resolution and format for RGB data to include lower resolutions, delta information and the like, and N+Y Depth+vectorized channels that contains N depth+vectorized channels that may represent a certain resolution and format and Y that may represent a different resolution and format for depth+vector data to include lower resolutions, delta information and the like.

The number of N+X views may be generated on a regular grid, from a radius around a center point with or without a center view, from multiple radii around a center point with or without a center view, or any methodology to determine the mapping of the number of views and the associated packing or perspective locations. The configuration for the perspectives may be contained in the metadata of the file, or the depth+vectorized channels provided may include a direct mapping to world coordinates such that the imaging data aligns to the same coordinate in XYZ space without other necessary metadata.

4D Disk Inversion and Energy Directing Device Compatibility Processing

For any data captured with a plenoptic or light field 4D or 5D system, including potentially those captured with virtual rigs with optical simulation of a 4D or 5D light field system, the resultant fly's eye perspectives contain discs that represent the uv vectors for the light field. However, these coordinates assume energy focusing elements that may not exist in an energy directing device. In the proposed energy directing device solution, the focusing elements may be the viewer's eye, and the mapping between the capture system and the mapping between the original capture methodology and the viewed energy directing device are no longer correct.

To invert this and correct for the additionally missing energy directing element in the system when compared to the capture system, it is possible to individually flip each disc independently, wherein the x-y location of each (u,v) coordinate is retargeted based upon the center point of each waveguide respectively. In this fashion, the inversion of the image that forms as a result of the main waveguide is inverted and allows for the light field energy directing device to project the rays in the correct x-y-u-v orientation.

A further embodiment of this may implement a hardware modification wherein leveraging an energy waveguide array provides a direct inversion of every presented energy waveguide energy source location. For light field energy directing devices, this is advantageous to have a direct mapping between a potential capture system and energy directing device. This may further be advantageous an embodiment comprising HMD systems or volumetric opacity energy directing devices such that a group of energy waveguides in the overall array may be eliminated by removing the necessity to relay additional times for accurate x-y-u-v coordinates.

Further, not all light fields are identical. They may be captured with differing NAs, FOVs, N values, optical prescriptions, etc. The intrinsics and extrinsics of the input light field data may be understood and convert to the energy directing device characteristics. This may be performed by embodiments contained within this disclosure for universal parametrization of holographic and light field data.

Universal Parameterization of Holographic Sensory Data Transport Through Inverse Energy Tracing and Vectorization of Sensory Properties for an Energy Directing System The plenopic 4D function through the surface from an energy directing surface provides for two spatial coordinates $x_1, y_1$ from a first plane comprising energy locations and directed through a second coordinate along a second plane comprising waveguiding parameters $u_1, v_1$ defining a vector of an energy propagation path $f_1(x_1, y_1, u_1, v_1)$. In consideration of a plurality of energy directing surfaces, the plenoptic 5D function provides for three spatial coordinates $x_1, y_1, z_1$ from a first coordinate comprising one or more energy locations and directed through a second coordinate along a plane comprising waveguiding parameters $u_1, v_1$ defining a vector of an energy propagation path $f_1(x_1, y_1, z_1, u_1, v_1)$. For each of 4D or 5D, additional variables for time and color $f_1(\lambda_1, t_1)$ may be considered and assumed to be inclusive of any of the plenoptic functions as necessary for an application even when not explicitly noted for simplicity of the function and discussion. For the avoidance of doubt, the reference to an energy directing surface is for exemplary purposes only and may comprise any additional point, location, direction, or plane in space for the localization of a 5D coordinate, and collectively referred to as an energy "directing surface".

Along a first vector of an energy propagation path, a plurality of intersection points comprising convergence of energies may occur together with additional energy propagation paths. At this intersection point, a 3D point or depth parameter forms at location $X_1, Y_1, Z_1$ among the plurality of energy propagation paths with the 4D or 5D functions, wherein the 3D point of convergence $X_1, Y_1, Z_1$ among the plurality of energy propagation paths, where for each $x_1, y_1$ or $x_1, y_1, z_1$ coordinate contained within the energy directing surface or surfaces, there is only a single $u_1, v_1$ propagation path that forms between a first coordinate and the converging 3D point. The 4D function $f_z(x_1, y_1, u_1, v_1)$ or 5D function $f_z(x_1, y_1, z_1, u_1, v_1)$ collectively define all 4D $x_1, y_1$, or 5D $x_1, y_1, z_1$ coordinates and commensurate $u_1, v_1$ propagation paths that exist for each converging point at $X_1, Y_1, Z_1$.

At a first 5D coordinate resulting from the convergence of energies along a plurality of energy propagation paths through the energy directing surface $X_1, Y_1, Z_1$, the coordinate may represent a point within a larger object, volume, particle or localized energy parameter, wherein converging energies at additional coordinates proximate to the first 5D coordinate may exhibit additional vectorized properties for sensory energies within an environment or holographic dataset. These vectorized properties may comprise information for each 5D coordinate, for each energy location coordinate within the 4D dataset, for regions within either of the 4D or 5D datasets, or other sub-sets of coordinates comprising the energy surface.

In an embodiment, the universal parameterization of 4D and 5D holographic sensory energy properties for propagation of visual, auditory, somatosensory, gustatory, olfactory, vestibular or other desired energies for sensory system response for raster and vector 2D, 3D, 4D and 5D datasets are disclosed, wherein the 2D data may comprise a single angular sample, 3D data may comprise two or more angular samples in a single dimension, 4D data may comprise a plurality of angular samples in two dimensions, or 5D data may comprise a plurality of angular samples in three or more dimensions, in reference to the second coordinate of the second plane of the 4D energy directing surface.

Embodiments of received sample data may comprise any of:
1) 2D or monoscopic, flat, point cloud, uv-mapped geometry, intrinsic geometry, deep images, layered images, CAD files (intrinsic), single point sampling, single camera capture, single projector projection, volumetric (monoscopic single sample points with vectors in a volume), sources of 3 Degrees of Freedom (DoF; raster with monoscopic x, y, z rotation about a single point), sources of non-light field 6 DoF (raster+vectors from monoscopic samples), volumetric energy directing device (monoscopic samples in a volume), sources of Pepper's Ghost (single point projection), sources of 2D AR HMD (monoscopic single or multiple focus planes; layered monoscopic), sources of 2D VR HMD (monoscopic single or multiple focus planes; layered monoscopic), or any other representation of two-dimensional raster or vector information;
2) 3D or stereoscopic, triscopic (single baseline), multiview (1D), 1D multi-sample, 1D multi-perspective, horizontal or vertical only parallax, 1D projection array, two point sampling, 1D point sampling, horizontal or vertical array, bullet time, sources of 3 DoF (raster; stereoscopic x, y, z rotation about a single point), sources of 3 DoF (3D raster within stereoscopic x, y, z rotation about a single point), sources of non-light field 6 DoF (3D raster+vectors from stereoscopic samples), sources of 1D volumetric energy directing device (1D parallax contained samples), sources of autostereoscopic data, sources of horizontal multiview energy directing device, sources of 3D AR HID (stereoscopic single or multiple focus plane; layered stereoscopic), sources of 3D VR HID (stereoscopic single or multiple focus planes; layered stereoscopic), or any other representation of three-dimensional raster or vector information;
3) 4D or plenoptic (5D), multiscopic, integral image, light field (4D), holographic (4D), 2D multiview, 2D multisample, 2D multi-perspective, 2D parallax, horizontal and vertical parallax, 2D projection array, 2D point sampling, motion capture stage (along a surface), planar array, witness camera array, rendered or raytraced geometric representations (4D representations), extrinsic geometry (4D representation), sources of light field 6 DoF (4D raster within planar light field samples), sources of free-viewpoint 6 DoF (4D raster+vectors from 4D light field samples), sources of 4D volumetric energy directing device (2D parallax contained samples), sources of light field energy directing device (4D sampling), sources of light field HMD (near field 4D sampling), sources of holographic energy directing device (4D sampling), or any other representation of four-dimensional raster or vector information;
4) 5D or plenoptic+depth, light field+depth, holographic (5D sampling, 4D+depth), arbitrary multiview (along all x, y and z axis), multi-sample (along all xyz), multi-perspective (along all xyz), volumetric parallax (along all xyz), projection array (along all xyz), point sampling (along all xyz), motion capture stage (along all xyz), witness camera array (arbitrary xyz configurations), rendered or raytraced geometric representations (5D representations), cubic or volumetric rendering (along all xyz), extrinsic geometry (5D representation), sources of light field 6 DoF (5D raster within volumetric light field samples), sources of free-viewpoint 6 DoF (5D raster+vectors from 5D light field samples), sources of 5D volumetric energy directing device (multiplanar 4D sampling), sources of 5D light field energy directing device (5D sampling, 4D+multiple planes), sources of 5D light field HMD (near field 5D sampling, 4D+multiple planes), sources of holographic energy directing device (5D sampling, 4D+multiple planes), or any other representation of five-dimensional raster or vector information.

At each of the second coordinates, the provided data may comprise a sub-set or a super-set of either raster or vector samples and wherein samples may represent and include additional vectorized information to enable transformation into increased sampling density through interpretation or processing of the sub-set or super-set of raster or vector samples.

For each of 2D, 3D, 4D or 5D provided datasets, the information is converted through vectorized information, manual identification, computer vision analysis, automated processing, or other means to transform the provided samples from the original dataset into a 5D coordinate system. For each of 2D, 3D, 4D or 5D provided datasets, the information may comprise multiple samples or layers of samples as well as additional vectorized properties in respect to the originating angular sampling component for each provided dataset in reference to the second coordinate of the second plane of the 4D energy directing surface, or may comprise a combination of contributing samples for any of 2D, 3D, 4D or 5D additional provided datasets.

Each of the provided samples comprise intrinsic energy for each desired coordinate, wherein the intrinsic energy may include additional extrinsic energy attributes, where the intrinsic energy represents value at a given 5D coordinate in the absence of other external samples, properties or environmental conditions. In the electromagnetic spectrum, this may be referred to as the albedo as the dimensionless measurement for reflectance corresponding to a white body that reflects all incident radiation, but explicitly extended to each desired sensory energy wherein the range of dimensionless values is commensurate to the specified sensory energy. Within the visual sensory systems, this range is approximately 400 nm to 700 um, and in the auditory sensory systems, this range is approximately 20 Hz to 20 kHz.

Over the past several decades, vast technological improvements enabling the reproduction of human senses artificially leveraging sophisticated pattern recognition of detected sensation, aromas and flavors through electronic means. For other systems that may exist outside of the electromagnetic spectrum, these dimensionless values may be characterized in the same way based upon sensed acuity response. While holographic sensory energy technologies are newly emerging, disclosed within this embodiment comprises a system, method and format for the stimulation of all human senses in a virtual environment to articulate the universal construct for various sensory parameters whereby provisioning for the appropriate data handling, transmission, storage, vectorization, translation to, from and between any sensory energy parameter or device desired for complete immersion of the constructed virtual environment and embodiments of energy propagation for holographic sensory technologies will be disclosed in future applications. It is additionally the intent of this disclosure to enable other analogue devices, including novelties like the classic "smell-o-vision," or contemporary versions like FeelReal's smelling VR headset, to leverage the parameterized values provided for within the vectorization of the dataset herein.

In an embodiment, the somatosensory system may be defined based upon the components that define sensitivity including mechanoreceptors for textures with a pressure sensitivity range in the skin that may be normalized between 50 Hz to 300 Hz, thermoreceptors with a temperature sensitivity range in the skin that may be normalized between 0° c. to 50° c. (although this range may be much wider range with upper and lower bounds defined by the extremes of temperature) or surface deformability defining the range of viscoelastic behaviors of a material measure both viscous and elastic characteristics when undergoing deformations between stress and strain over time which provides for a multiplicity of physics including variables for time, strain, modulus, among other dynamics, and for the purposes of this disclosure is simplified to a dimensionless normalized scale with a value of 0 for unmovable solids such as granite, and I for low viscosity liquids such as water. Those skilled in the art will understand that the actual vectors provided will comprise the necessary physics to appropriately define the viscoelasticity of the material, and normalized for exemplary purposes only.

Finally, state of the art advances in artificial electronic sensing including gustatory and olfactory devices demonstrate a viable path to further vectorizing the sensory parameters disclosed for the Holodeck design parameters, as well as enable the electronic reproduction of artificial taste and smell through a holographic waveguiding means as described herein. Artificial electronic taste and smell receptors have made considerable progress through emerging nanodevices, wherein frequency-based artificial taste receptors using an enzymatic biosensor to sample the intensity of chemical stimulus through the encoding and conversion to frequency based pulses to both repeatedly and accurately detect taste as frequencies of the sampled chemical compositions through a pattern recognition system resulting in the detection of the tastes that compose the human palate. It is believed that the technology may be extended to all types of detectable tastes and similar advances in artificial olfactory system have demonstrated digital interfaces for stimulating ones smell receptors using weak electrical pulses targeting the nasal conchae with ongoing studies to further parameterize the patterns contained within frequencies of particular olfactory responses through variation in electrical signals.

With the path established for the arbitrary generation of frequencies and complex electronic patterns to represent olfactory, gustatory and other sensory system, in one embodiment, the acuity response for taste may be vectorized to comprise a normalized scale for each of electronically controlled parameters along a scale from 0 to 1 to represent the minimum and maximum gustatory response to saturate the average human's 2,000-8,000 taste buds, potentially comprising but not limited to vectors for sourness, saltiness, bitter (spiciness), sweetness, and savoriness (umami) wherein the vector and the spatial coordinate of the vectorized signals may inform the production for the complex olfactory implementations.

In another embodiment, the acuity response for smell may be further vectorized to comprise a normalized scale for each of electronically controlled parameters along a scale from 0 to 1 to represent the minimum and maximum olfactory response to saturate the average human's 10 cm$^2$ of olfactory epithelium, for each of the highly complex olfactory spaces potentially comprising but not limited to vectors for fragrant, fruity, citrus, woody (resinous), chemical, sweet, mint (peppermint), toasted (nutty), pungent and decayed wherein the vector and the spatial coordinate of the vectorized signals may inform the production for the complex olfactory implementations.

Each of these vectors may provide the normalized values representing these patterns for taste, smell or other sensory domains, converted to a wave, amplitude, magnitude or other attribute as required for the appropriate application of the provided vectorized values. While the sense of smell and taste are two of the most highly debased senses within the sensory system, with parameterized values to vectorize complex amalgamations, it is additionally possible in an embodiment to provide for user based interactive control over the sensitivity of any such sensory energy to provide for customization of individualization of each of visual, auditory, somatosensory, gustatory, olfactory, vestibular or other desired sensory system responses.

In an embodiment, each of the represented sensory albedo energy values of the sample may additionally comprise extrinsic energy attributes baked into the single sample value representing the additive result of each provided sample respective of other external samples, properties or environmental conditions. In this configuration, the compound sample value may or may not exhibit latent attributes of other energies from other samples in a physically based or simulated environment. The most efficient and pure methodology to transmit the parameterized and reconstructed holographic dataset is based upon the singular intrinsic sample information providing for simplified and lower bandwidth frequency information, although this is not always possible to receive outside of entirely synthetic environments, particularly for physically based imaging or acoustic systems. In any real-world environment, there is always some amount of extrinsic contribution to the resultant sample information. Certain systems like the Light Stage, or other systems known in the art to facilitate the estimation of reflectance, shape, texture, and motion capture leverage some form of structured illumination and one or more imaging devices which provide for the direct or indirect analysis of the albedo, depth information, surface normal and bidirectional scattering distribution surface properties.

The bidirectional scattering distribution function (BSDF) is a generalized superset of the bidirectional transmittance distribution function (BTDF), the bidirectional texture function (BTF), and the bidirectional reflectance distribution function (BRDF), which are often represented by the generalized function $f_r(w_i, w_r)$, collectively act as a model to parameterize and identify surface properties in computer graphics and vision algorithms known in the art. The function describes how visible light is reflected, transmitted or otherwise interacts with a surface given an incoming incident direction $w_i$ and outgoing reflected or transmitted direction $w_r$ for an energy propagation path, where the surface normal is perpendicular to the tangent of the object surface and the function describes the ratio of reflected radiance exiting along the outgoing path $w_r$ to the irradiance incident on the surface along the incoming path $w_i$, wherein each of $w_i, w_r$ may comprise a 4D function to define a parameterized azimuth and zenith angle for each of the incoming light path and the exiting light path.

The functions may further be articulated for a first location $x_i$ of energy $\lambda_i$ striking a surface, and exit after material properties internally scatter the energy to a second location $x_r$ of energy $\lambda_r$ to account for visible wavelength effects like iridescence, luminescence, subsurface scattering, non-local scattering effects, specularity, shadowing, masking, interreflections, or the like, resultant output energy based upon material properties of a surface, the input energies and locations, the output energies and locations across the surface of an object, volume, or point.

Therefore, the generalized properties to describe how energy is transported between any two energy rays that strike a surface, to include wavelength or frequency dependency and spatially varying material properties or surfaces, may be represented as a 10D function, and specified as $f_r(\lambda_i, x_i, w_i, \lambda_r, x_r, w_r)$ for each or any of the available or provided samples within a dataset to account for input energy, the impact of a vectorized surface profile, and the output reflected, refracted, specular, transmitted, scattered, diffused, or other material property result from any energy domain given the generalization of the function $f_r$.

In consideration now of the energy directing surface, the plenopic 4D function provides for two spatial coordinates $x_l, y_l$ from a first plane comprising energy locations and directed through a second coordinate along a second plane comprising waveguiding parameters $u_l, v_l$ defining a vector of an energy propagation path $f_l(x_l, y_l, u_l, v_l)$ In consideration of a plurality of energy directing surfaces, the plenoptic 5D function provides for three spatial coordinates $x_l, y_l, z_l$ from a first coordinate comprising one or more energy locations and directed through a second coordinate along a plane comprising waveguiding parameters $u_l, v_l$ defining a vector of an energy propagation path $f_l(x_l, y_l, z_l, u_l, v_l)$ For each of 4D or 5D, additional variables for time and color $f_l(\lambda_l, t_l)$ may be considered and assumed to be inclusive of any of the plenoptic functions as necessary for an application even when not explicitly noted for simplicity of the function and discussion.

Along a first vector of an energy propagation path, a plurality of intersection points comprising convergence of energies may occur together with additional energy propagation paths. At this intersection point, a 3D point or depth parameter forms at location $X_l, Y_l, Z_l$ among the plurality of energy propagation paths with the 4D or 5D plenoptic functions, wherein the 3D point of convergence $X_l, Y_l, Z_l$ among the plurality of energy propagation paths, where for each $x_l, y_l$ or $x_l, y_l, z_l$ coordinate contained within the energy directing 4D surface or 5D surfaces, there is only a single $u_l, v_l$ propagation path angle that forms between a first coordinate and the converging 3D point. The 4D function $f_{\angle}(x_l, y_l, u_l, v_l)$ or 5D function $f_{\angle}(x_l, y_l, z_l, u_l, v_l)$ collectively define all 4D $x_l, y_l$, or 5D $x_l, y_l, z_l$ coordinates and commensurate $u_l, v_l$ propagation paths that exist for each converging point at $X_l, Y_l, Z_l$.

At a converging coordinate $X_l, Y_l, Z_l$, a surface is formed and the surface may comprise a point, volume, object or other embodiment comprising a 3D position of converging energy propagation paths. The provided samples for each surface location may comprise one or more surface properties, vectors, materials, characterizations, or other identifying property $V_i$ to characterize or otherwise process the resulting energy, as well as one or more input energy sources striking a given point proximate to the surface location wherein the reflectance function now comprises a generalized vector for the various properties of the surface and represented as an 11D universal object parameterization function $f_r(\lambda_i, x_i, w_i, \lambda_r, x_r, w_r, V_i)$.

The 11D universal holographic parameterization function $f_r(\lambda_i,x_i,w_i,\lambda_r,x_r,w_r,V_i)$ defines the resultant values for a given environment and vectorized object properties and the 4D function $f_l(x_l,y_l,u_l,v_l)$ defines the energy propagation paths from an energy directing device surface, may therefore be further generalized as an 15D universal holographic parameterization function $f_r(\lambda_i,x_i,w_i,\lambda_r,x_r,w_r(x_l,y_l,u_l,v_l),V_i)$ where the transmitted direction $w_r$ defines and equals the propagation path of $u_l,v_l$, whereby defining the spatial coordinate $x_l,y_l$ and for each transmitted direction $w_r$ there may be only one $f_l(x_l,y_l,u_l,v_l)$ set of values to satisfy $w_r=u_l,v_l$. Those skilled in the art will appreciate the various transforms and mathematical constructs in addition to the rendering requirements associated with the disclosed universal parameterization of 4D and 5D holographic sensory energy properties.

With the complete 15D function describing the vectorization of all sensory energy properties to coincide with surfaces formed from converging points in space, multiple orders of magnitude of required data have been fundamentally eliminated provisioning for a viable path to enabling the transmission of truly holographic datasets.

The vectorized properties strive to provide accurate physics for each of the sensory domains for properties that may be synthetically programmed, captured, or computationally assessed, wherein $V_i$ may prescribe attributes for each surface, volume or 3D coordinate $X_l,Y_l,Z_l$ vectorized properties about an object for a given sample within a provided dataset for general system metadata or for each or any sensory energy domain, comprising:

1) system metadata may provide for any of the sensory energy specific attributes or system wide references for surface properties for each sample including normals, depth information, environmental properties, multiple angular samples for a given 3D coordinate, procedural textures, geometry, point clouds, deep image data, static frames, temporal frames, video data, surface IDs, surface passes, coordinate maps, virtual camera coordinates, virtual illumination and visible energy information, environment maps, scene information outside of the field of the visual sensory sample information, curves, vertices, temporal information, networked data, databases, object recognition, energy devices, external data feeds, sensors for system modifications and interactivity, system status, voice recognition, olfactory detection, auditory detection, facial recognition, somatosensory recognition, gustatory recognition, UI, UX, user profiles, flow and motion vectors, layers, regions, transparency, segments, animation, sequence information, procedural information, displacement maps, or any other scene data that is necessary to provide sufficient data for the appropriate processing of each sample;

2) visual sensory energy may provide surface properties to define the appropriate rendering of visible or non-visible electromagnetic energy, iridescence, luminescence, subsurface scattering, non-local scattering effects, specularity, shadowing, absorbance, transmission, masking, interreflections, albedo, transparency, physics, dynamics, reflection, refraction, diffraction, optical effects, atmospheric effects, frequency, modulation, surface profiles, textures, displacement maps, physics and dynamics to specifically interrelate to other sensory energies and respond based upon provisioned energies (e.g. vibrations of sound altering reflectance properties or tactile material deformation causing surface deformations), layers, regions, transparency, segments, curves, animation, sequence information, procedural information, size of material, environmental conditions, room dynamics, or other related material properties for a surface, environment, room, object, point, volume or the like;

3) auditory sensory energy: vectors related to the placement of localized sound fields, magnitude, amplitude, mass, material propagation parameters, absorbance, transmission, material properties informing acoustic reflectance, diffusion, transmission, augmentation, masking, scattering, localization, frequency dependence or modulation, pitch, tone, viscosity, smoothness, texture, modulus, any other parameters that determine the propagation of acoustic waves within the object, surface, medium or otherwise, physics and dynamics to specifically interrelated to other sensory energies and respond based upon provisioned energies (e.g. temperature changing the sound of a material), layers, regions, transparency, segments, curves, animation, sequence information, procedural information, size of material, environmental conditions, room dynamics, or other related material properties for a surface, environment, room, object, point, volume or the like;

4) somatosensory energy vectors related to the mechanoreceptors for textures, pressure, thermoreceptors, temperature, surface deformability parameters and vectors defining the range of viscoelastic behaviors of a material measure both viscous and elastic characteristics when undergoing deformations between stress and strain over time which provides for a multiplicity of physics including variables for time, strain, modulus, among other dynamics, layers, regions, transparency, segments, curves, animation, sequence information, procedural information, size of material, environmental conditions, room dynamics, or other related material properties for a surface, environment, room, object, point, volume or other somatosensory parameters;

5) gustatory sensory energy vectors for fragrant, fruity, citrus, woody (resinous), chemical, sweet, mint (peppermint), toasted (nutty), pungent and decayed wherein the vector and the spatial coordinate of the vectorized signals may inform the production for the complex olfactory implementations and further provide duration, magnitude, frequency, length, time, radius, modulation, layers, regions, transparency, segments, curves, animation, sequence information, procedural information, size of material, environmental conditions, room dynamics, or other related material properties for a surface, environment, room, object, point, volume or other gustatory sensory parameters;

6) olfactory sensory energy vectors for sourness, saltiness, bitter (spiciness), sweetness, and savoriness (umami) wherein the vector and the spatial coordinate of the vectorized signals may inform the production for the complex olfactory implementations and further provide duration, magnitude, frequency, length, time, radius, modulation, layers, regions, transparency, segments, curves, animation, sequence information, procedural information, size of material, environmental conditions, room dynamics, or other related material properties for a surface, environment, room, object, point, volume or other olfactory parameters;

7) or other interrelated sensory dynamics based upon physical, synthetic, transmitted, or computational interdependencies from any other sensory sample dataset, sensory system vectors as needed, designed, or required and any additional sensory properties where parameterization of a particular characteristic is beneficial for the reconstruction, storage, processing or transmission of generalized holographic constructed data.

With the received dataset comprising 2D data having a single angular sample, 3D data having two or more angular samples in a single dimension, 4D data having a plurality of angular samples in two dimensions, or 5D data having a plurality of angular samples in three or more dimensions.

For all provided source materials, each source material may undergo additional processes to appropriately prepare for efficient vectorization of the holographic dataset. For any provided source materials that exhibit lower spatial or angular resolution that the energy directing surface, a transformation process may be required in order to accurately convert the originating source to a 4D or 5D dataset.

For appropriate preparation, in an embodiment, provided 2D or 3D source materials comprise photographic capture from a standard imaging system. Within this sequence of images are rastered reflections, refractions, transparent elements and other similar examples of material property interaction with physically based illumination.

In the event that the content is prepared by simply identifying surface IDs for the surfaces with the already rastered material properties, the effective data may be sufficient for converging into a 4D coordinate system, however, any additional rendering applied to these surfaces will exhibit a double image for the physics of both the photographic, as well as the parameterized synthetic rendered reflectance properties. The ideal source dataset for efficient holographic transmission comprises an albedo representation of the sample source information, plus vectorized material properties for each of the specified energy domains with metadata forming an object-based volumetric sampling of the albedo multi-view samples, and wherein all material properties provide for accurate surface identification and rendering as well as the localization or projection of other sensory energies accurately based upon the specified vectorized surface properties.

In an embodiment, manual, semi-automated, computer vision, or automated processes are provisioned to algorithmically or manually assess the content within the source sample dataset, and wherein a manual or algorithmic analysis is performed whereby segmentation and other object isolation methodologies known in the art are performed to identify the regions that include undesired physically rasterized effects. In an embodiment, a person is photographed in front of a background wherein the material properties of the person include reflections from the environment, and the background objects are occluded by the photographed person. After these regions have been identified as undesirable, a process may be leveraged to 1) isolate the objects in question; 2) separate all object elements into the core components to account for occlusion, transparency, edges, or other element; 3) through image analysis, temporal analysis, energy analysis, with the facilitation of machine learning, computer vision, extra hardware and energy devices that additionally captured information about the scene, objects and/or environment, or through completely manual means, the object elements are provisioned such that any surface that should exhibit a material property has any such baked-in material properties removed through computer vision, algorithms, processors, or manual visual effects wherein the manual processes are generally known in the art for methods to perform wire removals, paint fix, clean plates, image restoration, alpha matte creation, occlusion filling, object recreation, image projection, motion tracking, camera tracking, rotoscope, optical flow, and the like for the purpose of regenerating the intrinsic material property in the absence of the extrinsic material properties thereby preparing the content for the most efficient transmission and propagation for said dataset; 4) An additional process of the above involves the manual or computer assisted identification of depth or 3D coordinate values for each of the desired samples; and 5) Further within this embodiment is the identification of the associated material properties, each of which represent a point, region of data, surface, object or other representation of a material such that the data may easily be further rendered within the energy directing device's display drivers or within any additional system capable of either encoding and decoding the parameterized dataset.

In an embodiment, the dataset from the above comprises 3D multiview samples that are prepared with albedo visual energy samples, each of which having multiple layers of rgba information, a collection of vectorized material properties to associate each segmented material with a surface ID and series of surface parameters to closely reconstruct the original source dataset prior to the removal of the extrinsic image data, and wherein an acoustic dataset is provisioned with vectorized material properties associated with the material properties of the visual energy system as well as multiple sound channels each having identified frequency, modulation, spatial placement and other sound localization properties, and wherein a somatosensory sensory energy dataset is provided for a subset of the surfaces contained within the visual energy dataset, to additionally comprise viscoelastic and temperature vectorized material properties, both of which are correlated to the other vectorized datasets.

From any provided dataset, each provided sample from the visual energy dataset is assessed for a relative depth position in relation to the energy directing device surface, and wherein each of the samples for any of the visual energy samples are placed into a 3D coordinate system, and wherein the energy propagation path length for each of the provided samples is assessed in relation to the function that correlates each 3D coordinate in relation to the plurality of coexisting converging energy propagation paths that intersection a first 3D point at location $X_I, Y_I, Z_I$ among the plurality of energy propagation paths within the 4D or 5D plenoptic functions, where for each $x_I, y_I$ or $x_I, y_I, z_I$ coordinate contained within the energy directing 4D surface or 5D surfaces, there is only a single $u_I, v_I$ propagation path angle that forms between a first coordinate and the converging 3D point. The 4D function $f_Z(x_I, y_I, u_I, v_I)$ or 5D function $f_Z(x_I, y_I, z_I, u_I, v_I)$ collectively define all 4D $x_I, y_I$, or 5D $x_I, y_I, z_I$ coordinates contained within the energy directing device and commensurate $u_I, v_I$ propagation paths that exist for each converging point at $X_I, Y_I, Z_I$ and wherein the total number of samples per presented or available 4D $x_I, y_I$, or 5D $x_I, y_I, z_I$ spatial coordinates is known after performing this analysis process, and wherein the total energy propagation path length between each 3D point at location $X_I, Y_I, Z_I$ to the 4D or 5D coordinate location is known, and wherein a weighted distribution based upon total available samples per 4D or 5D coordinate and minimum path length to the sampled 3D coordinate values from the available plurality of 3D coordinate data provides for a complete sampling of the 4D or 5D light field from an arbitrary dataset.

As a further embodiment of the above, after each of the samples for any of the 1) visual, acoustic, somatosensory, and any other provided energy samples are 2) placed into a 3D coordinate system based upon the provided dataset, additional processing, or additional vectorized properties, and before performing a coordinate analysis; 3) the 15D universal holographic parameterization function $f_r(\lambda_i, x_i, w_i, x_r, x_r, w_r(x_l, y_l, u_l, v_l), V_i)$ is assessed wherein 4) additional known environmental scene, geometry, metadata or the like is provided, each with independent vectorized material properties; 5) virtual illumination information is provided and the additional sensory energy metadata properties are assessed for any potential interference between the properties that may altering the rendering functions and; 6) the 15D parameterization function assesses for each provided 3D coordinate and commensurate vectorized material property to; 7) perform a rendering process through on-line, off-line, real-time, processor, ASIC, FPGA, cloud, or other form of rendering process to result in a new plurality of angularly varying material properties given the arbitrary provided dataset, and wherein 8) the rendering process is specific to each of the transmitted direction $w_r$, defining and equal to each of the propagation paths $u_l, v_l$, whereby defining the spatial coordinate $x_l, y_l$, and for each transmitted direction $w_r$, there may be only one $f_i(x_l, y_l, u_l, v_l)$ set of values to satisfy $w_r = u_l, v_l$, and wherein 9) based upon the rendered results and resultant available new angularly varying material properties, for each of the 4D or 5D coordinates comprising the energy propagation path length for each of the provided samples are assessed in relation to the function that correlates each 3D coordinate in relation to the plurality of coexisting converging energy propagation paths that intersection a first 3D point at location $X_l, Y_l, Z_l$ among the plurality of energy propagation paths within the 4D or 5D plenoptic functions, where for each $x_l, y_l$ or $x_l, y_l, z_l$ coordinate contained within the energy directing 4D surface or 5D surfaces, there is only a single $u_l, v_l$ propagation path angle that forms between a first coordinate and the converging 3D point. The 4D function $f_Z(x_l, y_l, u_l, v_l)$ or 5D function $f_Z(x_l, y_l, z_l, u_l, v_l)$ collectively define all 4D $x_l, y_l$, or 5D $x_l, y_l, z_l$ coordinates contained within the energy directing device and commensurate $u_l, v_l$ propagation paths that exist for each converging point at $X_l, Y_l, Z_l$ and wherein the total number of samples per presented or available 4D $x_l, y_l$, or 5D $x_l, y_l, z_l$ spatial coordinates is known after performing this analysis process, and wherein the total energy propagation path length between each 3D point at location $X_l, Y_l, Z_l$ to the 4D or 5D coordinate location is known, and wherein a weighted distribution based upon total available samples per 4D or 5D coordinate and minimum path length to the sampled 3D coordinate values from the available plurality of 3D coordinate data provides for a complete sampling of the 4D or 5D light field for all provided sensory energies from an arbitrary dataset.

An additional embodiment of the above system wherein the rendering additionally accounts for a bidirectional energy directing surface such that sensed electromagnetic energy representing the illumination of the real-world environment, or the absorbance of certain acoustic frequencies within the environment may result in the dynamic or off-line update to the rendering process or other sensed interactive real-world element is assessed, and wherein the illumination and acoustic or other sources are adjusted to accommodate for the modification in environmental conditions.

Turning back to FIG. 8, in view of the principles disclosed above, in an embodiment of process 800, the received content data may further comprise vectorized material property data, and wherein the process 800 further comprises a step 830, in which digital volumetric representation of the content data is associated with the vectorized material property data; and wherein, in step 804, determining energy source location values is based on at least the vectorized material property data associated with the volumetric representation of the content data.

Figure 13:
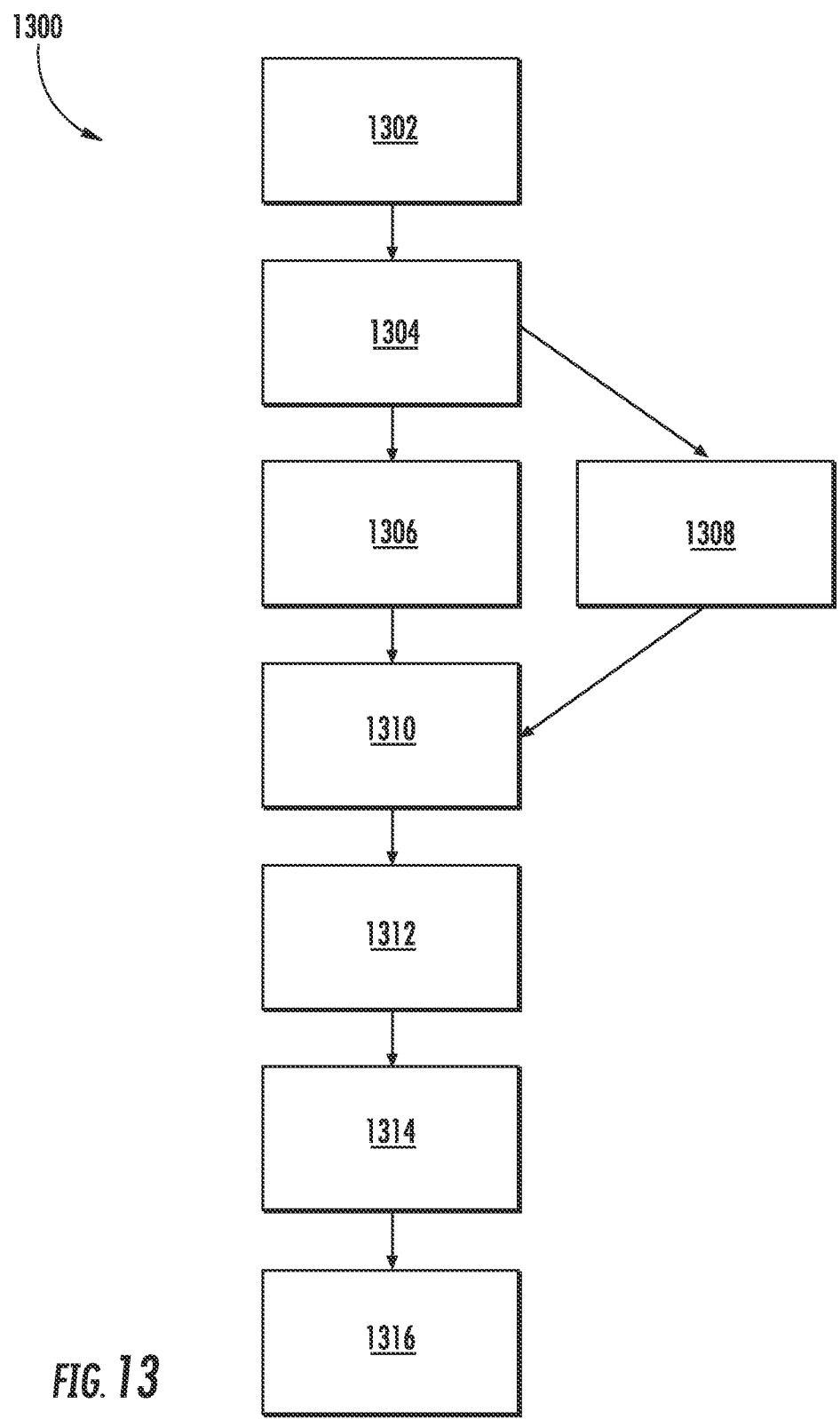
FIG. 13 is a block diagram illustrating an embodiment of a vectorization process.

Referring to FIGS. 9 and 13, in an embodiment, a vectorization process 1300 may include a step 1302 in which first content data is received and a step 1304 in which identifying a surface 915 in the content data. In an embodiment, identifying the surface 915 may comprise using segmentation data in the content data. The vectorization process 1300 may further include a step 1306 in which a surface identification of the surface 915 is determined and a step 1308 in which material property data of the surface 915 is determined. In an embodiment, determining the material property data may comprise manual determination, or using a predetermined process. After steps 1306 and 1308, the vectorization process 1300 may further include a step 1310 in which the surface identification is associated with the material property data of the surface 915. The vectorization process 1300 may further include a step of 1312 in which the vectors of the material property data is created. The vectorization process 1300 may further include a step 1314 in which vectorized material property data is generated based on the created vectors.

In an embodiment, the process 1300 may optionally include a step 1316 in which material property data is removed from the first content data and replaced by the vectorized material property data is generated in step 1314. In an embodiment the vectorized material property data is generated in step 1314 may used in process 800 as discussed above to determine 4D plenoptic coordinates for the energy directing devices of the present disclosure as discussed above.

The process 1300 may be carried out using any processing system of the present disclosure, including processing system 1200. In an embodiment, content data may be received in step 1302 through the data input/output interface 1201, and steps 1304 thru 1314 of the vectorization process 1300 may be carried out using the vectorization engine 1204 Additionally, the vectorized material property data generated in step 1314 may be used by the sensory data processor 1202 and tracing engine 1206 for processing according to the steps of process 800 as discussed above. Steps 808 and 812 may be performed by the tracing engine to determine 4D coordinates for holographic presentation. Step 810 may be performed by the sensory data processor 1202. The output of the processing subsystem may be provided to a compression engine 1210, from which compressed data may be stored in a memory or provided to the data input out interface 1201 for transmission to an energy directing system either connected locally or remotely to the system 1210. Data may also be stored in the memory 1208 until a later time to be retrieved.

Rendering a 4D Energy Field from a 3D Environment

Further contemplated in the present disclosure are embodiments of an inverse tracing process that allows for rendering digital volumetric representations to a format compatible with the energy directing device 1000 with inverse mapping that provides for an inverse path to sample the digital volumetric representation of content data which can be presented as a 3D environment.

Rendering a 4D energy field from a 3D environment poses many challenges. For explanatory purposes, some of these challenges are described in context of a light field. But, the disclosures of this application are applicable to other forms of energy. And, these descriptions do not limit application of these principles to other energy forms.

Figure 14:
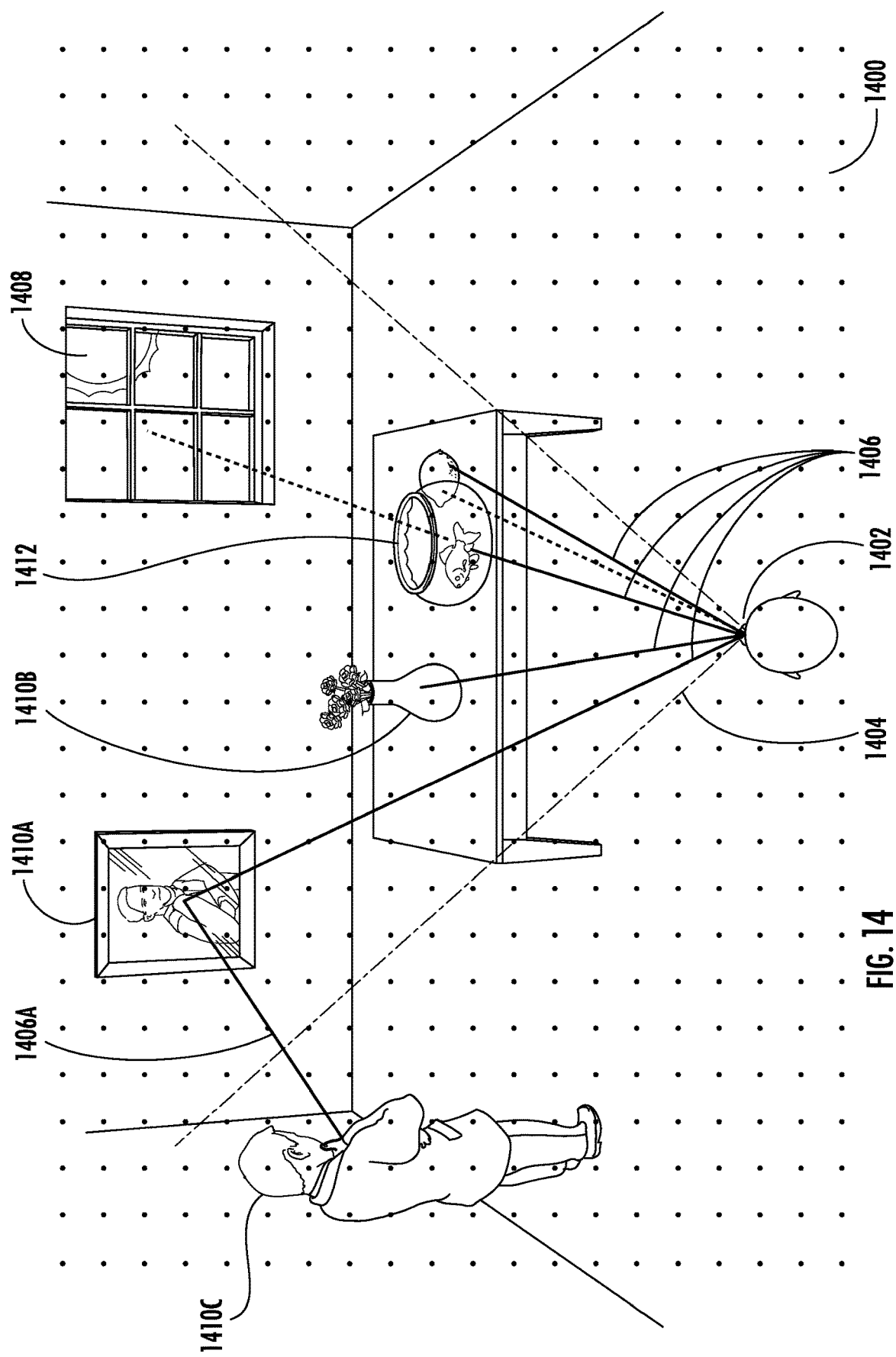
FIG. 14 illustrates some aspects of modeling energy in a 3D environment.

Energy in a 3D environment interacts with objects in a 3D environment in a variety of different ways depending on the physical properties of the objects in the 3D environment that may model how energy is generated, reflected, absorbed, transmitted or otherwise impacted by these objects. FIG. 14 illustrates how some interactions between energy and objects throughout a 3D environment impact the perception of a scene from that environment. Illustrated is an observation point 1402 of a virtual observer in a 3D environment 1400 with a field of view 1404. Energy rays 1406 can reach the observation point directly from an energy source 1408 or by bouncing off reflective objects 1410A, 1410B, 1410C that affect the attributes of the energy when it arrives at the observation point 1402. Various attributes of energy in the 3D environment 1400 may be considered, including of visual, auditory, somatosensory, gustatory, olfactory, vestibular or other desired energies as described throughout the present disclosure, including paragraph 203. Note, that FIG. 14 only partially depicts some energy paths towards an observation point. The sources for some of the energy paths and other reflections may be omitted from the figure, as will be appreciated. In some cases, a single energy path 1406A, reflects off multiple objects 14010A,1410C—some of which 1410C may be out of the observation point's 1402 field of view 1404—on its way to the observation point 1402. On the way to observation point 1402, energy 1406 can also pass through partially transmissive objects 1412, or refractive objects (not shown) that alter how energy is sensed when it reaches the observation point 1402. Thus, accurate rendering of a scene from a 3D environment may take some accounting for the multitudes of interactions that occur both in and out of the field of view 1404 from the observation point 1402 of a virtual viewer in the 3D environment. This can be further complicated in a holographic system because holographic systems may require simultaneous projection of a large number of unique energy convergences. FIG. 14 is presented for illustrative purposes and oversimplifies some possible aspects for ease of explanation. It will be appreciated that a 3D environment may account for many additional physical properties that impact the propagation of energy in the 3D environment, and FIG. 14 does not limit the embodiments of this disclosure.

Prior art techniques to render 4D energy-field data from a 3D environment include double frustrum rendering, oblique rendering, and multiview rendering. Double frustrum rendering is a multi-pass rendering method that fails to account for data outside the field of view of the observation points and requires computationally complex post-hoc integration of data from the multiple rendering passes. Oblique rendering also requires complex post-hoc computation, requires thousands to tens of thousands of rendering passes, and makes unrealistic assumptions about physical energy-projection systems like perfect projection optics, and no aperture. Oblique rendering also fails to integrate simply into existing workflows. And, finally, multi-view rendering, does not allow for simultaneous rendering out of the field of view and in the field of view, and presents some of the other problems presented by double frustum rendering and oblique rendering.

Embodiments of the present application allow a system and method for single-pass rendering of a 3D environment into a data set for 4D energy-projection. The embodiments of this disclosure produce noticeably smoother and more cohesive energy-field projections at least because the single-pass rendering allowed by the present disclosure avoids computationally-challenging post-hoc integration efforts. And, because the methods and systems of this disclosure account for both in-screen and offscreen effects. In embodiments, the system and method may include wavelength/energy considerations, and display-specific calibration (or may include any other functions to move seamlessly between various systems). This may additionally include pixel processing with displacement maps to compute other 4D coordinates if and when it is advantageous.

Figure 15:
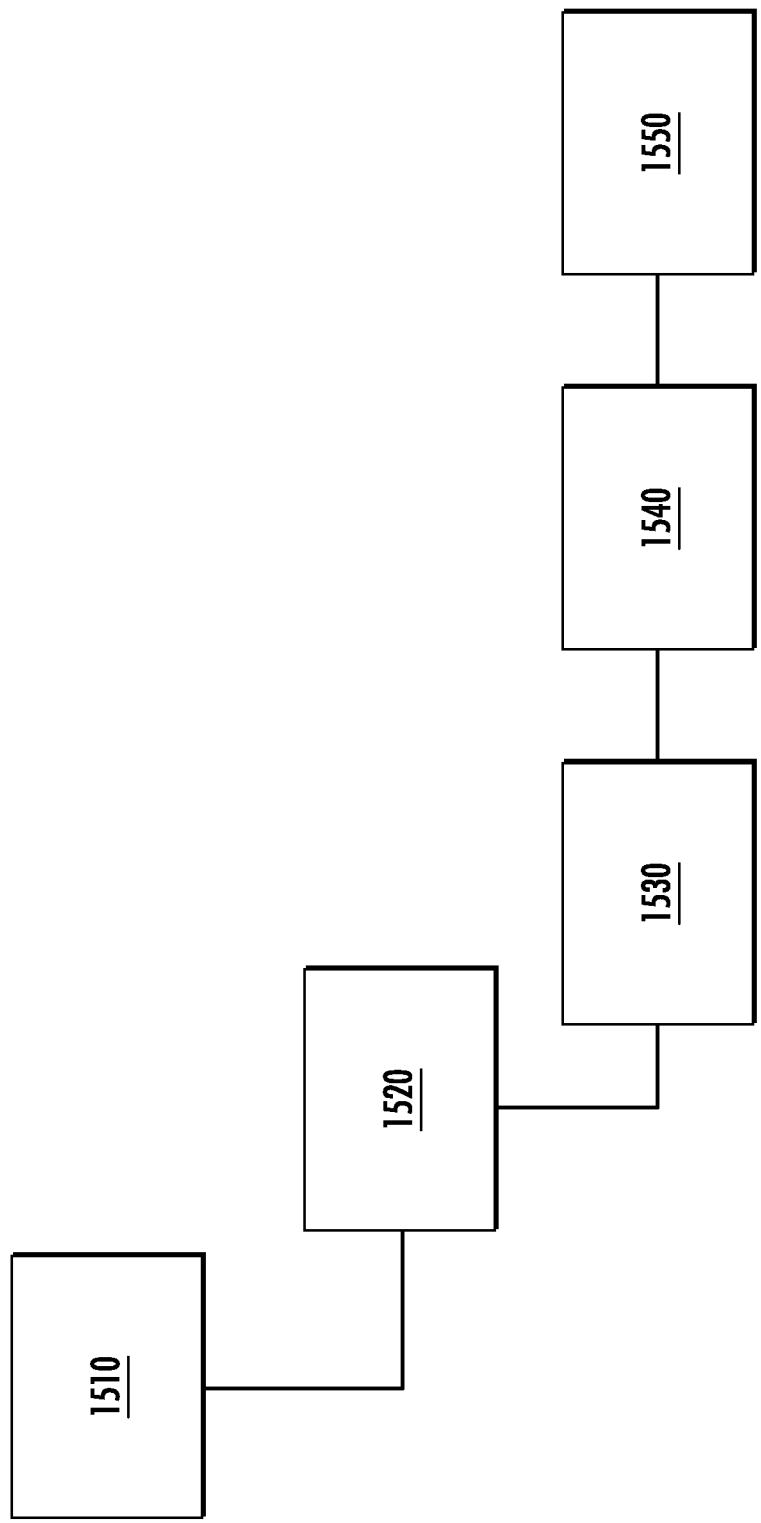
FIG. 15 is a flow chart illustrating an embodiment of a process for rendering a 4D energy-field from a 3D environment.
Figure 16:
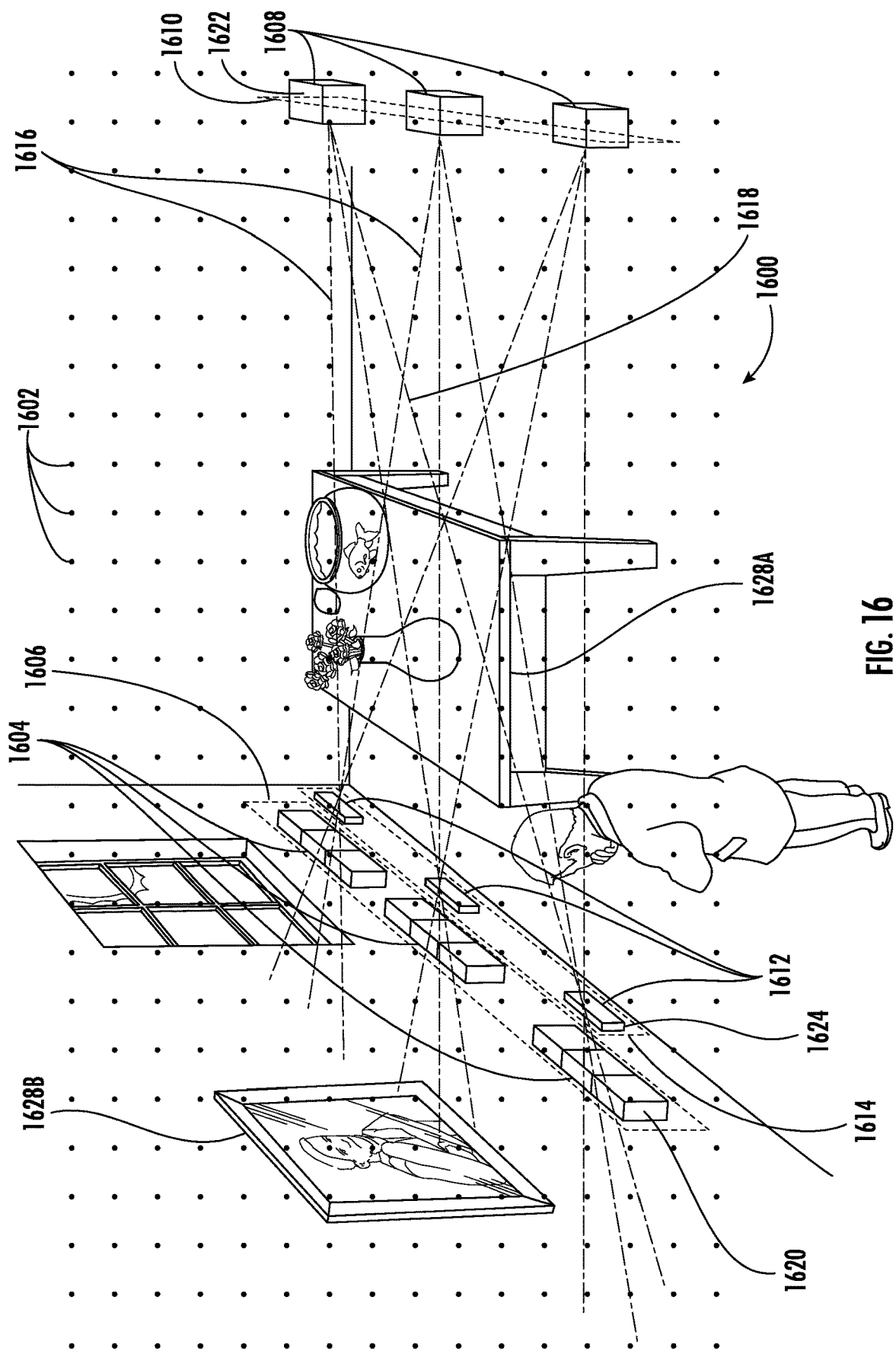
FIG. 16 A depicts a visual representation of a 3D environment.

FIG. 15 is a flow chart illustrating an embodiment of a process for rendering a 4D energy-field from a 3D environment. With reference to FIGS. 15 and 16, the process may include a first step 1510 for providing a scene 1600 in a 3D environment described by a plurality of energy-data points 1602 located throughout the scene 1600. A visual representation of a scene 1600 in a 3D environment is depicted in FIG. 16. As can be appreciated, energy-data points 1602 may be configured in different ways in different embodiments of a 3D environment. The energy-data points 1602 may comprise a value, or collection of values that describes various physical properties that determine the virtual appearance of the scene 1600 and how elements in the scene 1602 may interact. Some examples of this are color, reflectance, material properties, and energy directions. Other properties that may be considered in scene 1600 may include visual, auditory, somatosensory, gustatory, olfactory, vestibular or other desired energies In some embodiments the energy-data points may store a multidimensional function. The function may comprise values that correspond to properties in the physical world that describe how energy may be reflected, refracted, transmitted, or otherwise affected as energy intersects with the energy-data points 1602. And, in some embodiments, the energy-data points 1602 may also comprise intensity and directional information that allow the energy-data points to collectively model propagation of energy in the scene 1600. It should also be noted that the energy-data points 1602 may contain energy values for other types of energy in addition to, or instead of, information related to electromagnetic energy in the visible spectrum. There are no limits to the type of information that can be stored as a value in an energy-data point 1602.

It will be appreciated that there are various ways to configure or arrange energy data points 1602 in a 3D environment. The density of energy data points 1602 in a 3D environment 1602 may vary from embodiment to embodiment. Or, in some embodiments, the density of energy data points 1602 may vary from location to location in a 3D environment 1600, or object to object 1600 in a 3D environment.

In some embodiments of 3D environments 1600, the energy-data points 1602 may correspond to locations in a virtual or physical space. And, the values of the energy-data points 1602 may change as different objects occupy the space where the energy-data points are mapped. The values of the energy-data points 1602 may also change as light propagates through an embodiment of a 3D environment. And, again, it should be noted that while FIG. 16 depicts a scene in an electromagnetic 3D environment, this disclosure is not limited to energy in that domain. Embodiments of the 3D environment may describe other types of energy in addition to electromagnetic energy in the visual spectrum, such mechanical energy in the form of ultrasound waves which may be used to create tactile surfaces. Other energies described may include visual, auditory, somatosensory, gustatory, olfactory, vestibular or other energies.

Again with reference to FIG. 15 and FIG. 16, in embodiments the process for rendering a 4D energy-field from a 3D environment may comprise a second step 1520 comprising locating a plurality of virtual pixels 1604 on a virtual pixel plane 1606 in the scene 1600 wherein each pixel has a known unique 4D coordinate that comprises a 2D angular coordinate and a 2D spatial coordinate wherein the 2D angular coordinate describes an angular correlation between each virtual pixel 1604 and a virtual viewing location of a plurality of virtual viewing locations 1608 located on a virtual viewing plane 1610 (as shown by the rectangular box in dashed lines labeled as 1610 in FIG. 16) in the scene 1600 and wherein the 2D spatial coordinate identifies the location of a virtual aperture of a plurality of virtual apertures 1612 disposed on a virtual display plane 1614 in the scene 1600. In some embodiments, the virtual viewing locations 1608 may be located on two or more virtual viewing planes allowing rendering for coplanar devices.

It will be appreciated that the term "virtual pixel" does not limit the embodiments of this disclosure to rendering 3D environments comprising light fields. The virtual pixels may comprise energy locations in 3D environments comprising any form of detectable energy field including, but not limited to haptic and acoustical fields. Other energy fields may include visual, auditory, somatosensory, gustatory, olfactory, vestibular or other desired energy fields. The plurality of virtual pixels 1604 may be arranged to form a two-dimensional array of virtual pixels. In some embodiments, the plurality of virtual pixels 1604 may be arranged in different ways. For example embodiments allow the virtual pixels to be arranged to form a curved surface, or any other shape. Similarly the plurality of virtual viewing locations 1608 are allowed to be arranged to form different shapes in different embodiments. In some embodiments, the virtual pixel plane 1606 and the virtual display plane 1614 are parallel. In some embodiments the virtual pixel plane 1606 and the virtual viewing plane 1610 are parallel. In some embodiments, the virtual pixel plane 1606, the virtual display plane 1614, and the virtual viewing plane 1610 are parallel.

The location of the plurality of virtual pixels 1604 and the plurality of virtual apertures 1612 relative to the plurality of virtual viewing location 1608 in the scene 1602 may correspond to the location of a plurality of energy sources or locations, and a plurality of apertures in a physical 4D energy-projection system relative to the intended viewing volume for that 4D energy-projection system. And, in some embodiments, the number and locations of the plurality of virtual pixels 1604, plurality of virtual apertures 1612, and the plurality of virtual viewing locations 1608 may be varied to render data for different 4D energy-projection systems depending on the number of energy sources or locations, field of view, number of apertures, waveguides or other features of the physical 4D energy projection system. In some embodiments, an algorithm may be used to calibrate defined numbers and locations of the plurality of virtual pixels 1604, plurality of virtual apertures 1612, and the plurality of virtual viewing locations 1608 to any type of 4D energy-projection system. It will also be appreciated that while FIG. 16 only depicts a small number of virtual pixels 1604, virtual apertures, 1612, and virtual viewing locations 1608, embodiments may comprise tens, hundreds, thousands or more of each of these elements. Furthermore, the virtual display plane 1614 may correspond to the location of an energy-projection surface or screen in a physical 4D energy-projection system.

Referring again to FIG. 15 and FIG. 16, in embodiments the process for rendering a 4D energy-field from a 3D environment may comprise a third step 1530 comprising sampling energy data points of the plurality of energy-data points 1602 in the scene 1600 from the virtual viewing plane 1610 along a plurality of rays 1616. Each ray of the plurality of rays 1616 intersects one virtual viewing location of the plurality of virtual viewing locations 1608 and one virtual pixel of the plurality of virtual pixels 1606 at an angle determined by the 2D angular coordinate of the one virtual pixel of the plurality of virtual pixels 1604. Each ray of the plurality of rays 1616 intersects one virtual aperture of the plurality of virtual apertures 1612, the virtual aperture determined the 2D spatial coordinate of the ray. Together, the 2D spatial coordinate and the 2D angular coordinate form a single 4D energy field coordinate. For example, a first ray 1618 of the plurality of rays 1616 intersects with a first virtual pixel 1620 of the plurality of pixels 1604 and a first virtual viewing location 1622 of the plurality of virtual viewing locations 1608 at an angle determined by the 2D angular coordinate of the known unique 4D coordinate of the first virtual pixel 1620. The first ray 1618 also intersects a first aperture 1624 of the plurality of virtual apertures 1612 that is identified by the 2D spatial coordinate of the first aperture.

Figure 17:
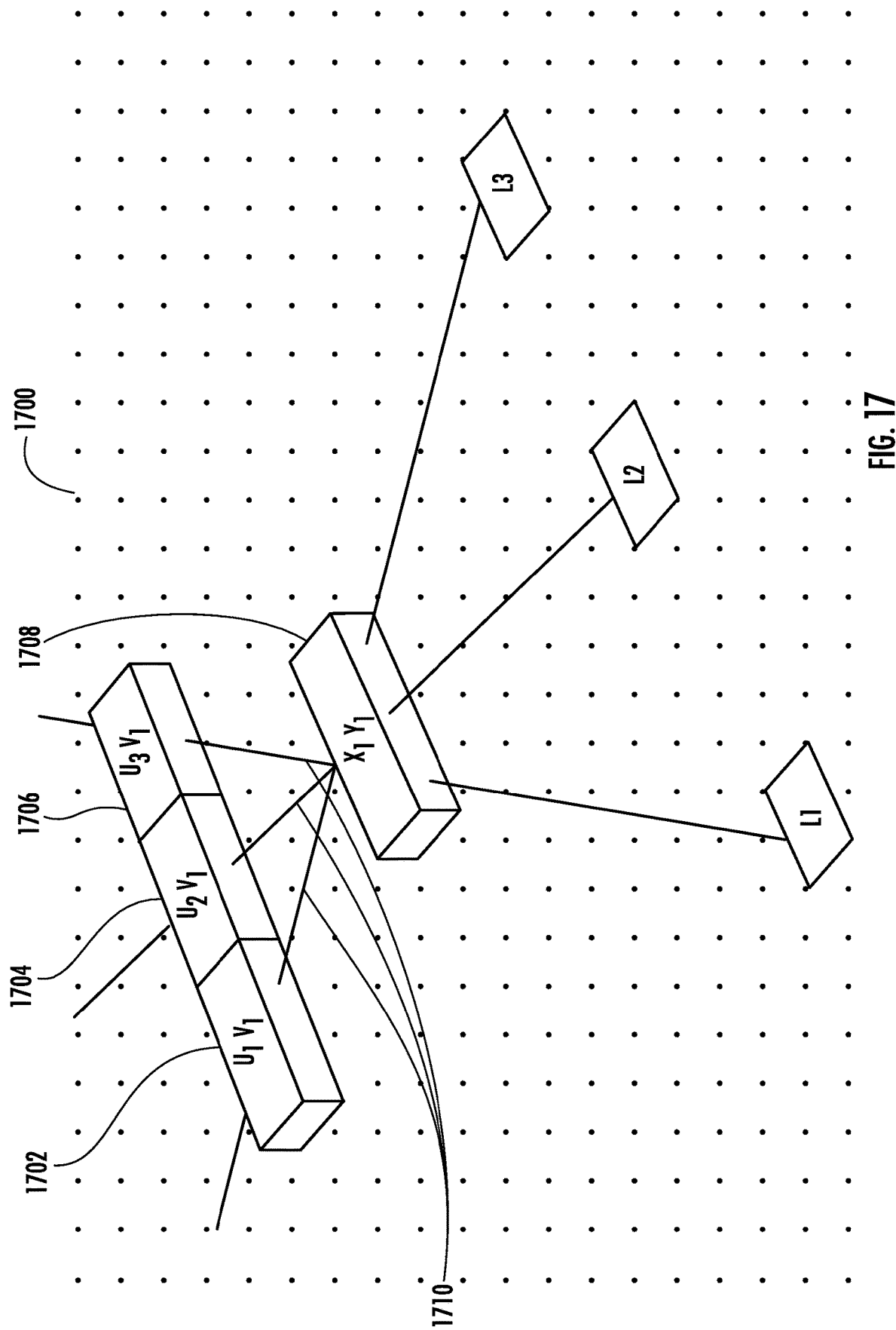
FIG. 17 depicts one perspective of virtual pixels, a virtual aperture, and virtual viewing locations from a 3D environment.

FIG. 17 further illustrate the relationships described by the known unique 4D coordinate of the virtual pixels in some embodiments of the method or system for rendering a 4D energy field from a 3D environment of this disclosure by partially depicting a scene 1700 in a 3D environment. It will be appreciated that many more virtual pixels, virtual apertures, and virtual viewing locations may be located in a scene 1700. To render data for a 4D energy field, some embodiments may comprise a very large number of virtual pixels and virtual viewing locations to provide an energy field that is perceived as seamless. The 2D angular coordinate for one of the virtual pixels 1702, 1704, 1706 describes the angular correlation between the pixels 1702, 1704, 1706 and virtual viewing locations L1, L2, L3. For example, the 2D angular coordinate (U1, V1) for the first virtual pixel 1702 describes the angular correlation between pixel 1702 and virtual viewing location L3. The 2D angular coordinate (U2, V1) for the second virtual pixel 1704 describes the angular correlation between pixel 1704 and virtual viewing location L2. And, the 2D angular coordinate (U3, V1) for the third virtual pixel 1706 describes the angular correlation between pixel 1706 and virtual viewing location L1. In some embodiments, the angular coordinate may correspond to a 2D angular coordinate in a 4D energy-projection system that defines the unique direction of a first propagation path as described elsewhere in this disclosure. Some embodiments, like the one depicted in FIG. 16 and FIG. 17, require only one ray intersecting with any one virtual pixel of the plurality of virtual pixels for a specific energy type.

FIG. 17 also depicts a 2D spatial coordinate (X1,Y1) that identifies the location of one virtual aperture 1708 of the plurality of virtual apertures. The 2D spatial coordinate may correspond to a 2D spatial coordinate in a 4D light field coordinate for a physical 4D energy directing system as disclosed elsewhere in this disclosure, such as the embodiment discussed herein with respect to FIGS. 7C and 7D. Together, the 2D angular coordinate and the 2D spatial coordinate define a unique 4D coordinate. The unique 4D coordinates may correspond to 4D light field coordinate for a physical 4D energy-projection system. In embodiments like the one depicted in FIG. 17 the first virtual pixel 1702 has a 4D coordinate (X1, Y1, U1, V1), the second virtual pixel 1704 has a 4D coordinate (X1, Y1, U2, V1), and the third virtual pixel 1706 has a 4D coordinate (X1, Y1, U3, V1). In some embodiments, like the ones shown in FIG. 16 and FIG. 17, multiple rays may converge at each virtual aperture 1708 of the plurality of virtual apertures. The coordinates for the first 1702, second 1704 and third 1706 virtual pixels share the same spatial coordinate so the rays 1710 of those virtual pixels converge at the same virtual aperture 1708. But, these rays intersect with different virtual viewing locations L1, L2, and L3 because of the 2D angular coordinate differ among the virtual pixels.

In some embodiments of the systems and methods of this disclosure at least one ray 1710 of the plurality of rays intersects one virtual viewing location L1, L2, L3 of the plurality of virtual viewing locations.

Figure 18:
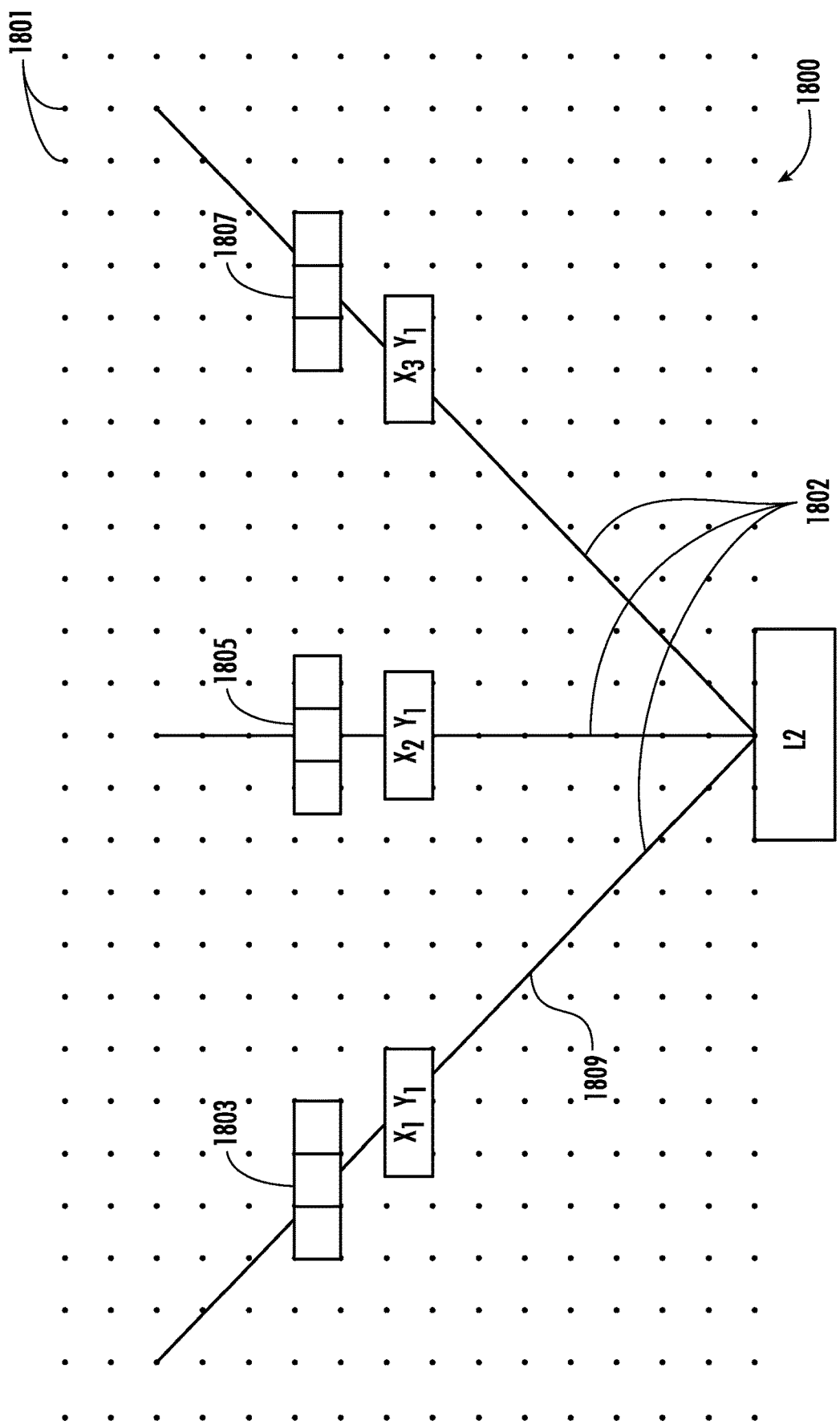
FIG. 18 depicts one perspective of virtual pixels, virtual apertures, and a virtual viewing location from a 3D environment.

Multiple rays 1802 may also converge at a single viewing location L2, in some embodiments, as depicted in FIG. 18, which further illustrates the relationships described by the known unique 4D coordinates. In some of those embodiments, only one ray of the rays 1802 that converge at one virtual viewing location L2 can intersect with the same virtual aperture. As depicted in FIG. 18, one of the converging rays 1802 intersects with (X1, Y1), one intersects with (X2, Y1) and one intersects with (X3, Y1). FIGS. 17 and 18 are for illustrative purposes and do not limit the embodiments of this disclosure. As will be appreciated, even though FIG. 16, FIG. 17, and FIG. 18 depict a small number of virtual pixels, virtual apertures, rays and virtual viewing locations different embodiments may comprise tens, hundreds, thousands, or other numbers of these elements. It should be appreciated that virtual pixels may be located anywhere on a virtual plane. And, virtual locations may be located anywhere on the virtual viewing plane. Also, each of these figures are stylized representations that may vary from embodiments. And the disclosures of this application may be applied to any type of energy; they are not limited to electromagnetic energy in the visible spectrum.

Returning to FIG. 16, in embodiments, the plurality of rays 1616 extend beyond the virtual pixel plane 1606. In some embodiments the plurality of rays 1616 may extend indefinitely beyond the virtual pixel plane 1606. This allows sampling of energy-data points from objects in front, and objects such as the photograph 1628 behind the virtual pixel plane 1606.

In some embodiments the energy data points 1602 along the plurality of rays 1616 are sampled by tracing the plurality of rays 1616 from the virtual viewing plane 1610 through the virtual display plane 1614, through the virtual pixel plane 1606 and beyond. This allows the method and systems of this disclosure to sample energy data points that capture information from objects such as the table 1628A in front of the virtual display plane 1610 and objects such as the picture 1628B behind the virtual display plane 1610 in a single pass. This also allows the systems and methods of this disclosure to accurately account for multitudes of energy interactions, as described in more detail in other parts of this disclosure that occur outside and inside the field of view from an observation point in a single pass. This eliminates the need for difficult, burdensome, and imperfect post-hoc computations to try to integrate multiple rendering passes.

Figure 19:
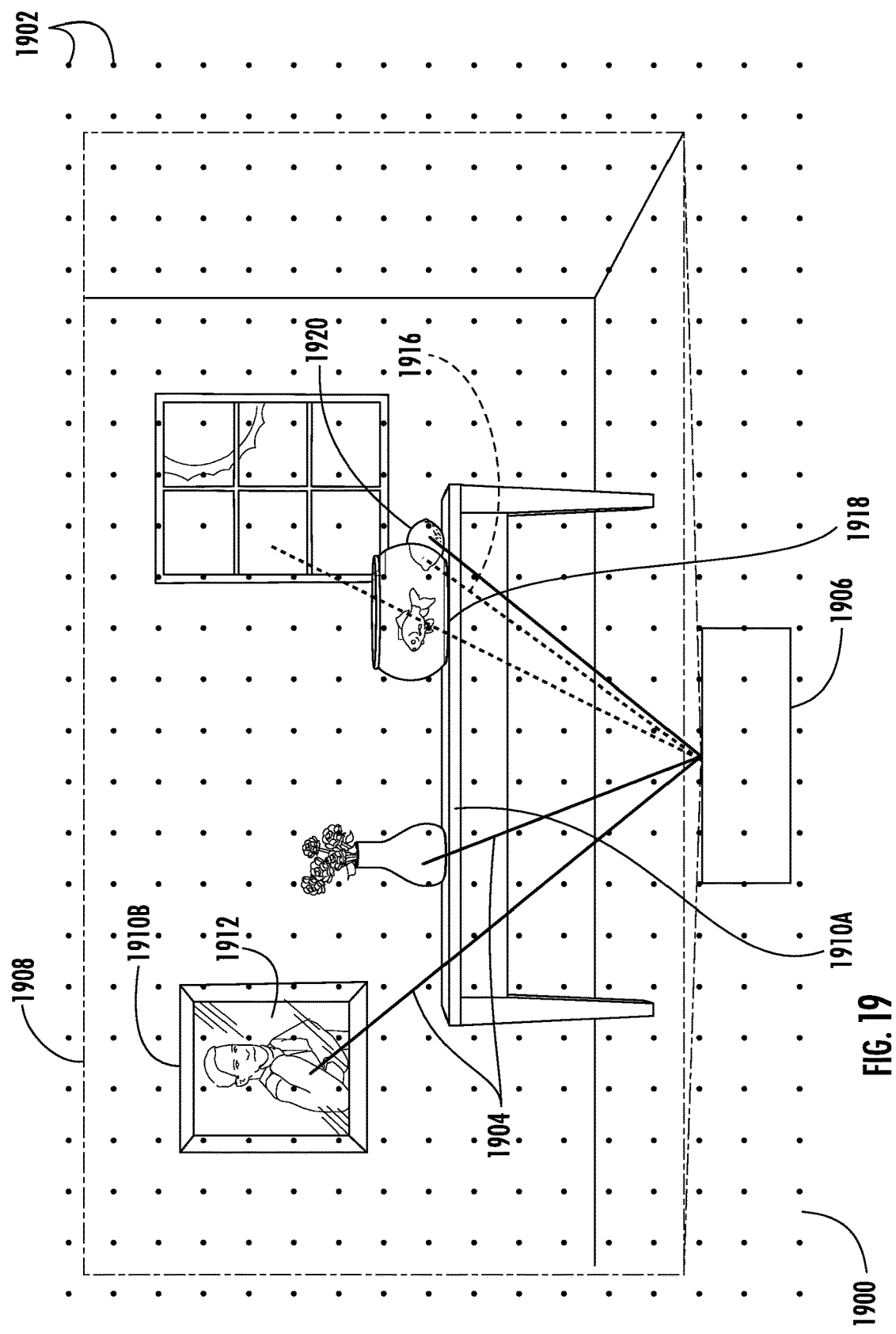
FIG. 19 A depicts a visual representation of a 3D environment from the perspective of a virtual viewing location.

FIG. 19 depicts a scene from a 3D environment from a virtual viewing location 1906 that further illustrates how embodiments of the systems and methods of this disclosure allow for the multitudes of various energy interactions to be accounted for in a single pass. Embodiments of the systems and methods of this disclosure allow data points 1902 to be sampled along a plurality of rays 1904 from a virtual viewing location 1906. It will be appreciated that FIG. 19 is provided for illustrative purposes and does not limit the embodiments of this disclosure. For clarity, FIG. 19 does not depict the virtual pixels or the virtual apertures. And, the size of the viewing location 1906 may vary from embodiment to embodiment. For the purposes of this illustration the virtual viewing location 1906 has a field of view 1908. The size of the field of view may vary from embodiment to embodiment and, in cases, may depend on the type of physical 4D energy-projecting system. And, as will be appreciated, the size of the field of view 1908 can be determined or varied for different purposes. Sampling energy data points 1902 along the plurality of rays 1904 account for objects, like example objects 1910A, 1910B, in the field view 1908, and energy reflected by objects inside the field of view 1908. In this example, energy from a person (not shown) outside the field of view 1908 is reflected off a mirror 1910B in the field of view 1908 creating a reflection 1912 in the mirror 1910B that is sampled by the rays 1904. FIG. 19 is provided for illustrative purposes and does not limit the embodiments of this disclosure. And, although FIG. 19 depicts a 3D light environment, embodiments of the systems and methods of this disclosure are applicable other sensory and energy domains.

Referring once again to FIG. 15, in embodiments the process for rendering a 4D energy-field from a 3D environment may comprise a fourth step 1540 comprising correlating the energy data points sampled along each ray to an energy value for the one virtual pixel of the plurality of virtual pixels.

This step 1540 allows embodiments of the systems and methods of this disclosure to account for varying properties of the objects in the path of the ray. For example, in some embodiments, an energy value for a virtual pixel (not shown in FIG. 19) is correlated to the energy data points 1902 sampled along the lone ray that intersects the virtual pixel (not shown in FIG. 19). For example, ray 1916 intersects with a partially reflective object 1920 and a partially transmissive object 1918 that is located between the partially reflective object 1920 and virtual viewing location 1906. To render data for this scene 1900, the system or method of this disclosure accounts for how the partially transmissive object 1918 affects light reflected from the partially reflective 1920 object through the partially transmissive object 1918 to the virtual viewing location 1906. For example, the partially reflective object 1920 may have a spectral radiance function, which when illuminated by the lighting source (not shown), will distribute energy in different directions, which will be attenuated by the partially transmissive object 1918 before reaching the virtual viewing location 1906. Embodiments may also allow energy value for different data point to be weighted based at least on the transmissive or reflected properties of the other energy data points along the same ray. The systems and methods of the present disclosure allow an energy value for the virtual pixel (not shown in FIG. 19) to be correlated to energy data points along the length of the ray 1916 to account for these types of varying properties. As will be appreciated, a variety energy data points may be modeled to account any number of different properties in different embodiments some that may be specifically tailored for different energy domains. Determining energy values can be very difficult for multi-pass rendering systems because they must attempt to integrate the renders and all the information necessary to model the multitudes of possible interactions along the three-dimensional interfaces of each render to arrive at an energy value. The systems and methods of the present disclosure allow those burdensome and inaccurate measures to be avoided.

The process for rendering a 4D energy-field from a 3D environment may comprise a fifth step 1550 that comprises rendering the energy values of the one virtual pixels of the plurality of virtual pixels and the known unique 4D coordinates of the one virtual pixels of the plurality of virtual pixels into a data set having a format operable for instructing an energy device to output a 4D energy field. In some embodiments, the systems and methods of this disclosure may allow the data set to comprise any data set described, or referenced elsewhere in this disclosure including 4D, 5D, 10D, 11D, or 15D functions. It will be appreciated that other types of data sets may be rendered for different embodiments of 3D environments that account for different kinds of data. In some embodiments, rendering may calibrate the datasets for different types of 4D energy projecting systems. Different types of calibration may be applied to render data for 4D energy directing systems with different architectures, elements, or numbers of elements. For example, calibration may be required for systems with different fields of view or with different numbers or locations of energy sources or other components. In some embodiments of the systems and methods of this disclosure the energy-data points 1902 comprise a value describing at least one of the following: an energy frequency, an energy intensity, an energy transparency, an energy refractivity, an energy reflectivity.

Some embodiments of the method for rendering a four-dimensional energy field from a three-dimensional environment of this disclosure may allow the method to be calibrated for energy devices that project a 4D energy field. As will be appreciated, the location of the physical energy sources and energy propagation paths in a 4D projection system may differ from the theoretical locations of the virtual pixels and the theoretical angular correlation between virtual pixels and virtual viewing locations. This may be due to small variations from energy device to energy device or even waveguide to waveguide of an energy device. For example slight imperfections in a waveguide may cause energy propagation paths to slightly deviate from their expected direction. And, an energy location may vary slightly from a corresponding virtual location in a 3D environment, which also may cause deviations in the direction of energy propagation Methods for calibration are disclosed in co-owned US application U.S. Ser. No. 16/064,300 titled "Method of Calibration for Holographic Energy Directing Systems," which is incorporated by reference herein.

Figure 20:
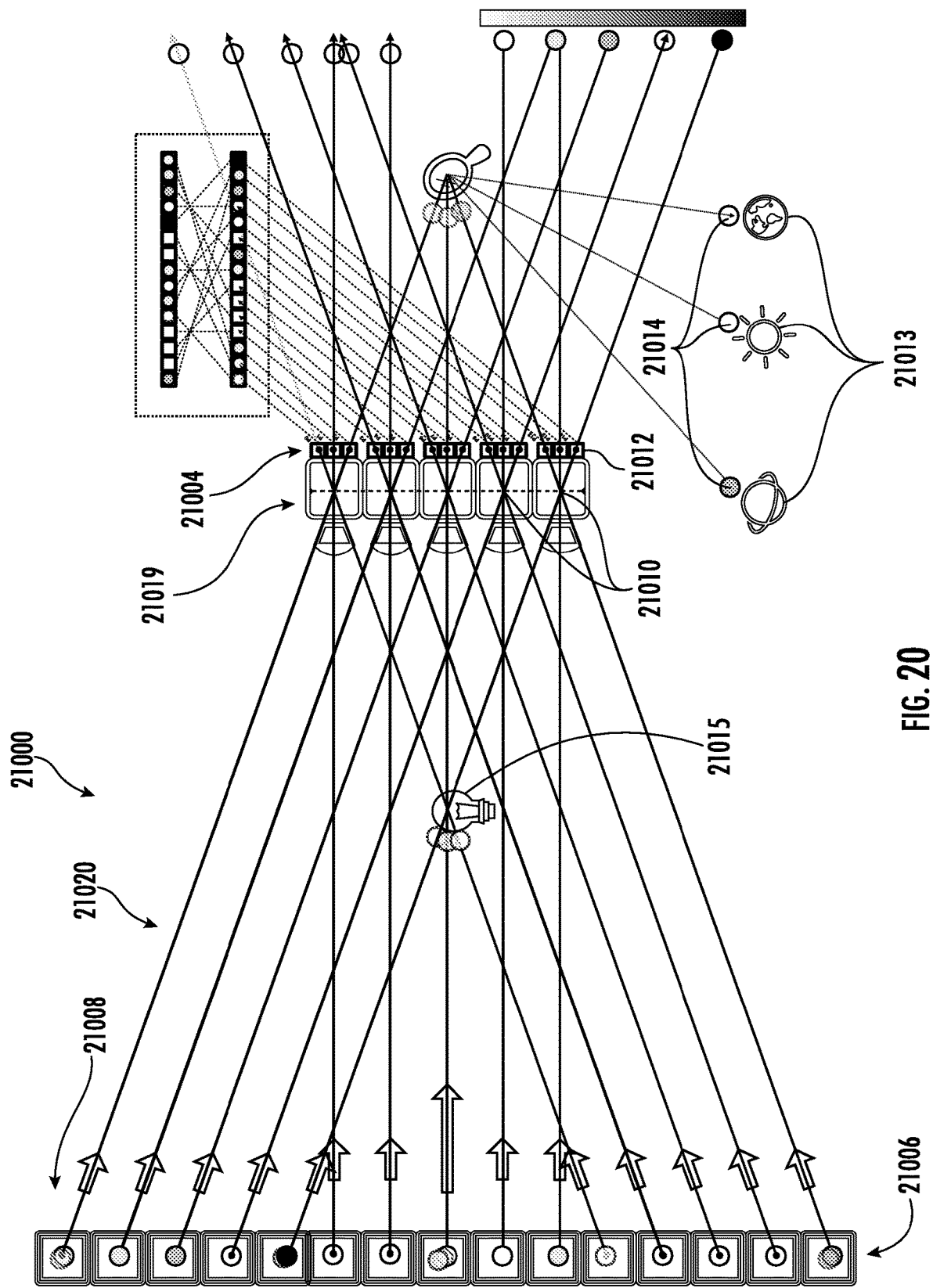
FIG. 20 is a schematic diagram of inverse tracing through various objects in a digital volumetric representation.
Figure 21:
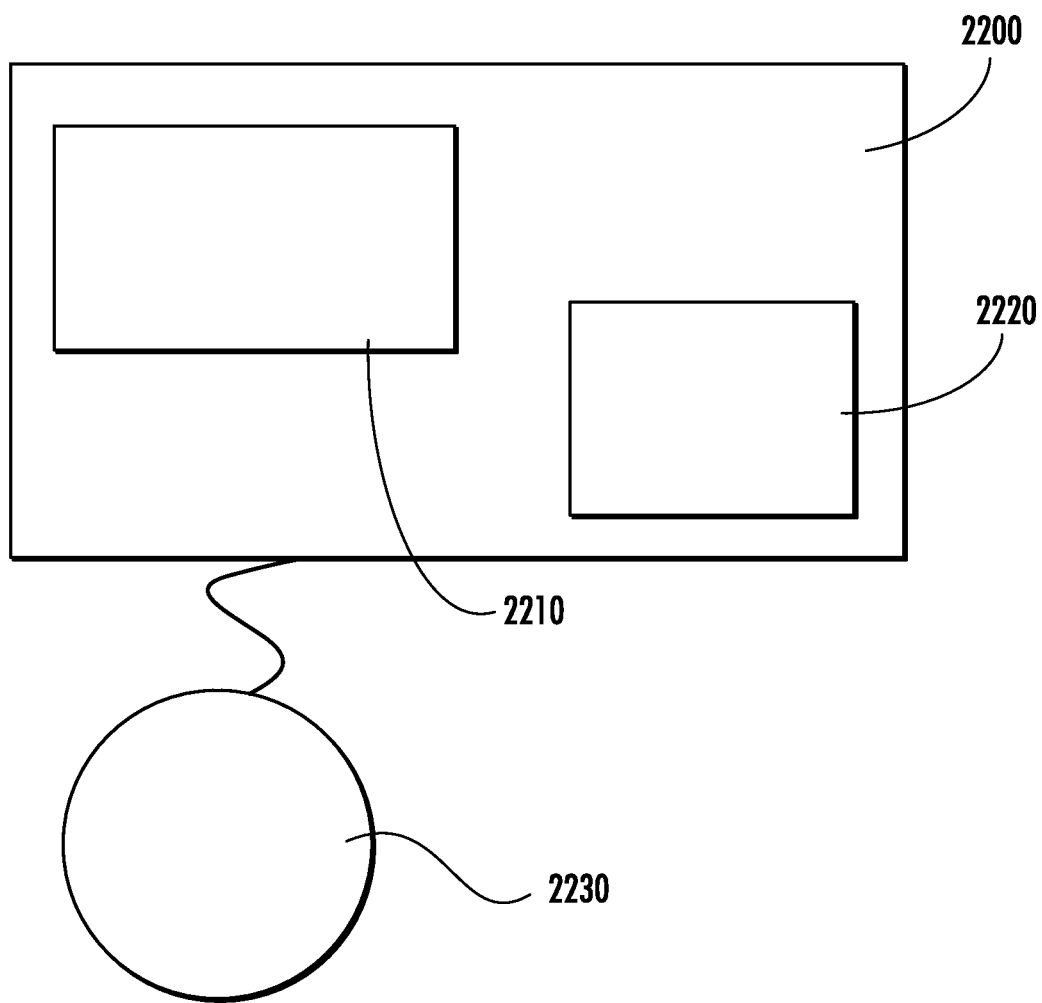
FIG. 21 a schematic diagram illustrating an embodiment of a system for rendering a 4D energy field from a 3D environment.

FIG. 20 is a schematic diagram illustrating inverse tracing in a three-dimensional environment. The method demonstrated in FIG. 20 may include providing a scene 21000 in a 3D environment described by a plurality of energy-data points located throughout the scene. In an embodiment, providing the scene 21000 may be implemented according to the embodiments described above. Also demonstrated in FIG. 20 is locating a plurality of virtual pixels 21012 on a virtual pixel plane 21004 in the scene 21000 wherein each virtual pixel of the plurality of virtual pixels 21012 has a known unique 4D coordinate that comprises a 2D angular coordinate and a 2D spatial coordinate wherein the 2D angular coordinate of each virtual pixel of the plurality of virtual pixels 21012 describes an angular correlation between the virtual pixel and a virtual viewing location of a plurality of virtual viewing locations 21008 located on a virtual viewing plane 21006 in the scene 21000 and wherein the 2D spatial coordinate of each virtual pixel identifies the location of a virtual aperture of a plurality of virtual apertures 21010 located on a virtual display 21019 plane in the scene 21000. In an embodiment, locating the plurality of virtual pixels 21012 may be implemented according to the embodiments described above.

Further demonstrated in FIG. 20 is sampling energy data points of the plurality of energy-data points in the scene 21000 along a plurality of rays 21020 from the virtual viewing plane 21006 wherein each ray of the plurality or rays 21020 intersects one virtual viewing location of the plurality of virtual viewing locations 21008 and one virtual pixel of the plurality of virtual pixels 21012 at an angle determined by the 2D angular coordinate of the one virtual pixel intersected by the ray and wherein each ray intersects one virtual aperture determined by the 2D spatial coordinate of the one virtual pixel intersected by the ray. In an embodiment, sampling data points may be implemented according to the embodiments described above.

Further demonstrated in FIG. 20 is correlating the energy data points sampled along each ray of the plurality of rays 21020 to an energy value for the one virtual pixel of the plurality of virtual pixels 21012 intersected by the ray. In an embodiment, correlating the energy data points sampled may be implemented according to the embodiments described above. The energy value of the one virtual pixel of each ray and the known unique 4D coordinates of the one virtual pixel of each ray may be rendered into a data set having a format operable for instructing an energy device to output a 4D energy field. In an embodiment, rendering may be implemented according to the embodiments described above.

As depicted in FIG. 20 the plurality rays 21012 may be inversely traced from the virtual viewing plane through the virtual pixel plane 21004 and beyond to capture information about the energy data points behind the virtual pixel plane 21004. This allows the method for rendering 4D energy fields from a 3D environment to account for energy reflectance behind the virtual pixel plane even if the reflectance comes from distant objects 21013

FIG. 20 also demonstrates how embodiments of this method may account for a partially transmissive object 21015. As depicted, energy data is sampled through the partially transmissive object 21015 past the virtual pixel display 21004 where it will sample data reflected from objects 21013. In some embodiments, energy values can then be correlated according to the information sampled by weighting the energy data 21014 of the objects 21013 and the partially transmissive object 21015 to arrive at an energy data values for virtual pixels of the array of virtual pixels.

It is to be appreciated that in an embodiment, the inverse tracing and mapping process of FIG. 20 may allow for a single process step of inverse raytracing to the desired 4D display specific volumetric energy representation (e.g., image). This may include wavelength/energy considerations, and display specific calibration (or may include any other functions to move seamlessly between various systems). This may additionally include pixel processing with displacement maps to compute other 4D coordinates if and when advantageous.

In some embodiments of the systems and methods of this disclosure one ray of the plurality of rays intersects one virtual pixel of the plurality of virtual pixels.

In some embodiments of the systems and methods of this disclosure the virtual display plane corresponds to a waveguide system of an energy directing device, and energy is operable to be directed through the waveguide system according to the data set to form a detectable volumetric representation of at least a portion of the scene.

In some embodiments of the systems and methods of this disclosure the plurality of virtual pixels correspond to a plurality of energy locations on a first side of the waveguide system.

In some embodiments of the systems and methods of this disclosure the data set further comprises vectorized material property data.

In some embodiments of the systems and methods of this disclosure at least a portion of the method is carried out in real time.

In some embodiments of the systems and methods of this disclosure the method is entirely carried out in real time.

In some embodiments of the system and method of this disclosure at least two portions of the method are carried out in different time periods.

In some embodiments of the system and method of this disclosure at least one ray of the plurality of rays intersects one virtual aperture of the plurality of virtual apertures.

In some embodiments of the system and method of this disclosure the data set describes at least one signal perceptible by a visual, audio, textural, sensational, or smell sensor.

In some embodiments of the system and method of this disclosure the energy data points sampled along each ray of the plurality of rays are simultaneously correlated to energy values.

In some embodiments of the system and method of this disclosure the data set is stored in a binary file format.

In some embodiments of the system and method of this disclosure energy data points of the plurality of energy-data points are sampled along each ray of the plurality of rays from the virtual viewing plane through the one virtual aperture of the plurality of virtual apertures and beyond the one virtual pixel of the plurality of virtual pixels.

In some embodiments of the system and method of this disclosure the steps may be repeated indefinitely. In some embodiments this may allow a scene to be dynamically captures the scene changes throughout time.

In embodiments the method for rendering a 4D energy field from a 3D environment of this disclosure further comprises storing information about the virtual viewing locations and the 4D coordinates of the virtual viewing locations into a ray file that can provide instructions for sampling data along any rays that intersect with the virtual viewing locations from those virtual viewing locations. The ray file is literally just the mapping for what samples are rendered on the virtual viewing plane, and it may contain a list of 3D virtual viewing plane coordinates and the associated 2D (u,v) angular coordinates. As an example, some embodiments, the ray file may be used with CG scene information such as scene geometry, color, reflections, etc. to effectively sample a synthetic 4D light field. It will be appreciated that the information stored in the ray file may vary depending on the type of energy device that will be utilized to output the 4D energy field because the number of pixels and the location of allowable observation points may vary from energy device to energy device. In some embodiments, the ray file may provide a means to instruct a system how to sample a 3D environment for a given energy device. In other embodiments, the ray file is an ideal mapping for a particular energy field projection device design, and does not reflect relatively small device-to-device differences, requiring any sampling of a scene using the ray file to undergo a further device-dependent correction at a later time. The following discussion refers to FIGS. 17 and 18, but, it will be appreciated that the methods described herein apply to embodiments with many more virtual viewing locations, virtual pixels, virtual apertures, and rays. In an embodiment, a 3D spatial coordinate may identify the location of each virtual viewing location L2 and the 2D angular coordinate of the one virtual pixel 1702, 1704, 1706 intersected by every ray 1710. In some embodiments, the ray file associates the 3D spatial coordinate of each virtual viewing location L2 with the 2D angular coordinate of every virtual pixel 1702, 1704, 1706 intersected by every ray that intersects the virtual viewing location. For example, L2 in FIG. 18 is intersected by rays 1802. And, the ray file may associate the angular coordinate of virtual pixels 1803, 1805, and 1807 L2 as well as a 3D spatial coordinate that identifies the location of L2 in the scene. In embodiments, the ray file provides an instruction for each ray 1802 for sampling energy data points of the plurality of energy data points 1802 along the ray from the one virtual viewing location L2 intersected by the ray wherein the instruction is determined at least by the 3D spatial coordinate of the one virtual viewing location L2 intersected by the ray and the 2D angular coordinate of the one virtual pixel intersected by the ray. For example, ray file may provide an instruction for ray 1809 determined at least by the 3D spatial coordinate of L2 and the 2D angular coordinate of 1803. As will be appreciated, this method may be used for a variety of applications other than energy fields including rendering data for 2D, stereoscopic, virtual reality, augmented reality, and multi-view display systems.

In some embodiments of the method for rendering a four-dimensional energy field from a three-dimensional environment of this disclosure rendering the energy value may also further comprise calibrating the energy data for the energy device. As will be appreciated, the theoretical locations for the virtual pixels and theoretical angular correlation between virtual pixels and virtual viewing locations may differ from the physical implementation. This may be due to small variations from energy device to energy device or even waveguide to waveguide of an energy device. For example slight imperfections in a waveguide may energy propagation paths to slightly deviate from their expected direction. And, an energy location may vary slightly from a corresponding virtual location in a 3D environment which also may cause a slight deviation in the direction of an energy propagation. In some embodiments, these deviations may be accounted for by calibrating the energy data for an energy device or specific type of energy device. It will be appreciated that other types of calibrations may also be appropriate.

The process depicted in FIG. 15 may be carried out using any processing system of the present disclosure or appropriate system known in the art, including processing system 2200 In embodiments, the processing system may comprise a rendering engine 2210 and a sensory data engine 2220. The sensory data engine 2220 may carry out the step 1510 to provide a scene in a 3D environment, in some embodiments. And, the sensory data engine 2220 may also carry out the step 1520 to locate a plurality of virtual pixels on a virtual pixel plane. The rendering engine 2210, of some embodiments, may carry out the step 1530 to sample energy data points. The rendering engine 2210 may also carry out the step 1540 to correlate the energy data points sampled along each ray to an energy value. And, the rendering engine 2210 may also carry out the step to 1550 to render energy values. In some embodiments, system may also comprise a memory to store data sets.

It will be appreciate the method for rendering a 4D energy field from a 3D environment may be applied for rendering energy data for other applications. Such a method may comprise a first step for providing a scene in a 3D environment described by a plurality of energy-data points located throughout the scene. A second step may comprise locating a plurality of virtual pixels on a virtual pixel plane in the scene wherein each virtual pixel has a known unique 4D coordinate that comprises a 2D angular coordinate and a 2D spatial coordinate wherein the 2D angular coordinate of each virtual pixel describes an angular correlation between the virtual pixel and a virtual viewing location of a plurality of virtual viewing locations located on a virtual viewing plane in the scene and wherein the 2D spatial coordinate of each virtual pixel identifies the location of a virtual aperture of a plurality of virtual apertures located on a virtual display plane in the scene. A third step may comprise sampling energy data points of the plurality of energy-data points in the scene along a plurality of rays from the virtual viewing plane wherein each ray intersects one virtual viewing location and one virtual pixel at an angle determined by the 2D angular coordinate of the one virtual pixel intersected by the ray and wherein each ray intersects one virtual aperture determined by the 2D spatial coordinate of the one virtual pixel intersected by the ray. A fourth step may comprise correlating the energy data points sampled along each ray to an energy value for the one virtual pixel intersected by the ray and a fifth step may comprise rendering the energy value of the one virtual pixel of each ray and the known unique 4D coordinates of the one virtual pixel of each ray into a data set having a format operable for instructing an energy device to output energy data.

It will be appreciated that some forms of energy data may have far fewer virtual viewing pixels and virtual viewing location necessary for rendering a 4D energy field. For example, in some embodiments, each virtual aperture is intersected by two rays. In such embodiments, the plurality of virtual viewing locations comprises two virtual viewing locations. But, such embodiments may be operable for generating a data set operable for instructing an energy device to output a stereoscopic image. It will be appreciated that stereoscopic displays direct a first image to a first eye of a viewer and a second image to a second eye. Consequently, in some embodiments each aperture may only comprise two virtual pixels and there may only be two virtual viewing locations—one for each eye. Such embodiments may allow a data sets with a format operable for instructing an energy device to output a virtual reality image. And, such embodiments may allow data sets with a format operable for instructing an energy device to output a augmented reality image.

It will also be appreciated that in other embodiments each virtual aperture may be intersected by additional rays corresponding to additional viewing locations or views. Such embodiments may allow data sets with a format operable for a multi-view display wherein the number of views corresponds to the number of rays that intersects each virtual pixel. This principle can be illustrated by FIG. 17 that show three viewing locations L1, L2, L3, and three rays 1710 intersecting one aperture X1, Y1, wherein each ray intersects one virtual pixel 1702, 1704, and 1706. Each viewing location may correspond to one view of a multi-view system. It will be appreciated that some embodiments will many additional viewing locations.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a numerical value herein that is modified by a word of approximation such as "about" may vary from the stated value by at least 1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A method for rendering a four-dimensional ("4D") energy field from a three-dimensional ("3D") environment, the method comprising:
   providing a scene in the 3D environment described by a plurality of energy-data points located throughout the scene;
   locating a plurality of virtual pixels on a virtual pixel plane in the scene wherein each virtual pixel has a known unique 4D coordinate that comprises a two-dimensional ("2D") angular coordinate and a 2D spatial coordinate wherein the 2D angular coordinate of each virtual pixel describes an angular correlation between the virtual pixel and a virtual viewing location of a plurality of virtual viewing locations located on a virtual viewing plane in the scene and wherein the 2D spatial coordinate of each virtual pixel identifies the location of a virtual aperture of a plurality of virtual apertures located on a virtual display plane in the scene;
   sampling energy data points of the plurality of energy-data points in the scene along each of a plurality of rays from the virtual viewing plane; wherein each ray intersects one virtual viewing location and one virtual pixel at an angle determined by the 2D angular coordinate of the one virtual pixel intersected by the ray, and wherein each ray intersects one virtual aperture determined by the 2D spatial coordinate of the one virtual pixel intersected by the ray, wherein the plurality of rays correspond to energy propagations paths along which energy is propagated according to a 4D energy field to simultaneously define at least one holographic object within a plurality of depths that are sufficient to substantially induce both vergence and accommodation for the at least one holographic object, the plurality of depths being independent of a viewer focus or a viewer position;
   correlating the energy data points sampled along each ray to an energy value for the one virtual pixel intersected by the ray; and
   rendering the energy value of the one virtual pixel of each ray and the known unique 4D coordinates of the one virtual pixel of each ray into a data set having a format operable for instructing an energy device to output the 4D energy field.

2. The method of claim 1, wherein at least one ray of the plurality of rays intersects one virtual viewing location of the plurality of virtual viewing locations.

3. The method of claim 1, wherein the 4D energy field comprises at least one of a light field, a haptic field, and a tactile field.

4. The method of claim 1, wherein the energy-data points comprise a value describing at least one of the following: an energy frequency, an energy intensity, an energy transparency, an energy refractivity, energy reflectivity.

5. The method of claim 1, wherein the 3D environment is determined by applying a depth map to points in a two-dimensional space.

6. The method of claim 1, wherein the virtual display plane corresponds to a waveguide system of an energy directing device, and energy is operable to be directed through the waveguide system according to the data set to form a detectable 4D energy representation of at least a portion of the scene.

7. The method of claim 1, wherein each ray of the plurality of rays extends through the one virtual aperture of the plurality of virtual apertures to and beyond the one virtual pixel of the plurality of virtual pixels and wherein energy data points of the plurality of energy data points are sampled from the virtual viewing plane.

8. A system for rendering a four-dimensional ("4D") energy field from a dynamic three-dimensional ("3D") environment, the system comprising:
   a processing subsystem comprising a sensory data engine and a rendering engine;
   wherein the sensory data engine provides a scene in a 3D environment described by a plurality of energy-data points located throughout the scene;
   wherein the sensory data engine locates a plurality of virtual pixels on a virtual pixel plane in the scene wherein each virtual pixel has a known unique 4D coordinate that comprises a two-dimensional ("2D") angular coordinate and a 2D spatial coordinate wherein the 2D angular of each virtual pixel coordinate describes an angular correlation between the virtual pixel and a virtual viewing location of a plurality of virtual viewing locations located on a virtual viewing plane in the scene by the sensory data engine and wherein the 2D spatial coordinate of each virtual pixel identifies the location of a virtual aperture of a plurality of virtual apertures located on a virtual display plane in the scene by the sensory data engine;
   wherein the rendering engine samples energy data points of the plurality of energy-data points in the scene along each of a plurality of rays from the virtual viewing plane wherein each ray intersects one virtual viewing location and one virtual pixel at an angle determined by the 2D angular coordinate of the one virtual pixel intersected by the ray, wherein each ray intersects one virtual aperture determined by the 2D spatial coordinate of the one virtual pixel intersected by the ray, wherein the plurality of rays correspond to energy propagations paths along which energy is propagated according to a 4D energy field to simultaneously define at least one holographic object within a plurality of depths that are sufficient to substantially induce both vergence and accommodation for the at least one holographic object, the plurality of depths being independent of a viewer focus or a viewer position;

wherein the rendering engine correlates the energy data points sampled along each ray to an energy value for the one virtual pixel of the plurality of virtual pixels; and wherein the rendering engine renders the energy values of the plurality of virtual pixels and the known unique 4D coordinates of the plurality of virtual pixels into a data set having a format operable for instructing an energy device to output the 4D energy field.

9. The system of claim 8, wherein the 4D energy field comprises at least one of a light field, a haptic field, and a tactile field.

10. The system of claim 8, wherein the energy-data points comprise a value describing at least one of the following: an energy frequency, an energy intensity, an energy transparency, an energy refractivity, energy reflectivity.

11. The system of claim 8, wherein the virtual display plane corresponds to a waveguide system of an energy directing device, and energy is operable to be directed through the waveguide system according to the data set to form a detectable 4D energy-field representation of at least a portion of the scene.

12. The system of claim 8, wherein the data set describes a signal perceptible by a visual, audio, textural, sensational, or smell sensor.

13. The system of claim 8, wherein energy data points of the plurality of energy-data points are sampled by the rendering engine along each ray of the plurality of rays that extend from the virtual viewing plane through the one virtual aperture of the plurality of virtual apertures to and beyond the one virtual pixel of the plurality of virtual pixels.

14. The system of claim 8, wherein the system is operated to repeat to render a dynamic 4D energy field from the dynamic 3D environment.

15. A method for rendering energy data from a three-dimensional ("3D") environment, the method comprising:

providing a scene in the 3D environment described by a plurality of energy-data points located throughout the scene;

locating a plurality of virtual pixels on a virtual pixel plane in the scene wherein each virtual pixel has a known unique four-dimensional ("4D") coordinate that comprises a two-dimensional ("2D") angular coordinate and a 2D spatial coordinate wherein the 2D angular coordinate of each virtual pixel describes an angular correlation between the virtual pixel and a virtual viewing location of a plurality of virtual viewing locations located on a virtual viewing plane in the scene and wherein the 2D spatial coordinate of each virtual pixel identifies the location of a virtual aperture of a plurality of virtual apertures located on a virtual display plane in the scene, the virtual display plane and the virtual pixel plane being at different locations;

sampling energy data points of the plurality of energy-data points in the scene along each of a plurality of rays from the virtual viewing plane wherein each ray intersects one virtual viewing location and one virtual pixel at an angle determined by the 2D angular coordinate of the one virtual pixel intersected by the ray, wherein each ray intersects one virtual aperture determined by the 2D spatial coordinate of the one virtual pixel intersected by the ray, and wherein each of the plurality of rays converge with at least one other ray of the plurality of rays at the virtual display plane, and the plurality of rays correspond to energy propagations paths along which energy is propagated according to a 4D energy field to simultaneously define at least one holographic object within a plurality of depths that are sufficient to substantially induce both vergence and accommodation for the at least one holographic object, the plurality of depths being independent of a viewer focus or a viewer position;

correlating the energy data points sampled along each ray to an energy value for the one virtual pixel intersected by the ray; and rendering the energy value of the one virtual pixel of each ray and the known unique 4D coordinates of the one virtual pixel of each ray into a data set having a format operable for instructing an energy device to output energy data.

16. The method of claim 15, wherein each virtual aperture is intersected by two rays.

17. The method of claim 16, wherein the plurality of virtual viewing locations comprises two virtual viewing locations.

18. The method of claim 17, wherein the data set has a format operable for instructing an energy device to output at least one of a stereoscopic image, a virtual reality image, and an augmented reality image.

19. The method claim of claim 15, wherein each virtual aperture is intersected by a number of rays.

20. The method of claim 16, wherein the data set has a format operable for instructing an energy device to output an image from a multiple number of views, wherein the multiple number of views corresponds the number of rays that intersect each virtual aperture.

* * * * *